US006839386B2

(12) United States Patent
Sato et al.

(10) Patent No.: US 6,839,386 B2
(45) Date of Patent: Jan. 4, 2005

(54) PICTURE DECODING METHOD AND APPARATUS USING A 4×8 IDCT

(75) Inventors: Kazushi Sato, Kanagawa (JP); Takao Terao, Kanagawa (JP); Rajesh Kumar Dixit, Tokyo (JP); Masami Goseki, Tokyo (JP); Hiroshi Sugawara, Kanagawa (JP)

(73) Assignee: Sony Corporation (JP)

( * ) Notice: Subject to any disclaimer, the term of this patent is extended or adjusted under 35 U.S.C. 154(b) by 737 days.

(21) Appl. No.: 09/734,578

(22) Filed: Dec. 13, 2000

(65) Prior Publication Data

US 2002/0041632 A1 Apr. 11, 2002

(30) Foreign Application Priority Data

Dec. 16, 1999 (JP) ............................................ P11-357712

(51) Int. Cl.[7] ................................................ H04N 7/12
(52) U.S. Cl. .................................................. 375/240.25
(58) Field of Search .................... 375/240.25; 382/238; H04N 7/12

(56) References Cited

U.S. PATENT DOCUMENTS 6,580,830 B1 * 6/2003 Sato et al. .................. 382/238

* cited by examiner

*Primary Examiner*—Young Lee
(74) *Attorney, Agent, or Firm*—Rader, Fishman & Grauer PLLC; Ronald P. Kananen

(57) ABSTRACT

It is targeted to prevent picture quality deterioration in the output picture information proper to the interlaced scanned picture and that ascribable to interlaced scanning. To this end, a decimating inverse discrete cosine transform unit 5 applies inverse orthogonal transform to four low-range coefficients in the horizontal direction and eight coefficients in the vertical direction among the respective coefficients of an orthogonal transform block of the compressed picture information of the input high resolution picture.

4 Claims, 38 Drawing Sheets

$$\begin{pmatrix} X \\ 4\times 8 \end{pmatrix} = \begin{pmatrix} ID_8 \\ 8\times 8 \end{pmatrix} \begin{pmatrix} C \\ 8\times 8 \end{pmatrix} \begin{pmatrix} ID_4' \\ \hline O_4 \\ 4\times 8 \end{pmatrix}$$

OUTPUT PIXEL VALUE (DIFFERENCE VALUE)

MATRIX FOR EXECUTING DCT IN V DIRECTION

MATRIX FOR EXECUTING DCT IN H DIRECTION $ID_8$ : ORDER-B IDCT MATRIX
$ID_4'$ : TRANSPOSED ORDER FOUR IDCT MATRIX
$O_4$ : 4×4 ZERO MATRIX

FIG.3

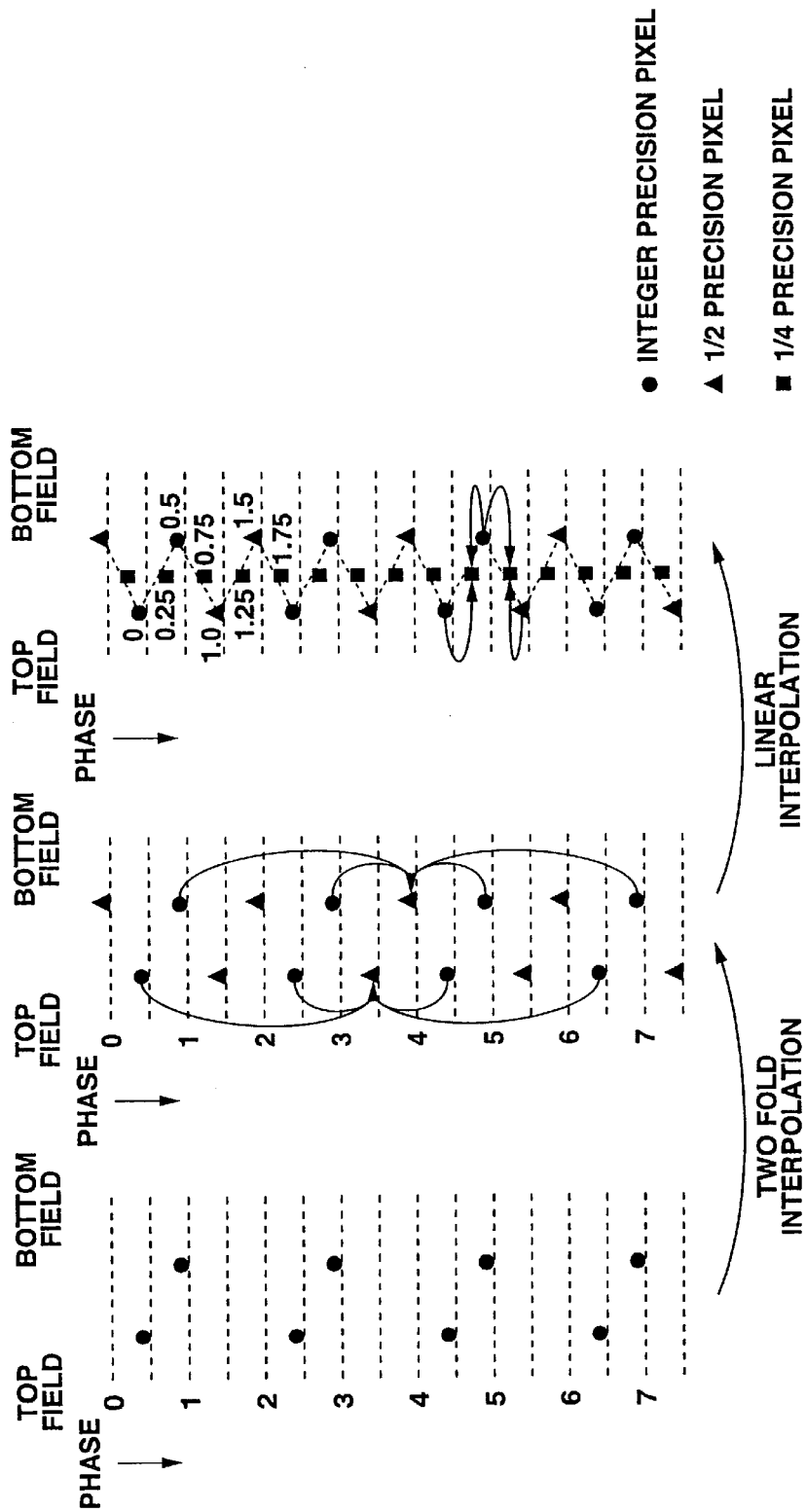

GAIN LIST={1,1,0,0,0,0,0,0,0,0,0,0,0,}

PICTURE DECODING METHOD AND APPARATUS USING A 4×8 IDCT

BACKGROUND OF THE INVENTION

1. Field of the Invention

This invention relates to a picture decoding method and apparatus for decoding compressed picture data of a first resolution obtained on predictive coding by motion prediction in terms of a pre-set pixel block (macro-block) as a unit and on orthogonal transform in terms of a pre-set pixel block (orthogonal transform block) as a unit. More particularly, it relates to a picture decoding method and apparatus for decoding compressed picture data of the first resolution and for decimating the data to moving picture data of a second resolution lower than the first resolution.

2. Description of the Related Art

There is now going on the standardization of digital television signals employing the picture compression system, such as Moving Picture Experts Group phase-2 (MPEG2). Among the standards for digital television broadcast, there are a standard for standard resolution pictures, such as those with the number of effective lines in the vertical direction of 576, and a standard for high-resolution pictures, such as those with the number of effective lines in the vertical direction of 1152. Recently, there is raised a demand for a picture decoding apparatus for decoding compressed picture data of a high-resolution picture and for reducing the resolution of the compressed picture data by 1/2 to generate picture data of the picture data of standard resolution to display the picture data on a television monitor adapted to cope with the standard resolution.

There is proposed in a publication entitled "Scalable Decoder free of low-range Drift" (written by Iwahashi, Kanbayashi and Takaya, Shingaku-Gihou CS 94-186, DSP 94-108, 1995-01) a downdecoder for decoding a bitstream of, for example, MPEG2, obtained on predictive coding with motion prediction of a high-resolution picture and compression coding by discrete cosine transform, and for downsampling the picture to a picture of standard resolution. The conventional picture decoding apparatus, disclosed in this publication, is now explained with reference to FIGS. 37 to 39.

Referring to FIG. 37, this conventional picture decoding apparatus 100 includes an inverse discrete cosine transform unit 101, for processing a bitstream of a high resolution picture with 8 (number of coefficients as counted from the DC component in the horizontal direction)×8 (number of coefficients as counted from the DC component in the vertical direction), an adder 102 for adding a discrete cosine transformed high resolution picture and a motion-compensated reference picture, and a frame memory 103 for transient storage of the reference picture. The picture decoding apparatus 100 also includes a motion compensation unit 104 for motion-compensating the reference picture stored in the frame memory 103 with 1/2 pixel precision, and a downsampling unit 105 for converting the reference picture stored in the frame memory 103 to a picture of standard resolution.

This conventional picture decoding apparatus 100 reduces an output picture, obtained on decoding as a high resolution picture by inverse discrete cosine transform, by the downsampling unit 105, to output resulting picture data with the standard resolution.

Referring to FIG. 38, another conventional picture decoding apparatus 110 includes an inverse discrete cosine transform unit 111 for performing 8×8 inverse discrete cosine transform, as it substitutes 0 for the high-frequency components of the discrete cosine transform (DCT) block of the high resolution picture, an adder 112 for summing the discrete cosine transformed high resolution picture to the motion-compensated reference picture, and a frame memory 113 for transient storage of the reference picture. The conventional picture decoding apparatus 110 also includes a motion compensation unit 114 for motion-compensating the reference picture stored in the frame memory 113 with 1/2 pixel precision, and a downsampling unit 115 for converting the reference picture stored in the frame memory 113 to a picture of standard resolution.

This conventional picture decoding apparatus 110 performs inverse discrete cosine transform to obtain a decoded output picture, as a high-resolution picture, as it substitutes 0 for coefficients of high-frequency components among the totality of coefficients of the DCT block, and reduces the output picture in size by the downsampling unit 115 to output picture data of standard resolution.

Referring to FIG. 39, a further picture decoding apparatus 120 includes a decimating inverse discrete cosine transform unit 121 for executing e.g., 4×4 inverse discrete cosine transform, using only the coefficients of the low-frequency components of the DCT block of the bitstream of the high resolution picture, for decoding to a standard resolution picture, and an adder 122 for summing the standard resolution picture processed with decimating inverse discrete cosine transform and the motion-compensated reference picture. The third downdecoder also includes a frame memory 123 for transiently storing the reference picture and a motion compensation unit 124 for motion-compensating the reference picture stored by the frame memory 1023 with a 1/4pixel precision.

In this conventional picture decoding apparatus 120, IDCT is executed using only low-frequency components of all coefficients of the DCT block to decode a picture of low resolution from a picture of high resolution.

The above-described conventional picture decoding apparatus 100 performs inverse discrete cosine transform on the totality of the coefficients in the DCT block to obtain a high-resolution picture on decoding. Thus, the inverse discrete cosine transform unit 1001 of high processing capability and the frame memory 1003 of high storage capacity are needed. The second conventional picture decoding apparatus 110 performs discrete cosine transform on the coefficients in the DCT block to obtain a high-resolution picture on decoding, as it sets the high-frequency components of the coefficients to zero, so that a lower processing capacity of the inverse discrete cosine transform unit 111 suffices. However, the frame memory 113 of high storage capacity is yet needed. In contradistinction from these first and second downdecoders, the conventional picture decoding apparatus 120 performs inverse discrete cosine transform on the totality of the coefficients in the DCT block, using only coefficients of the low-frequency components of the coefficients in the DCT block, so that a low processing capability of an inverse discrete cosine transform unit 121 suffices. Moreover, since the reference picture of the standard resolution picture is decoded, a lower capacity of the frame memory 123 suffices.

Meanwhile, the display system of a moving picture in television broadcast is classified into a sequential scanning system and an interlaced scanning system. The sequential scanning system sequentially displays a picture obtained on sampling the totality of pictures in a given frame at the same timing. The interlaced scanning system alternately displays pictures obtained on sampling pixels in a given frame at different timings from one horizontal line to another.

In this interlaced scanning system, one of the pictures obtained on sampling pixels in a frame at different timings from one horizontal line to another is termed a top field or a first field, with the other picture being termed a bottom field or a second field. The picture containing the leading line in the horizontal direction of a frame becomes the top field, while the picture containing the second line in the horizontal direction of the same frame becomes the bottom field. Thus, in the interlaced scanning system, a sole frame is made up of two fields.

With the MPEG2, not only a frame but also a field can be allocated to a picture as a picture compressing unit in order to compress the moving picture signals efficiently in the interlaced scanning system.

If, in the MPEG2, a field is allocated to a picture, the resulting bitstream structure is termed a field structure, whereas, if a frame is allocated to a picture, the resulting bitstream structure is termed a frame structure. In the field structure, a DCT block is constituted by pixels in the field and discrete cosine transform is applied on the field basis. The processing mode of performing field-based discrete cosine transform is termed the field DCT mode. In the frame structure, a DCT block is constituted by pixels in the frame and discrete cosine transform is applied on the frame basis. The processing mode of performing field-based discrete cosine transform is termed the frame DCT mode. In the field structure, a macro-block is constituted from pixels in a field and motion prediction is performed on the field basis. The processing mode of performing motion prediction on the field basis is termed the field motion prediction mode. In the frame structure, a macro-block is constituted from pixels in a frame and motion prediction is performed on the frame basis. The processing mode of performing motion prediction on the frame basis is termed the frame motion prediction mode.

Meanwhile, in the conventional picture decoding apparatus 120, IDCT is applied to the input bitstream of the high resolution picture, using only low frequency components in the horizontal and vertical directions, for decoding the input bitstream of the high resolution picture and downsampling to a standard resolution picture. However, if the input bitstream is of the interlaced scanning system, the tendency is that severe picture quality deterioration is produced in edges and fine lines having high frequency components in the vertical direction. In particular, if a reference picture is used in e.g., MPEG, this picture quality deterioration is propagated to produce significant deterioration as drift noise. As a specified example, FIG. 40 shows an output picture, obtained as a B-picture on decoding a bitstream corresponding to an HD test sequence "opening ceremony" (1920×1088 pixels, interlaced scanning at 30 Hz), compressed to 18 Mbps, by a conventional picture decoding apparatus.

SUMMARY OF THE INVENTION

It is therefore an object of the present invention to provide a picture decoding method and apparatus whereby it is possible to prevent picture quality deterioration and drift noise in the output picture information ascribable to the interlaced scanning.

In one aspect, the present invention provides a picture decoding apparatus for decoding the moving picture information of a second resolution from the compressed picture information of a first resolution obtained on predictive encoding in terms of a pre-set pixel block (macroblock) as a unit and on orthogonal transform in terms of a pre-set pixel block (orthogonal transform block) as a unit, the second resolution being lower than the first resolution, wherein the picture decoding apparatus includes inverse orthogonal transform means for inverse orthogonal transforming each coefficient of the orthogonal transform block of the orthogonal transformed compressed picture information, addition means for summing the transformed picture information obtained on inverse orthogonal transform by the inverse orthogonal transform means to the motion compensated reference picture information to output the moving picture information of the second resolution, storage means for memorizing the moving picture information output by the addition means as the reference picture information, first motion compensation means for motion compensating the macroblock of the reference picture information motion-predicted in accordance with the motion prediction system associated with the interlaced scanning (field motion prediction mode), and second motion compensation means for motion compensating the macroblock of the reference picture information motion-predicted in accordance with the motion prediction system associated with the sequential scanning (frame motion prediction mode). The inverse orthogonal transform means inverse orthogonal transforms four coefficients in the low range in the horizontal direction and eight coefficients in the vertical direction in respective coefficients in an orthogonal transform block of the compressed picture information.

In this picture decoding apparatus, the inverse orthogonal transform means inverse orthogonal transforms four low-range coefficients in the horizontal direction and eight coefficients in the vertical direction, in the respective coefficients of the orthogonal transform block of the compressed picture information.

In another aspect, the present invention provides a picture decoding apparatus for decoding the moving picture information of a second resolution from the compressed picture information of a first resolution obtained on predictive encoding in terms of a pre-set pixel block (macroblock) as a unit and on orthogonal transform in terms of a pre-set pixel block (orthogonal transform block) as a unit, the second resolution being lower than the first resolution, wherein the picture decoding apparatus includes signal separating means for separating the compressed picture information of the first resolution into the compressed picture information pertinent to luminance signals and into the compressed picture information pertinent to chroma signals, first inverse orthogonal transform means for inverse orthogonal transforming respective coefficients of the orthogonal transform block of the compressed picture information pertinent to orthogonal transformed and separated luminance signals, first addition means for summing the first picture information pertinent to luminance signals inverse orthogonal transformed by the first inverse orthogonal transform means to the motion compensated first reference picture information to output the moving picture information, first storage means for memorizing the moving picture information output by the first addition means as the reference picture information, first motion compensation means for motion compensating the macroblock of the reference picture information, motion-predicted in accordance with the motion prediction system associated with the interlaced scanning (field prediction mode), second motion compensation means for motion compensating the macroblock of the reference picture information, motion-predicted in accordance with the motion prediction system associated with the sequential scanning (frame prediction mode), second inverse orthogonal transform means for inverse orthogonal transforming an orthogonal transform block of the compressed picture information pertinent to chroma signals orthogonal transformed in accordance with the orthogonal transform system associated with the interlaced scanning (field orthogonal transform mode) and subsequently separated by the signal separating means, third inverse orthogonal transform means for inverse orthogonal transforming an orthogonal transform block of the compressed picture information pertinent to chroma signals orthogonal transformed in accordance with the orthogonal transform system associated with the sequential scanning (frame orthogonal transform mode) and subsequently separated by the signal separating means, second addition means for summing the compressed picture information pertinent to chroma signals inverse orthogonal transformed by the second inverse orthogonal transform means or the third inverse orthogonal transform means to the motion compensated second reference picture information to output the moving picture information, second storage means for memorizing the moving picture information output by the second addition means as the reference picture information, third motion compensation means for motion compensating the macroblock of the reference picture information motion-predicted in accordance with the motion prediction system (field motion prediction mode) associated with the interlaced scanning, and fourth motion compensation means for motion compensating the macroblock of the reference picture information motion-predicted in accordance with the motion prediction system (frame motion prediction mode) associated with the sequential scanning. The first inverse orthogonal transform means inverse orthogonal transforms four low range coefficients in the horizontal direction and eight coefficients in the vertical direction, in respective coefficients of the orthogonal transform block of the compressed picture information pertinent to luminance signals separated by the signal separating means. The second inverse orthogonal transform means inverse orthogonal transforms four low range coefficients in the horizontal direction and four low range coefficients in the vertical direction, in respective coefficients of the orthogonal transform block of the compressed picture information pertinent to chroma signals orthogonal transformed in accordance with the orthogonal transform system associated with the interlaced scanning and subsequently separated by the signal separating means. The third inverse orthogonal transform means inverse orthogonal transforms coefficients of the totality of frequency components of the orthogonal transform block of the compressed picture information pertinent to chroma signals separated by the signal separating means following orthogonal transform in accordance with the orthogonal transform system associated with the sequential scanning, separates orthogonal transform blocks resulting from the inverse orthogonal transform into two pixel blocks associated with interlaced scanning, orthogonal transforms the two separated pixel blocks, inverse orthogonal transforms coefficients of low frequency components in the respective coefficients of the two orthogonal transformed pixel blocks, and synthesizes the top and bottom fields obtained on inverse orthogonal transform.

In this picture decoding apparatus, the first inverse orthogonal transform means inverse orthogonal transforms four low range coefficients in the horizontal direction and four low range coefficients in the vertical direction, in respective coefficients of the orthogonal transform block of the compressed picture information pertinent to luminance signals separated by signal separating means, whilst the second inverse orthogonal transform means inverse orthogonal transforms four low-range coefficients in the horizontal and vertical directions in the respective coefficients of the orthogonal transform block of the compressed picture information pertinent to chroma signals orthogonal transformed in accordance with the orthogonal transform system associated with the interlaced scanning system and subsequently separated by signal separating means. The third inverse orthogonal transform means inverse orthogonal transforms coefficients of the totality of frequency components of the orthogonal transform block of the compressed picture information pertinent to chroma signals orthogonal transformed in accordance with the orthogonal transform system associated with the sequential scanning and subsequently separated by the signal separating means. The third orthogonal transform means then separates orthogonal transform blocks resulting from the inverse orthogonal transform into two pixel blocks associated with interlaced scanning, orthogonal transforms the two separated pixel blocks, inverse orthogonal transforms coefficients of low frequency components in the respective coefficients of the two orthogonal transformed pixel blocks, and synthesizes the phase-corrected top and bottom fields.

In still another aspect, the present invention provides a picture decoding apparatus for decoding the moving picture information of a second resolution from the compressed picture information of a first resolution obtained on predictive encoding in terms of a pre-set pixel block. (macroblock) as a unit and on orthogonal transform in terms of a pre-set pixel block (orthogonal transform block) as a unit, the second resolution being lower than the first resolution, wherein the picture decoding apparatus includes picture type separating means for analyzing the picture type of the compressed picture information of the first resolution and for separating the compressed picture information of the first resolution into the compressed picture information pertinent to the I- and P-pictures and into the compressed picture information pertinent to B-pictures, first inverse orthogonal transform means for inverse orthogonal transforming respective coefficients of the orthogonal transform block of the I- and P-pictures orthogonal transformed and separated by the picture type separating means, first addition means for summing the compressed picture information pertinent to the I- and P-pictures inverse orthogonal transformed by the first inverse orthogonal transform means to the motion compensated first reference picture information to output the moving picture information, first storage means for memorizing the moving picture information output by the first addition means as the reference picture information, first motion compensation means for motion compensating the macroblock of the reference picture information motion-predicted in accordance with the motion prediction system associated with the interlaced scanning (field motion prediction mode), second motion compensation means for motion compensating the macroblock of the reference picture information motion-predicted in accordance with the motion prediction system associated with the sequential scanning (frame motion prediction mode), second inverse orthogonal transform means for inverse orthogonal transforming the orthogonal transform block of the compressed picture information pertinent to the B-pictures orthogonal transformed in accordance with the orthogonal transform system associated with the interlaced scanning (field orthogonal transform mode) and separated by the picture separating means, third inverse orthogonal transform means for inverse orthogonal transforming the orthogonal transform block of the compressed picture information pertinent to the B-pictures orthogonal transformed in accordance with the orthogonal transform system associated with the sequential scanning (frame orthogonal transform mode) and separated by the picture separating means, second addition means for summing the compressed picture information pertinent to B-pictures inverse orthogonal transformed by the second or third inverse orthogonal transform means to the motion compensated second reference picture information, second storage means for memorizing the moving picture information output by the second addition means as the reference picture information, third motion compensation means for motion compensating a macroblock of the reference picture information motion-predicted by the motion prediction system associated with the interlaced scanning (field motion prediction mode), and fourth motion compensation means for motion compensating a macroblock of the reference picture information motion-predicted by the motion prediction system associated with the sequential scanning (frame motion prediction mode). The first inverse orthogonal transform means inverse orthogonal transforms four low-range coefficients in the horizontal direction and eight coefficients in the vertical direction, in respective coefficients of the orthogonal transform block of the compressed picture information pertinent to I- and P-pictures separated by the picture type separating means. The second inverse orthogonal transform means inverse orthogonal transforms four low-range coefficients in the horizontal and vertical directions in the respective coefficients of the orthogonal transform block of the compressed picture information of the B-pictures orthogonal transformed in accordance with the orthogonal transform system associated with the interlaced scanning and subsequently separated by the picture type separating means. The third inverse orthogonal transform means inverse orthogonal transforms coefficients of the totality of frequency components of the orthogonal transform block of the compressed picture information pertinent to chroma signals orthogonal transformed in accordance with the orthogonal transform system associated with the sequential scanning and subsequently separated by the signal separating means. The third orthogonal transform means separates orthogonal transform blocks resulting from the inverse orthogonal transform into two pixel blocks associated with interlaced scanning, orthogonal transforms the two separated pixel blocks, inverse orthogonal transforms coefficients of low frequency components in the respective coefficients of the two orthogonal transformed pixel blocks, and synthesizes the top and bottom fields obtained on orthogonal transform.

In this picture decoding apparatus, the first inverse orthogonal transform means inverse orthogonal transforms four low-range coefficients in the horizontal direction and eight coefficients in the vertical direction in the respective coefficients of the orthogonal transform block of the compressed picture information pertinent to I- and P-pictures separated by picture type separating means. The second inverse orthogonal transform means applies inverse orthogonal transform to four low-range coefficients in the horizontal and vertical directions, in respective coefficients of the orthogonal transform blocks of the compressed picture information pertinent to the I- and P-pictures, orthogonal transformed in accordance with the orthogonal transform system associated with the interlaced scanning and subsequently separated by the picture type separating means. The third orthogonal transform means inverse orthogonal transforms coefficients of the totality of frequency components of the orthogonal transform blocks of the compressed picture information pertinent to B-pictures orthogonal transformed in accordance with the orthogonal transform system associated with the sequential scanning and subsequently separated by the signal separating means. The third orthogonal transform means separates the orthogonal transform block resulting from the inverse orthogonal transform into two pixel blocks associated with interlaced scanning, orthogonal transforms the two separated pixel blocks, inverse orthogonal transforms coefficients of low frequency components in the respective coefficients of the two orthogonal transformed pixel blocks, and synthesizes the phase-corrected top and bottom fields.

In still another aspect, the present invention provides a picture decoding apparatus for decoding the moving picture information of a second resolution from the compressed picture information of a first resolution obtained on predictive encoding in terms of a pre-set pixel block (macroblock) as a unit and on orthogonal transform in terms of a pre-set pixel block (orthogonal transform block) as a unit, the second resolution being lower than the first resolution, wherein the picture decoding apparatus includes picture type separating means for analyzing the picture type of the compressed picture information of the first resolution and for separating the compressed picture information of the first resolution into the compressed picture information pertinent to the I- and P-pictures and into the compressed picture information pertinent to B-pictures, signal separating means for separating the compressed picture information of the first resolution into the compressed picture information pertinent to luminance signals and into the compressed picture information pertinent to chroma signals, first inverse orthogonal transform means for applying first inverse orthogonal transform to respective coefficients of the orthogonal transform block of the compressed picture information pertinent to luminance signals of the I- and P-pictures orthogonal transformed and separated by the picture type separating means and the signal separating means, first addition means for summing the compressed picture information pertinent to luminance signals of I- and P-pictures orthogonal transformed by the first orthogonal transform means to output the moving picture information, first storage means for memorizing the moving picture information output by the first addition means as the reference picture information, first motion compensation means for motion compensating a macroblock of the reference picture information motion-predicted in accordance with the motion prediction system associated with the interlaced scanning (field motion prediction mode), second motion compensation means for motion compensating a macroblock of the reference picture information motion-predicted in accordance with the motion prediction system associated with the sequential scanning (frame motion prediction mode), second inverse orthogonal transform means for inverse orthogonal transforming orthogonal transform blocks of the compressed picture information pertinent to chroma signals of the I- and P-pictures and to B-pictures obtained on orthogonal transform in accordance with the orthogonal transform system associated with the interlaced scanning (field orthogonal transform mode) and subsequent separation by the picture type separating means and the signal separating means, third inverse orthogonal transform means for inverse orthogonal transforming the orthogonal transform blocks of the compressed picture information pertinent to chroma signals of the I- and P-pictures and to B pictures obtained on orthogonal transform in accordance with the orthogonal transform system associated with the sequential scanning (frame orthogonal transform mode) and subsequent separation by the picture type separating means and the signal separating means, second addition means for summing the compressed picture information pertinent to chroma signals of I- and P-pictures and to B-pictures obtained on orthogonal transform by the second or third inverse orthogonal transform means, to output the moving picture information, second storage means for memorizing the moving picture information output by the second addition means as reference picture information, third motion compensation means for motion compensating a macroblock of the reference picture information motion-predicted in accordance with the motion prediction system associated with the interlaced scanning (field motion prediction mode), and fourth motion compensation means for motion compensating a macroblock of the reference picture information motion-predicted in accordance with the motion prediction system associated with the sequential scanning (frame motion prediction mode). The first inverse orthogonal transform means inverse orthogonal transforms four low-range coefficients in the horizontal direction and eight coefficients in the vertical direction in the coefficients of the orthogonal transform blocks of the compressed picture information pertinent to luminance signals of the I- and P-pictures. The second inverse orthogonal transform means inverse orthogonal transforms four low-range coefficients in the horizontal direction and four low-range coefficients in the vertical direction in the coefficients of the orthogonal transform blocks of the compressed picture information pertinent to chroma signals of the I- and P-pictures and B-pictures separated by the picture type separating means and the signal separating means. The third inverse orthogonal transform means inverse orthogonal transforms coefficients of the totality of frequency components of the orthogonal transform blocks of the compressed picture information pertinent to chroma signals of the I- and P-pictures and to B-pictures separated by the picture type separating means and signal separating means. The third orthogonal transform means separates orthogonal transform blocks resulting from the inverse orthogonal transform into two pixel blocks associated with interlaced scanning, orthogonal transforms the two separated pixel blocks, inverse orthogonal transforms coefficients of low frequency components in the respective coefficients of the two orthogonal transformed pixel blocks, and synthesizes the top and bottom fields obtained on inverse orthogonal transform.

In this picture decoding apparatus, the first inverse orthogonal transform means inverse orthogonal transforms four low-range coefficients in the horizontal direction and eight coefficients in the vertical direction in the respective coefficients of the orthogonal transform block of the compressed picture information pertinent to luminance signals of the I- and P-pictures. The second inverse orthogonal transform means inverse orthogonal transforms four low-range coefficients in the horizontal and vertical directions in the respective coefficients of the orthogonal transform block of the compressed picture information pertinent to chroma signals of I- and P-pictures and B-pictures as separated by the picture type separating means and signal separating means. The third inverse orthogonal transform means inverse orthogonal transforms coefficients of the totality of frequency components of the orthogonal transform blocks of the compressed picture information pertinent to chroma signals of the I- and P-pictures and to B-pictures separated by the picture type separating means and signal separating means. The third orthogonal transform means separates orthogonal transform blocks resulting from the inverse orthogonal transform into two pixel blocks associated with interlaced scanning, orthogonal transforms the two separated pixel blocks, inverse orthogonal transforms coefficients of low frequency components in the respective coefficients of the two orthogonal transformed pixel blocks, and synthesizes the phase-corrected top and bottom fields.

In still another aspect, the present invention provides a picture decoding apparatus for decoding the moving picture information of a second resolution from the compressed picture information of a first resolution obtained on predictive encoding in terms of a pre-set pixel block (macroblock) as a unit and on orthogonal transform in terms of a pre-set pixel block (orthogonal transform block) as a unit, the second resolution being lower than the first resolution, wherein the picture decoding apparatus includes inverse orthogonal transform means for inverse orthogonal transforming respective coefficients of orthogonal transform blocks of the orthogonal transformed compressed picture information, addition means for summing the transformed picture information, inverse orthogonal transformed by the inverse orthogonal transform means, to the motion compensated reference picture information, to output the moving picture information of the second resolution, picture type separating means for analyzing the picture type of the compressed picture information of the first resolution and for separating the compressed picture information of the first resolution into the compressed picture information pertinent to the I- and P-pictures and into the compressed picture information pertinent to B-pictures, thinning means for thinning out the moving picture information pertinent to B-pictures furnished from the picture type separating means in the vertical direction, storage means for memorizing the moving picture information pertinent to I- and P-pictures furnished from the picture type separating means and the moving picture information pertinent to the thinned B-pictures furnished from the thinning means, as the reference picture information, first motion compensation means for motion compensating a macroblock of the reference picture information, motion-predicted in accordance with the motion prediction system associated with the interlaced scanning (field motion prediction mode), and second motion compensation means for motion compensating a macroblock of the reference picture information, motion-predicted in accordance with the motion prediction system associated with the sequential scanning (frame motion prediction mode). The inverse orthogonal transform means inverse orthogonal transforms four low-range coefficients in the horizontal direction and eight coefficients in the vertical direction in respective coefficients of the orthogonal transform block of the compressed picture information.

In this picture decoding apparatus, the inverse orthogonal transform means inverse orthogonal transforms the four low-range coefficients in the horizontal direction and eight coefficients in the vertical direction in the respective coefficients of the orthogonal transform block of the compressed picture information.

In still another aspect, the present invention provides a picture decoding method for decoding the moving picture information of a second resolution from the compressed picture information of a first resolution obtained on predictive encoding in terms of a pre-set pixel block (macroblock) as a unit and on orthogonal transform in terms of a pre-set pixel block (orthogonal transform block) as a unit, the second resolution being lower than the first resolution, wherein the picture decoding method includes inverse orthogonal transforming four low-range coefficients in the horizontal direction and eight coefficients in the vertical direction, in coefficients of orthogonal transform blocks of the orthogonal transformed compressed picture information, summing the inverse orthogonal transformed picture information to the motion compensated reference picture information to output the moving picture information of the second resolution, memorizing the output moving picture information as the reference picture information, motion compensating the macroblock of the reference picture information motion-predicted in accordance with the motion prediction system associated with interlaced scanning (field motion prediction system) and motion compensating the macroblock of the reference picture information motion-predicted in accordance with the motion prediction system associated with sequential scanning (frame motion prediction system).

In this picture decoding method, the four low-range coefficients in the horizontal direction and eight coefficients in the vertical direction, in the respective coefficients of the orthogonal transform block of the orthogonal transformed compressed picture information.

In still another aspect, the present invention provides a picture decoding method for decoding the moving picture information of a second resolution from the compressed picture information of a first resolution obtained on predictive encoding in terms of a pre-set pixel block (macroblock) as a unit and on orthogonal transform in terms of a pre-set pixel block (orthogonal transform block) as a unit, the second resolution being lower than the first resolution, the picture decoding method includes separating the compressed picture information of the first resolution into the compressed picture information pertinent to luminance signals and into the compressed picture information pertinent to chroma signals, inverse orthogonal transforming four low-range coefficients in the horizontal direction and eight coefficients in the vertical direction, in respective coefficients of the orthogonal transform blocks of the compressed picture information pertinent to the orthogonal transformed and separated luminance signals, summing the first transformed picture information pertinent to the inverse orthogonal transformed luminance signals to the motion compensated first reference picture information to output the moving picture information, memorizing the output moving picture information as the reference picture information, motion compensating a macroblock of the reference picture information motion-predicted in accordance with a motion prediction system associated with interlaced scanning (field motion prediction mode), motion compensating a macroblock of the reference picture information motion-predicted in accordance with a motion prediction system associated with sequential scanning (frame motion prediction mode), inverse orthogonal transforming four low range coefficients in the horizontal direction and four low range coefficients in the vertical direction, in respective coefficients of the orthogonal transform block of the compressed picture information pertinent to chroma signals orthogonal transformed in accordance with the orthogonal transform system associated with the interlaced scanning and subsequently separated, inverse orthogonal transforming coefficients of the totality of frequency components of the orthogonal transform block of the compressed picture information pertinent to chroma signals orthogonal transformed in accordance with the orthogonal transform system associated with the sequential scanning and subsequently separated, separating orthogonal transform blocks resulting from the inverse orthogonal transform into two pixel blocks associated with interlaced scanning, orthogonal transforming the two separated pixel blocks, inverse orthogonal transforming coefficients of low frequency components in the respective coefficients of the two orthogonal transformed pixel blocks, synthesizing the top and bottom fields obtained on inverse orthogonal transform, summing the compressed picture information pertinent to the inverse orthogonal transformed chroma signals and the motion compensated second reference picture information to output the moving picture information, memorizing the output moving picture information as the reference picture information, motion compensating the macroblock of the reference picture information motion-predicted in accordance with the motion prediction system associated with interlaced scanning (field motion prediction system) and motion compensating the macroblock of the reference picture information motion-predicted in accordance with the motion prediction system associated with sequential scanning (frame motion prediction system).

In this picture decoding method, four low-range coefficients in the horizontal direction and eight coefficients in the vertical direction, in the respective coefficients of the orthogonal transform block of the compressed picture information pertinent to the separated luminance signals. The four low-range coefficients in the horizontal and vertical directions, in the respective coefficients of the orthogonal transform block of the compressed picture information pertinent to chroma signals orthogonal transformed by the orthogonal transform system (field orthogonal transform mode) associated with the interlaced scanning system and subsequently separated, re inverse orthogonal transformed, whereas the coefficients of the totality of frequency components of the orthogonal transform block of the compressed picture information pertinent to chroma signals, orthogonal transformed by the orthogonal transform system (frame orthogonal transform mode) and subsequently separated, are inverse orthogonal transformed.

In still another aspect, the present invention provides a picture decoding method for decoding the moving picture information of a second resolution from the compressed picture information of a first resolution obtained on predictive encoding in terms of a pre-set pixel block (macroblock) as a unit and on orthogonal transform in terms of a pre-set pixel block (orthogonal transform block) as a unit, the second resolution being lower than the first resolution, wherein the picture decoding method includes analyzing the picture type of the compressed picture information of the first resolution and separating the compressed picture information of the first resolution into the compressed picture information pertinent to I- and P-pictures and into the compressed picture information pertinent to B-pictures, inverse orthogonal transforming four low-range coefficients in the horizontal direction and eight coefficients in the vertical direction, in the respective coefficients of the orthogonal transform block of the compressed picture information pertinent to orthogonal transformed and separated I- and P-pictures, summing the compressed picture information pertinent to the I- and P-pictures to the motion compensated first reference picture information to output the moving picture information, memorizing the output moving picture information as the reference picture information, motion compensating the macroblock of the reference picture information motion-predicted in accordance with the motion prediction system associated with the interlaced scanning (field motion prediction system), motion compensating the macroblock of the reference picture information motion-predicted in accordance with the motion prediction system associated with the sequential scanning (frame motion prediction system), inverse orthogonal transforming four low range coefficients in the horizontal direction and four low range coefficients in the vertical direction, in the respective coefficients of the orthogonal transform block of the compressed picture information pertinent to B-pictures orthogonal transform in accordance with the orthogonal transform system associated with the interlaced scanning and subsequently separated, inverse orthogonal transforming coefficients of the totality of frequency components of the orthogonal transform block of the compressed picture information pertinent to chroma signals orthogonal transform in accordance with the orthogonal transform system associated with the sequential scanning and subsequently separated, separating orthogonal transform blocks resulting from the inverse orthogonal transform into two pixel blocks associated with interlaced scanning, orthogonal transforming the two separated pixel blocks, inverse orthogonal transforming coefficients of low frequency components in the respective coefficients of the two orthogonal transformed pixel blocks, synthesizing the top and bottom fields obtained on inverse orthogonal transform, summing the compressed picture information pertinent to the inverse orthogonal transformed B-pictures and the motion compensated second reference picture information to output the moving picture information, memorizing the output moving picture information as the reference picture information, motion compensating the macroblock of the reference picture information motion-predicted in accordance with the motion prediction system associated with interlaced scanning (field motion prediction system) and motion compensating the macroblock of the reference picture information motion-predicted in accordance with the motion prediction system associated with sequential scanning (frame motion prediction system).

In this picture decoding method, four low-range coefficients in the horizontal direction and eight coefficients in the vertical direction, in the respective coefficients of the orthogonal transform block of the compressed picture information pertinent to the orthogonal transformed and separated I- and P-pictures are inverse orthogonal transformed. As for the respective coefficients of the orthogonal transform block of the compressed picture information pertinent to B-pictures, orthogonal transformed by the orthogonal transform system (field orthogonal transform mode) associated with the interlaced scanning system and subsequently separated, four low-range coefficients in the horizontal and vertical directions are inverse orthogonal transformed. The coefficients of the totality of the frequency components of the orthogonal transform block of the compressed picture information pertinent to chroma signals orthogonal transformed y the orthogonal transform system associated with the sequential scanning (frame orthogonal transform mode) and subsequently separated are inverse orthogonal transformed, the orthogonal transform block resulting from the inverse orthogonal transform are separated into two pixel blocks associated with the interlaced scanning system. The two separated pixel blocks are orthogonal transformed.

In still another aspect, the present invention provides a picture decoding method for decoding the moving picture information of a second resolution from the compressed picture information of a first resolution obtained on predictive encoding in terms of a pre-set pixel block (macroblock) as a unit and on orthogonal transform in terms of a pre-set pixel block (orthogonal transform block) as a unit, the second resolution being lower than the first resolution, wherein the picture decoding method includes analyzing the picture type of the compressed picture information of the first resolution and separating the compressed picture information of the first resolution into the compressed picture information pertinent to I- and P-pictures and into the compressed picture information pertinent to B-pictures, separating the compressed picture information of the first resolution into the compressed picture information pertinent to luminance signals and into the compressed picture information pertinent to chroma signals, inverse orthogonal transforming four low-range coefficients in the horizontal direction and eight coefficients in the vertical direction, in the respective coefficients of the orthogonal transform block of the compressed picture information pertinent to luminance signals of the orthogonal transformed and separated I- and P-pictures, summing the compressed picture information pertinent to luminance signals of the inverse orthogonal transformed I- and P-pictures to the motion compensated first reference picture information to output the moving picture information, memorizing the output moving picture information as the reference picture information, motion compensating a macroblock of the reference picture information motion-predicted in accordance with the motion prediction system associated with interlaced scanning (field motion prediction mode), motion compensating a macroblock of the reference picture information motion-predicted in accordance with the motion prediction system associated with sequential scanning (frame motion prediction mode), inverse orthogonal transforming four low-range horizontal and vertical directions in the coefficients of the orthogonal transform block of the compressed picture information pertinent to chroma signals of I- and P-signals and B-pictures orthogonal transformed in accordance with the orthogonal transform system associated with the interlaced scanning (field orthogonal transform mode) and subsequently separated, inverse orthogonal transforming coefficients of the totality of frequency components of the orthogonal transform block of the compressed picture information pertinent to B-pictures and chroma signals of the I- and P-pictures orthogonal transformed in the orthogonal transform system associated with the sequential scanning (frame orthogonal transform mode), and subsequently separated, separating the orthogonal transform block resulting from the inverse orthogonal transform into two pixel blocks associated with interlaced scanning, orthogonal transforming the two separated pixel blocks, inverse orthogonal transforming coefficients of the low frequency components of the orthogonal transformed two pixel blocks, synthesizing the inverse orthogonal transformed top and bottom fields, summing the compressed picture information pertinent to chroma signals of the inverse orthogonal transformed I- and P-pictures and B-pictures to output the moving picture information, memorizing the output moving picture information as the reference picture information, motion compensating a macroblock of the reference picture information motion-predicted in accordance with the motion prediction system associated with interlaced scanning (field motion prediction mode) and motion compensating a macroblock of the reference picture information motion-predicted in accordance with the motion prediction system associated with sequential scanning (frame motion prediction mode).

In this picture decoding method, four low-range coefficients in the horizontal direction and eight coefficients in the vertical direction, in the respective coefficients of the orthogonal transform block of the compressed picture information pertinent to luminance signals of the separated I- and P-pictures are inverse orthogonal transformed. As for the respective coefficients of the orthogonal transform block of the compressed picture information pertinent to chroma signals of the I- and P-pictures and B-pictures, orthogonal transformed by the orthogonal transform system (field orthogonal transform mode) associated with the interlaced scanning system and subsequently separated, four low-range coefficients in the horizontal and vertical directions are inverse orthogonal transformed. The coefficients of the totality of the frequency components of the orthogonal transform block of the compressed picture information pertinent to chroma signals of the I- and P-pictures and B-pictures, orthogonal transformed by the orthogonal transform system associated with the sequential scanning (frame orthogonal transform mode) and subsequently separated, are inverse orthogonal transformed.

In yet another aspect, the present invention provides a picture decoding method for decoding the moving picture information of a second resolution from the compressed picture information of a first resolution obtained on predictive encoding in terms of a pre-set pixel block (macroblock) as a unit and on orthogonal transform in terms of a pre-set pixel block (orthogonal transform block) as a unit, with the second resolution being lower than the first resolution, wherein the picture decoding method includes inverse orthogonal transforming four low-range coefficients in the horizontal direction and eight coefficients in the vertical direction, in respective coefficients of an orthogonal transform block of the orthogonal transformed compressed picture information, summing the inverse orthogonal transformed picture information to the motion compensated reference picture information to output the moving picture information of the second resolution, analyzing the picture type of the compressed picture information of the first resolution to separate the compressed picture information into the compressed picture information pertinent to I- and P-pictures and into the compressed picture information pertinent to B-pictures, thinning out the separated moving picture information pertinent to the B-pictures in the vertical direction, memorizing the moving picture information pertinent to the I- and P-pictures and the thinned moving picture information pertinent to B-pictures, separated from each other, as the reference picture information, motion compensating the macroblock of the reference picture information motion-predicted in accordance with the motion prediction system associated with the interlaced scanning (field motion prediction mode), and motion compensating the macroblock of the reference picture information motion-predicted in accordance with the motion prediction system associated with the sequential scanning (frame motion prediction mode).

In this picture decoding method, four low-range coefficients in the horizontal direction and eight coefficients in the vertical direction, in the respective coefficients of the orthogonal transform block of the orthogonal transformed compressed picture information, are inverse orthogonal transformed, while the moving picture information pertinent to the separated B-pictures are thinned out in the vertical direction.

In the picture decoding method and apparatus according to the present invention, in which IDCT is applied to four horizontal low-range coefficients and eight vertical coefficients of an orthogonal transform block, it is possible to prevent picture quality deterioration ascribable to interlaced scanning to reduce the processing volume and the storage capacity necessary for decoding an input bitstream.

Moreover, in the picture decoding method and apparatus according to the present invention, in which IDCT is applied to four horizontal low-range coefficients and eight vertical coefficients of luminance signals, it is possible to prevent picture quality deterioration ascribable to interlaced scanning to reduce the processing volume and the storage capacity necessary for decoding an input bitstream.

In the picture decoding method and apparatus according to the present invention, in which IDCT is applied only to four horizontal low-range coefficients of chroma signals, having such properties that picture quality deterioration is less perceptible to human eyes than with luminance signals, it is possible to further reduce the processing volume and the storage capacity necessary for decoding an input bitstream.

Moreover, in the picture decoding method and apparatus according to the present invention, in which IDCT is applied to four horizontal low-range coefficients and eight vertical coefficients referenced I- and p-pictures, it is possible to prevent picture quality deterioration due to drift noise ascribable to interlaced scanning to reduce the processing volume and the storage capacity necessary for decoding an input bitstream.

Moreover, in the picture decoding method and apparatus according to the present invention, in which IDCT is applied to four horizontal low-range coefficients and eight vertical coefficients of luminance signals of referenced I- and p-pictures, it is possible to prevent picture quality deterioration due to drift noise ascribable to interlaced scanning to reduce the processing volume and the storage capacity necessary for decoding an input bitstream.

In the picture decoding method and apparatus according to the present invention, in which IDCT is applied only to four horizontal low-range coefficients of non-referenced B-pictures it is possible to prevent picture quality deterioration due to drift noise ascribable to interlaced scanning to reduce the processing volume and the storage capacity necessary for decoding an input bitstream.

In the picture decoding method and apparatus according to the present invention, in which vertical thinning is applied to non-referenced B-pictures, it is possible to prevent picture quality deterioration due to drift noise ascribable to interlaced scanning to reduce the processing volume and the storage capacity necessary for decoding an input bitstream.

In addition, in the picture decoding method and apparatus according to the present invention, in which IDCT is applied only to four horizontal low-range coefficients of chroma signals of I- and P-pictures, having such properties that picture quality deterioration is less perceptible to human eyes than with luminance signals, and non-referenced B-pictures, it is possible to further reduce the processing volume and the storage capacity necessary for decoding an input bitstream.

BRIEF DESCRIPTION OF THE DRAWINGS

FIG. 3 illustrates processing contents of the decimating IDCT processing in the picture decoding apparatus according to the first embodiment of the present invention.

FIG. 6 consisting of FIGS. 6A through 6C, illustrates the interpolation processing in a motion compensation device for the frame mode in the picture decoding apparatus according to the first embodiment of the present invention.

DESCRIPTION OF THE PREFERRED EMBODIMENTS

Figure 1:
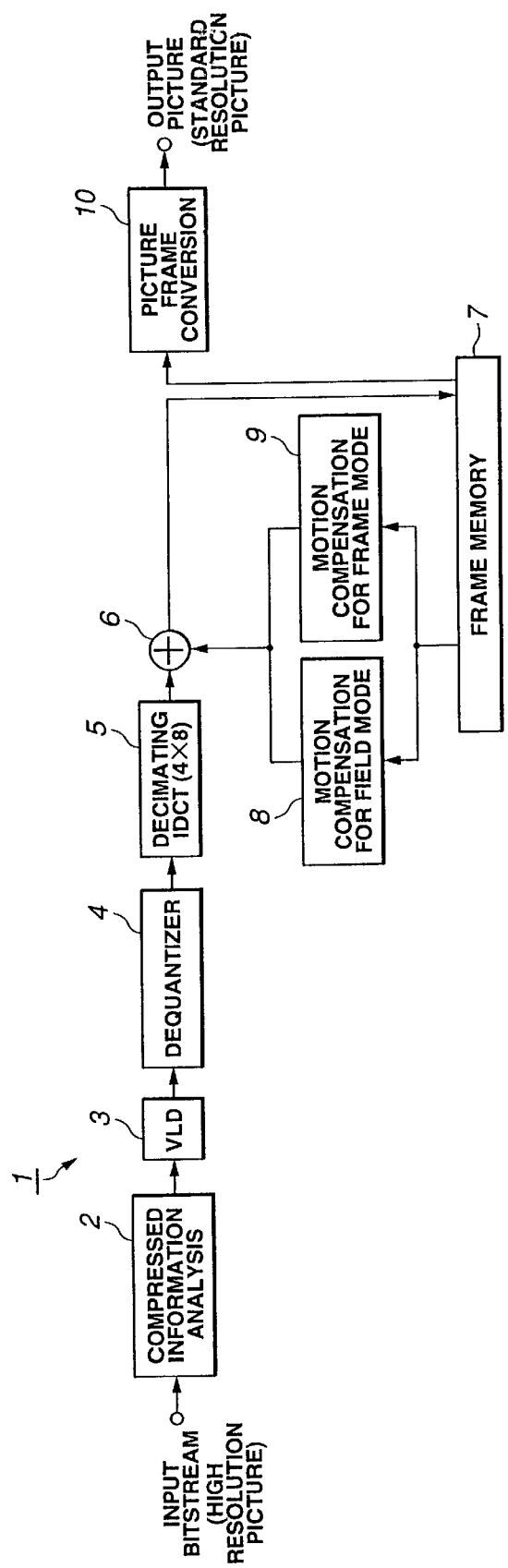
FIG. 1 is a block diagram showing a picture decoding apparatus according to a first embodiment of the present invention.

Referring to the drawings, a preferred first embodiment of the present invention will be explained in detail.

First, a picture decoding device according to a first embodiment of the present invention is explained.

A picture decoding device 1 of the first embodiment of the present invention is designed and constructed so that a bitstream obtained on compressing a high resolution picture with the number of effective lines in the vertical direction of, for example, 1152, by MPEG2 (Moving Picture Experts Group-2), is entered as an input, with the input bitstream being decoded and decimated to a resolution of 1/2 to output a standard resolution picture with the number of effective lines in the vertical direction of 576. FIG. 1 shows a picture decoding apparatus according to a first embodiment of the present invention.

The MPEG-2 is the system for compressing the picture information for coping with both the interlaced and progressive scanned pictures and both the standard resolution and high resolution pictures. In the following explanation of the embodiments of the present invention, a high resolution picture is termed an upper layer and a standard resolution picture is termed a lower layer. It is noted that, if a DCT block having 8×8 discrete cosine coefficients is inverse discrete cosine transformed, there result decoded data made up of 8×8 pixels. The processing of inverse discrete cosine transform processing and simultaneously reducing the resolution, such as decoding 8×8 discrete cosine coefficients to obtain decoded data made up of 4×4 pixels, is termed the decimating inverse discrete cosine transform.

This picture decoding device 1 includes a compressed information analysis unit 2, fed with a bitstream of a compressed high resolution picture and adapted for analyzing the input bitstream, and a variable length decoding unit 3 for decoding the bitstream, processed with variable length encoding of allocating a code length associated with the data occurrence frequency. The picture decoding device 1 also includes an inverse quantizer 4 for multiplying the coefficients of the DCT block with quantization steps and a decimating inverse discrete cosine transform unit 5 for decimating inverse discrete cosine transforming the DCT block discrete cosine transformed with the field DCT mode to generate a standard resolution picture. The picture decoding device 1 also includes an adder 16 for summing the decimating inverse discrete cosine transformed standard resolution picture to the motion compensated reference picture. The picture decoding device 1 also includes a frame memory 7 for temporarily storing the reference picture and a motion compensation unit for field mode 8 for motion compensating the reference picture stored in the frame memory 7 in meeting with the field motion predictive mode. The picture decoding device 1 also includes a motion compensation unit for frame mode 9 for motion compensating the reference picture stored in the frame memory 7 in meeting with the frame motion predictive mode, and a picture frame converting unit 10 for post-filtering a picture stored in the frame memory 17 for picture frame conversion and for correcting the dephasing of pixels for display on a television monitor etc.

The compressed information analysis unit 2 extracts the information necessary for the respective processing operations from the input bitstream of the high resolution picture, based on the syntax prescribed in MPEG-2, to route the extracted information, referred to below as the analysis result information, to the variable length decoding unit 3, along with the input bitstream.

The variable length decoding unit 3 variable length decodes the data, encoded as a difference value from the neighboring block, for the DC components of an intra-macroblock of the bitstream routed from the compressed information analysis unit 2, while variable length decoding the data encoded by runs and levels for the remaining coefficients, to produce quantized one-dimensional DCT coefficients. The variable length decoding unit 3 inverse-scans the one-dimensionally arrayed DCT coefficients, based on the information pertinent to the scanning system, contained in the analysis result information extracted from the compressed information analysis unit 2, to re-array the coefficients into quantized two-dimensional DCT coefficients. The variable length decoding unit 3 routes the two-dimensionally arrayed quantized DCT coefficients to the inverse quantizer 4.

The inverse quantizer 4 inverse quantizes the two-dimensionally arrayed quantized DCT coefficients, based on the information pertinent to the width and the matrix of quantization, included in the analysis result information. The inverse quantizer 4 routes the inverse quantized DCT coefficients to the decimating inverse discrete cosine transform unit 5.

Figure 2:
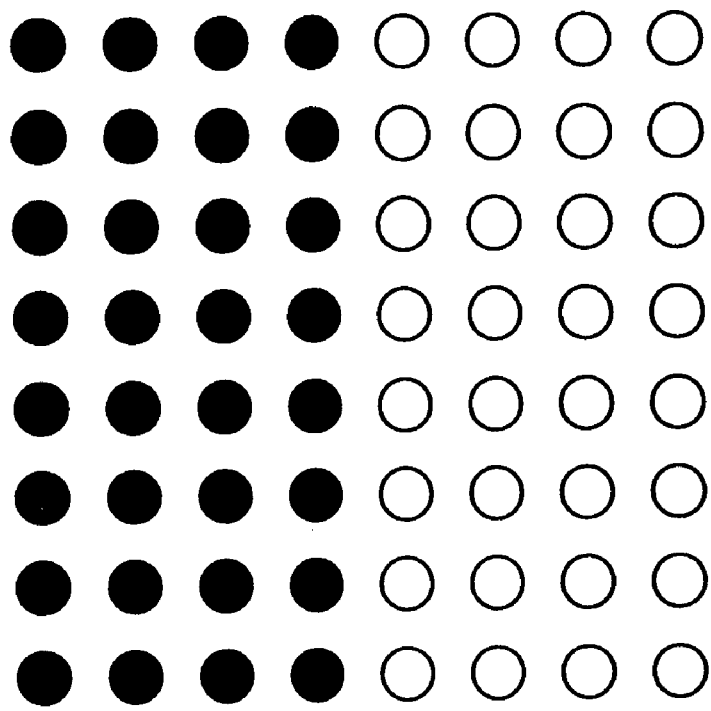
FIG. 2 illustrates the decimating IDCT processing in the picture decoding apparatus according to the first embodiment of the present invention.

The decimating inverse discrete cosine transform unit 5 performs IDCT on four low-range coefficients in the horizontal direction and eight coefficients in the vertical direction on the DCT block indicating 8×8 coefficients in a DCTed macroblock, as shown in FIG. 2. That is, the decimating inverse discrete cosine transform unit 5 executes decimating IDCT on the four coefficients in the horizontal direction on the low range side and eight coefficients in the vertical direction. Specifically, the decimating inverse discrete cosine transform unit 5 executes decimating IDCT, using a 4×8 matrix executing a DCT in the horizontal direction consisting of a transposed matrix of an order four IDCT matrix $iD_4^t$ and a zero-matrix $0_4$ of 4×4, and an 8×8 matrix executing the DCT in the vertical direction consisting of an order eight inverse DCT matrix $iD_8$, on the input quantized 8×8 DCT coefficients C, to yield 4×8 decoded pixel data, as shown in FIG. 3. In this decimating inverse discrete cosine transform unit 5, executing the above-described decimating IDCT, is able to decode the standard resolution picture in which each DCT block is made up of 4×8 pixels. Meanwhile, the decimating IDCT may be executed using the fast algorithm, as later explained, in both the horizontal and vertical directions.

If the macroblock, decimating-IDCTed by the decimating inverse discrete cosine transform unit 5, is an intra-picture, the intra-picture is directly stored by an adder 6 in the frame memory 7. If a macro-block, decimating inverse discrete cosine transformed by the decimating inverse discrete cosine transform unit 5, is an inter-picture, the adder 16 synthesizes the reference picture, motion compensated by the motion compensation unit for field mode 8 or by the motion compensation unit for frame mode 9, to the inter-picture, to store the synthesized picture in the frame memory 7.

Since the resolution in the horizontal direction is decimated by one half in the decimating inverse discrete cosine transform unit 5, it is sufficient if the memory capacity of the frame memory 7 is one-half the resolution proper to the bitstream input to the compressed information analysis unit 2.

The motion compensation unit for field mode 8 is used if the motion prediction mode for the macro-block is the field motion prediction mode. The motion compensation unit for field mode 8 interpolates the reference picture of the standard resolution picture stored in the frame memory 7, depending e.g., on the value of the motion vector in the input bitstream, by linear interpolation of one-half pixel precision in the vertical direction.

As for the horizontal direction, the motion compensation unit for field mode 8 creates pixels of approximately one-half pixel precision, with respect to the reference picture of the standard resolution picture stored in the frame memory 7, by a two-fold interpolation filter, such as a half-band filter, depending on the value of the motion vector in the input bitstream, to perform interpolation of approximately 1/4 pixel precision based on the so-created pixels. The reason is that, in the decimating inverse discrete cosine transform unit 5, the resolution of the input bitstream is decimated to 1/2.

For outputting pixel values of the same phase as the pixel supplied from the frame memory 7, as a predicted picture, using a half-band filter, fast calculation processing is feasible, because there is no necessity of executing product-sum processing in meeting with the number of taps. On the other hand, if a half-band filter is used, since the coefficient can be represented by x/2$^n$, it is possible to perform division necessary for filtering at high speed by shift processing. Alternatively, pixels necessary for motion compensation can be directly produced by four-fold interpolation filtering. In actuality, those coefficients which permit two-stage interpolation, executed by the two-fold interpolation filter and the linear interpolation, at a time, may be provided at the outset to perform the processing as if the interpolation is one-stage interpolation.

The motion compensation unit for field mode 8, performing the above-described processing, performs motion compensation in meeting with the field motion prediction mode. The reference picture, motion compensated by the motion compensation unit for field mode 8, is sent to the adder 6 for synthesis to an inter-picture.

The motion compensation unit for frame mode 9 is used if the motion prediction mode for the macro-block is the frame motion prediction mode. The motion compensation unit for frame mode 9 interpolates the reference picture of the standard resolution picture stored in the frame memory 7, depending e.g., on the value of the motion vector in the input bitstream, by linear interpolation of one-half pixel precision in the vertical direction.

As for the horizontal direction, the motion compensation unit for frame mode 9 creates pixels of approximately one-half pixel precision, with respect to the reference picture of the standard resolution picture stored in the frame memory 7, by a two-fold interpolation filter, such as a half-band filter, depending on the value of the motion vector in the input bitstream, to perform interpolation of approximately 1/4 pixel precision based on the so-created pixels.

For outputting pixel values of the same phase as the pixel supplied from the frame memory 7, as a predicted picture, using a half-band filter, fast calculation processing is feasible, because there is no necessity of executing product-sum processing in meeting with the number of taps. On the other hand, if a half-band filter is used, since the coefficient can be represented by x/2$^n$, it is possible to perform division necessary for filtering at high speed by shift processing. Alternatively, pixels necessary for motion compensation can be directly produced by four-fold interpolation filtering. In actuality, those coefficients which permit two-stage interpolation, executed by the two-fold interpolation filter and the linear interpolation, at a time, may be provided at the outset to perform the processing as if the interpolation is one-stage interpolation.

The motion compensation unit for frame mode 9, performing the above-described processing, performs motion compensation in meeting with the field motion prediction mode. The reference picture, motion compensated by the motion compensation unit for field mode 8, is sent to the adder 6 for synthesis to an inter-picture.

Figure 4:
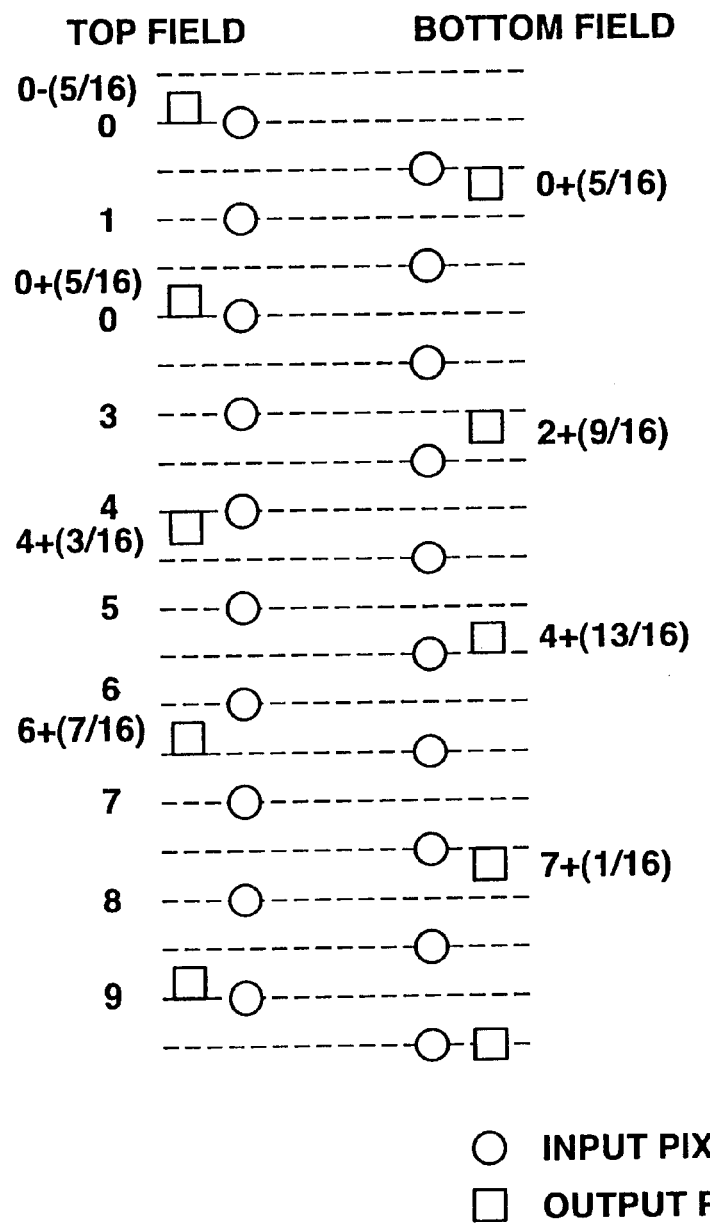
FIG. 4 illustrates the interpolation processing in a picture frame conversion device of the picture decoding apparatus according to the first embodiment of the present invention.

The picture frame conversion device 10, fed with the reference picture of the standard resolution, stored in the frame memory 7, or with the picture synthesized by the adder 6, corrects the picture by post-filtering for dephased components between the top and bottom fields, while converting the picture frame into conformity to the standard of the standard resolution television. For example, if the decimating inverse discrete cosine transform unit 5 is fed with a bitstream with the picture frame of 960×540 pixels, the unit 5 performs 4×8 IDCT on the bitstream to route the bitstream to the picture frame conversion device 10. If the picture frame conversion device 10 demonstrates the generated bitstream on a display with e.g., an aspect ratio of 16:9, it converts the bitstream with the picture frame of 960×540 pixels, into a bitstream with the picture frame of 720×480 pixels. So, in this case, the picture frame conversion device 10 has to diminish the numbers of horizontal and horizontal pixels with the picture frame of 960×540 pixels by 3/4 and 4/9, respectively. FIG. 4 shows that the phase relation between the input pixel and the output pixel arranged in the top field and that between the input pixel and the output pixel arranged in the bottom field. As shown in FIG. 4, the phases of the pixels of the top filed in the vertical direction are 0, 1, 2, . . . while those of the pixels of the bottom filed in the vertical direction are 0 are 1/2, 5/2, . . . , respectively. As for the output pixel, generated on interpolation in the vertical direction, the phases of the pixels of the top field in the vertical direction is 0–5/16, 1+5/1, . . . , while those of the bottom field in the vertical direction is 0+5/16, 2+9/16, . . . The picture frame conversion device 10 reduces the picture frame of the high resolution television by 1/4 to convert it into the picture frame of the standard resolution television.

The above-described picture decoding device 1 decodes a bitstream, compressed from the high resolution picture by MPEG-2, while reducing the resolution by 1/2 to output the standard resolution picture.

The motion compensation unit for field mode 8 and the motion compensation unit for frame mode 9 are explained in further detail.

First, the interpolation processing by the motion compensation unit for field mode 8 is explained. In this motion compensation unit for field mode 8, the pixels of the standard resolution picture, stored in the frame memory 7 are interpolated to generate pixels of 1/4 pixel precision.

For the pixels in the horizontal direction, pixels of 1/2 pixel precision are generated from the pixels of the integer precision, stored in the frame memory 7, using a two-fold interpolation filter. The motion compensation unit for field mode 8 generates pixels of 1/2 pixel precision, from the pixels of the 1/2 pixel precision using e.g., the linear interpolation filter, and then generates, using a linear interpolation filter, pixels of 1/4 pixel precision from the pixels of the 1/2 precision generated using the two-fold interpolation filter. The motion compensation unit for field mode 8 is able to output pixels of the standard resolution picture stored in the frame memory 7 as a reference picture corresponding to the high resolution picture without executing the product and sum operations corresponding to the number of taps. Thus, the motion compensation unit for field mode 8 is able to perform high speed processing. Moreover, this motion compensation unit for field mode 8 is able to perform high speed processing. In this motion compensation unit for field mode 8, the above processing can be performed using a sole matrix, while the pixels of 1/4 precision may be generated from the pixels of the integer precision using the four-fold interpolation filter.

Figures 5A, 5B, 5C:
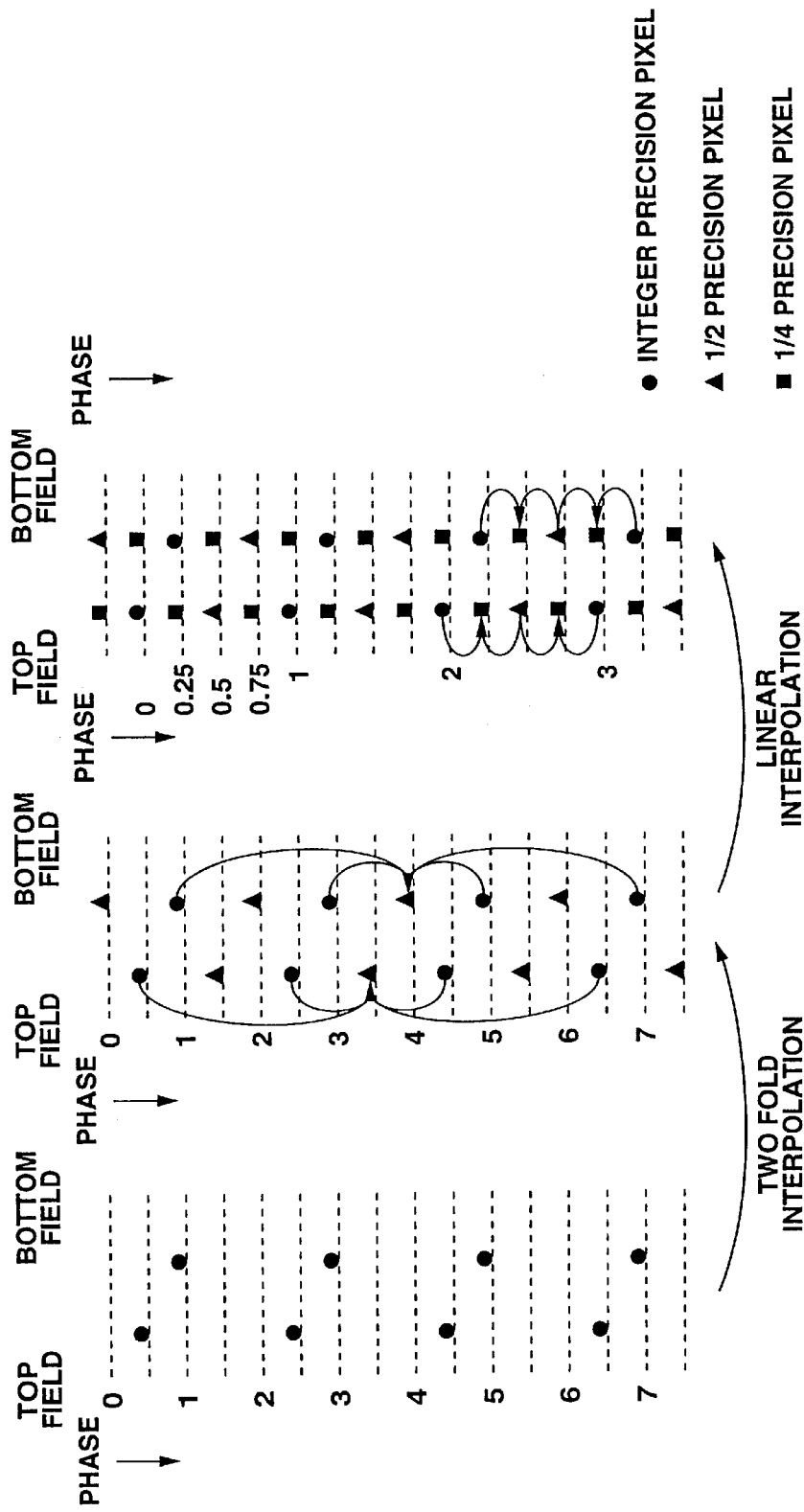
FIG. 5 consisting of FIGS. 5A through 5C, illustrates the interpolation processing in a motion compensation device for the field mode in the picture decoding apparatus according to the first embodiment of the present invention.

For the pixels in the vertical direction, pixels of the integer precision of the standard resolution picture, having dephasing between the top and bottom fields, such that the phases in the vertical direction of the pixels of the top field are 1/2, 5/2, . . , and the phases in the vertical direction of the pixels of the bottom field are 1, 3, . . . , are taken out from the frame memory 7, as shown in FIG. 5*a*.

Then, for the pixels in the vertical direction, pixels of 1/2 pixel precision are generated from the pixels of the integer precision, taken out from the frame memory 7 in the field, using a two-fold interpolation filter, such as a half-band filter, as shown in FIG. 6b. That is, pixels of 1/2 pixel precision of the top field are generated, based on the pixels of the top field of the integer precision, while the pixels of the 1/2 pixel precision of the bottom field are generated, based on the pixels of the integer precision of the bottom field. For example, the pixels of the top field at the 7/2 vertical phase position are generated on two-fold interpolation from the pixels of the top field at 1/2, 5/2, 9/2, 13/2, . . . positions, as shown in FIG. 5b. On the other hand, the pixels of the bottom field at the 4 vertical phase position are generated on two-fold interpolation from the pixels of the bottom field at 1, 3, 5, 7, . . .

Then, for the pixels in the vertical direction, pixels of 1/4 pixel precision are generated from the pixels of the 1/2 pixel precision, generated by a two-fold interpolation filter in the field, using a linear interpolation filter, as shown in FIG. 5c. That is, pixels of 1/4 pixel precision of the top field are generated, based on the pixels of the top field of the 1/2 pixel precision, while the pixels of the 1/4 pixel precision of the bottom field are generated, based on the pixels of the 1/2 pixel precision of the bottom field. For example, the pixels of the top field at the 9/4 vertical phase position are generated on linear interpolation from the pixels of the top field at 2 and 5/2 positions, as shown in FIG. 5c. On the other hand, the pixels of the bottom field at the 10/4 vertical phase position are generated on two-fold interpolation from the pixels of the bottom field at 9/4 and 11/4.

By performing interpolation in the vertical direction, pixels of the same phase as those of the standard resolution picture stored in the frame memory 7 can be output as a reference picture in meeting with the high resolution picture, in the motion compensation unit for field mode 8 employing a two-fold interpolation filter, such as a half-band filter, without executing the product sum processing corresponding to the number of taps. So, the motion compensation unit for field mode 8 is able to perform high speed processing. It is also possible for the motion compensation unit for field mode 8 to execute the above processing using a sole matrix or to generate 1/4 pixel precision from the pixels of the integer precision using the four-fold interpolation filter.

Next, the interpolation processing by the motion compensation unit for frame mode 9 is explained. In this motion compensation unit for frame mode 9, the pixels of the standard resolution picture, stored in the frame memory 7 are interpolated to generate pixels of 1/4 pixel precision, in order to cope with motion vector to the 1/2 pixel precision of the high resolution picture, aa will be explained subsequently.

For the pixels in the horizontal direction, pixels of 1/2 pixel precision are generated from the pixels of the integer precision, stored in the frame memory 7, using a two-fold interpolation filter. The motion compensation unit for frame mode 9 generates pixels of 1/2 pixel precision, using e.g., a half-band filter and, using a linear filter, then generates pixels of the 1/4 pixel precision from the pixels of the 1/2 precision generated using the two-fold interpolation filter. The motion compensation unit for frame mode 9 is able to output pixels of the standard resolution picture stored in the frame memory 7 as a reference picture corresponding to the standard resolution picture by employing a two-fold interpolation filter, such as a half-band filter, without executing the product and sum operations corresponding to the number of taps. Thus, the motion compensation unit for frame mode 9 is able to perform high speed processing. Moreover, this motion compensation unit for frame mode 9 is able to perform high speed processing. In this motion compensation unit for frame mode 9, the above processing can be performed using a sole matrix, while the pixels of 1/4 precision may be generated from the pixels of the integer precision using the four-fold interpolation filter.

For the pixels in the vertical direction, pixels of the integer precision of the standard resolution picture, having dephasing between the top and bottom fields, such that the phases in the vertical direction of the pixels of the top field are 1/2, 5/2, . . . , and the phases in the vertical direction of the pixels of the bottom field are 1, 3, . . . , as shown in FIG. 6a, are taken out from the frame memory 7, Then, for the pixels in the vertical direction, pixels of 1/2 pixel precision are generated from the pixels of the integer precision, taken out from the frame memory 7 in the field, using a two-fold interpolation filter, such as a half-band filter, as shown in FIG. 6b. That is, pixels of 1/2 pixel precision of the top field are generated, based on the pixels of the top field of the integer precision, while the pixels of the 1/2 pixel precision of the bottom field are generated, based on the pixels of the integer precision of the bottom field. For example, the pixels of the top field at the 7/2 vertical phase position are generated on two-fold interpolation from the pixels of the top field at 1/2, 5/2, 9/2, 13/2, . . . positions, as shown in FIG. 6b. On the other hand, the pixels of the bottom field at the 4 vertical phase position are generated on two-fold interpolation from the pixels of the bottom field at 1, 3, 5, 7, . . . .

Then, for the pixels in the vertical direction, pixels of 1/4 pixel precision are generated from the pixels of the 1/2 pixel precision, generated by a two-fold interpolation filter between the top and bottom fields, using a linear interpolation filter, as shown in FIG. 6c. For example, the pixels at the 1/4 vertical phase position are generated on linear interpolation from the pixels of the top field at the 0 position and from the pixels of the bottom field at the 1/2 position, as shown in FIG. 6c. The pixels at the 3/4 vertical phase position are generated on linear interpolation from the pixels of the bottom field at the 1/2 position and from the pixels of the top field at the 1 position.

By performing interpolation in the vertical direction, in this manner, pixels of the same phase as those of the standard resolution picture stored in the frame memory 7 can be output as a reference picture in meeting with the high resolution picture, in the motion compensation unit for frame mode 9 employing a two-fold interpolation filter, such as a half-band filter, without executing the product sum processing corresponding to the number of taps. So, the motion compensation unit for frame mode 9 is able to perform high speed processing. It is also possible to prevent so-called field inversion or field mixing to prevent deterioration in the picture quality, with there being no dephasing between the top and bottom fields. It is also possible for the motion compensation unit for frame mode 9 to execute the above processing using a sole matrix or to generate 1/4 pixel precision from the pixels of the integer precision using the four-fold interpolation filter.

With the picture information conversion device 1, according to the first embodiment of the present invention, as described above, in which IDCT is applied to four coefficients in the horizontal direction in the low frequency range and to eight coefficients in the vertical direction, it is possible to prevent deterioration in the picture quality ascribable to interlaced scanning to diminish the memory capacity and the volume of the calculation processing necessary for decoding the input bitstream.

Although the bitstream by MPEG-2 is input to the picture information conversion device 1, the bitstream input may also be a bitstream by e.g., MPEG-1 or H.263, provided that the bitstream has been encoded by orthogonal transform and motion compensation.

Referring to the drawings, a second embodiment of the present invention is now explained.

In the picture decoding device of the second embodiment of the present invention, similarly to the picture decoding device 1 of the above-described first embodiment, a bitstream corresponding to an interlaced scanned picture, as a high resolution picture with 1152 effective lines in the vertical direction, compressed by MPEG-2 (Moving Picture Experts Group-2), is input. This input bitstream is decoded and decimated to a resolution of 1/2 to output a standard resolution picture with 576 effective lines in the vertical direction. The picture decoding device according to the second embodiment of the present invention is shown in FIG. 7.

In the explanation of the picture decoding device 20, the same parts or components as those constituting the picture decoding device 1 of the first embodiment are not explained specifically.

Figure 7:
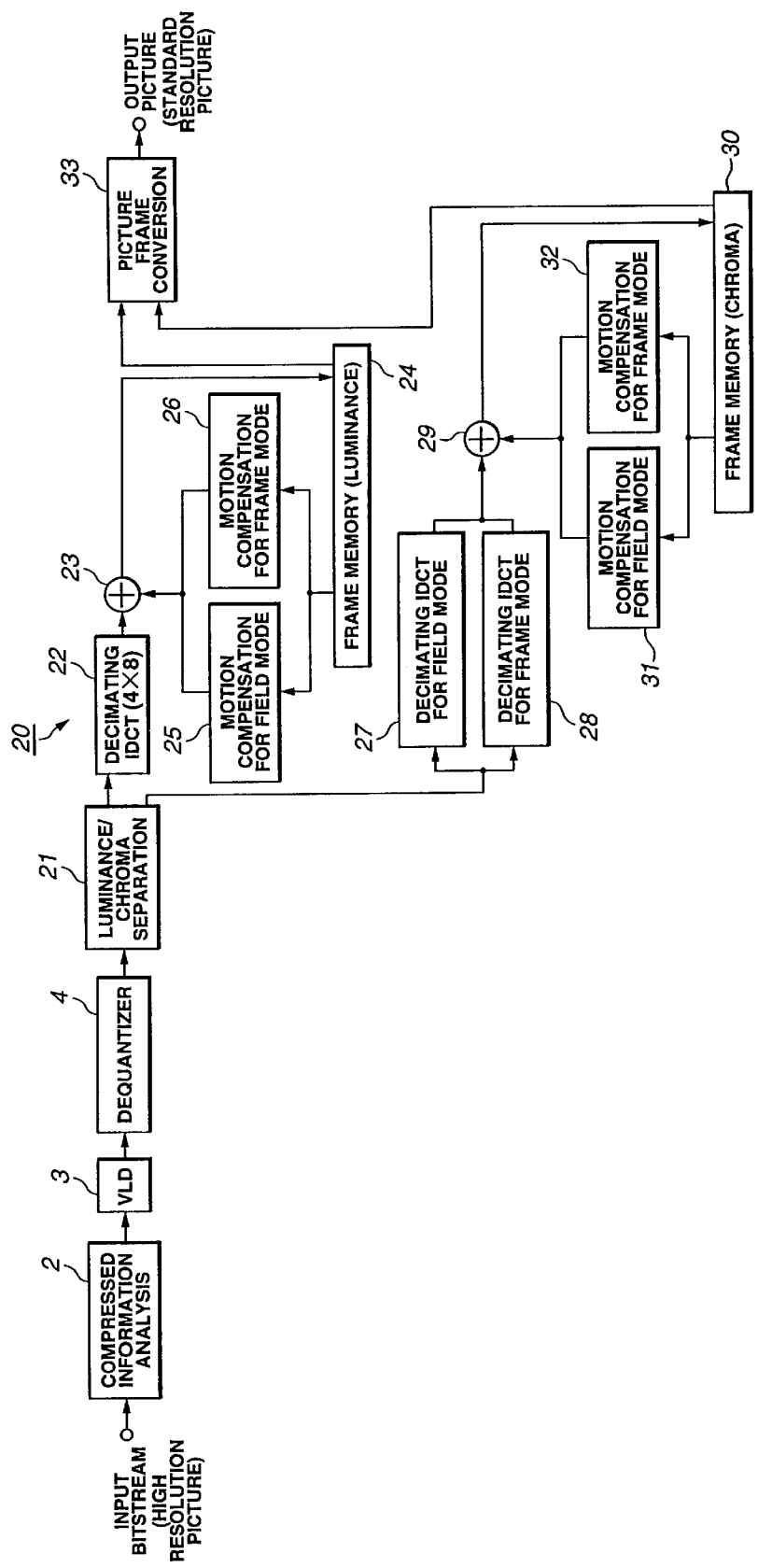
FIG. 7 is a block diagram showing a picture decoding apparatus according to a second embodiment of the present invention.

Referring to FIG. 7, this picture decoding device 20 includes a compressed information analysis unit 2, fed with a bitstream of a compressed high resolution picture and which is adapted for analyzing the input bitstream, and a variable length decoding unit 3 for decoding the bitstream, processed with variable length encoding of allocating a code length associated with the data occurrence frequency. The picture decoding device 20 also includes an inverse quantizer 4 for multiplying the coefficients of the DCT block with quantization steps, a luminance signal/chroma signal separating device 21 for separating the inverse quantized DCT coefficients into luminance and chroma signals, and a decimating inverse discrete cosine transform unit 22 for applying decimating IDCT to the DCTed blocks of the separated luminance signals to generate a standard resolution picture. The picture decoding device 20 also includes an adder 23 for summing the decimating IDCTed standard resolution picture to the motion-compensated reference picture, a frame memory 24 for transiently storing the reference picture, a motion compensation unit for field mode 25 for motion compensating the reference picture in meeting with the field motion prediction mode, and a motion compensation unit for frame mode 26 for motion compensating the reference picture stored in the frame memory 24 in meeting with the field motion prediction mode. The picture decoding device 20 also includes a decimating IDCT unit for field mode 27 for applying decimating IDCT to a DCT block of the separated chroma signals DCTed in the field DCT mode to generate a standard resolution picture, a decimating IDCT unit for frame mode 28 for applying decimating IDCT to a DCT block of the separated chroma signals DCTed in the frame DCT mode to generate a standard resolution picture, an adder 29 for summing the decimating-DCTed standard resolution picture to the motion-compensated reference picture, a frame memory 30 for transiently storing the reference picture, a motion compensation unit for field mode 31 for motion compensating the reference picture in meeting with the field motion prediction mode, and a motion compensation unit for frame mode 32 for motion compensating the reference picture stored in the frame memory 30 in meeting with the field motion prediction mode. The picture decoding device 20 also includes a picture frame converting unit 33 for post-filtering a picture stored in the frame memories 24, 30 for picture frame conversion and for correcting the dephasing of pixels for display on e.g., a television monitor.

The luminance signal/chroma signal separating device 21 separates DCT coefficients, inverse quantized by the inverse quantizer 4, into DCT coefficients for the luminance signals and those for the chroma signals. The luminance signal/chroma signal separating device 21 furnishes the DCT coefficients for the luminance signals to the decimating inverse discrete cosine transform unit 22, while furnishing those for the chroma signals to the decimating IDCT unit for field mode 27 or to the decimating IDCT unit for frame mode 28.

The decimating inverse discrete cosine transform unit 22 applies IDCT to the four coefficients in the horizontal direction for the low range and to the eight coefficients in the vertical direction in the DCTed macroblock of the luminance signals indicating 8×8 coefficients, as shown in FIG. 2. That is, the decimating inverse discrete cosine transform unit 22 applies decimating IDCT to the four coefficients in the horizontal direction for the low range and to the eight coefficients in the vertical direction. Specifically, the decimating inverse discrete cosine transform unit 22 executes decimating IDCT, using a 4×8 matrix executing a DCT in the horizontal direction consisting of a transposed matrix of an order four IDCT matrix $iD_4^t$ and a zero-matrix $0_4$ of 4×4, and an 8×8 matrix executing the DCT in the vertical direction consisting of an order eight inverse DCT matrix $iD_8$, on the input quantized 8×8 DCT coefficients C for luminance coefficients, to yield 4×8 decoded pixel data, as shown in FIG. 3. In this decimating inverse discrete cosine transform unit 22, executing the above-described decimating IDCT, is able to decode the standard resolution picture in which each DCT block is made up of 4×8 pixels.

If the macroblock, decimating IDCTed by the decimating inverse discrete cosine transform unit 5, is an intra-picture, the intra-picture is directly stored by the adder 23 in the frame memory 24. If a macro-block, decimating inverse discrete cosine transformed by the decimating inverse discrete cosine transform unit 22, is an inter-picture, the adder 23 synthesizes the reference picture, motion compensated by the motion compensation unit for field mode 25 or by the motion compensation unit for frame mode 26, to the inter-picture, to store the synthesized picture in the frame memory 24.

Since the resolution in the horizontal direction is decimated by one half in the decimating inverse discrete cosine transform unit 22, it is sufficient if the memory capacity of the frame memory 24 is one-half the resolution proper to the bitstream input to the compressed information analysis unit 2.

The motion compensation unit for field mode 25 is used if the motion prediction mode for the macro-block is the field motion prediction mode. The motion compensation unit for field mode 25 interpolates the reference picture of the standard resolution picture stored in the frame memory 24, depending e.g., on the value of the motion vector in the input bitstream, by linear interpolation of one-half pixel precision in the vertical direction.

As for the horizontal direction, the motion compensation unit for field mode 25 creates pixels of approximately one-half pixel precision, with respect to the reference picture of the standard resolution picture stored in the frame memory 24, by a two-fold interpolation filter, such as a half-band filter, depending on e.g., the value of the motion vector in the input bitstream, to perform interpolation of approximately 1/4 pixel precision based on the so-created pixels. The reason is that, in the decimating inverse discrete cosine transform unit 22, the resolution of the input bitstream is decimated to 1/2.

For outputting pixel values of the same phase as the pixel supplied from the frame memory 24, as a predicted picture, using a half-band filter, fast calculation processing is feasible, because there is no necessity of executing product-sum processing in meeting with the number of taps. On the other hand, if a half-band filter is used, since the coefficient can be represented by $x/2^n$, it is possible to perform division necessary for filtering at high speed by shift processing. Alternatively, pixels necessary for motion compensation can be directly produced by four-fold interpolation filtering. In actuality, those coefficients which permit two-stage interpolation, executed by the two-fold interpolation filter and the linear interpolation, at a time, may be provided at the outset to perform the processing as if the interpolation is one-stage interpolation.

The motion compensation unit for frame mode 32, performing the above-described processing, performs motion compensation in meeting with the field motion prediction mode. The reference picture, motion compensated by the motion compensation unit for field mode 25, is sent to the adder 23 for synthesis to an inter-picture.

The motion compensation unit for frame mode 26 is used if the motion prediction mode for the macro-block is the frame motion prediction mode. The motion compensation unit for frame mode 26 interpolates the reference picture of the standard resolution picture stored in the frame memory 24, depending e.g., on the value of the motion vector in the input bitstream, by linear interpolation of one-half pixel precision in the vertical direction.

As for the horizontal direction, the motion compensation unit for frame mode 26 creates pixels of approximately one-half pixel precision, with respect to the reference picture of the standard resolution picture stored in the frame memory 24, by a two-fold interpolation filter, such as a half-band filter, depending on e.g., the value of the motion vector in the input bitstream, to perform interpolation of approximately 1/4 pixel precision based on the so-created pixels.

For outputting pixel values of the same phase as the pixel supplied from the frame memory 30, as a predicted picture, using a half-band filter, fast calculation processing is feasible, because there is no necessity of executing product-sum processing in meeting with the number of taps. On the other hand, if a half-band filter is used, since the coefficient can be represented by $x/2^n$, it is possible to perform division necessary for filtering at a high speed by shift processing. Alternatively, pixels necessary for motion compensation can be directly produced by four-fold interpolation filtering. In actuality, those coefficients which permit two-stage interpolation, executed by the two-fold interpolation filter and the linear interpolation, at a time, may be provided at the outset to perform the processing as if the interpolation is one-stage interpolation.

The motion compensation unit for frame mode 26, performing the above-described processing, performs motion compensation in meeting with the field motion prediction mode. The reference picture, motion compensated by the motion compensation unit for frame mode 32, is sent to the adder 6 for synthesis to an inter-picture.

Figure 8:
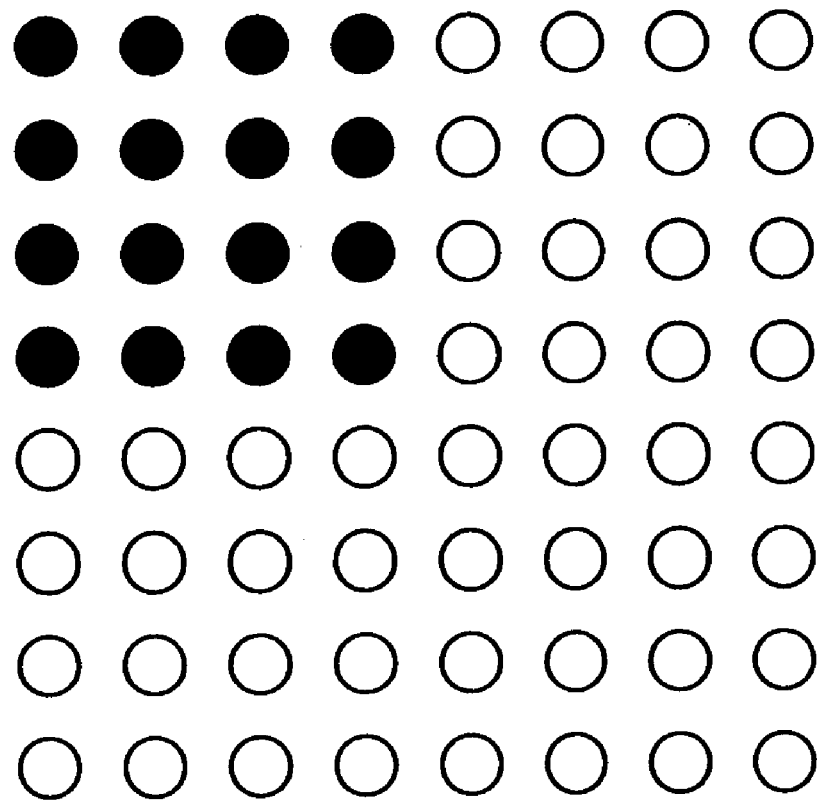
FIG. 8 illustrates the decimating IDCT processing in a field DCT mode of the picture decoding apparatus according to a second embodiment of the present invention.

The decimating inverse discrete cosine transform unit for field mode 27 is used if the macro-block of an input bitstream is discrete cosine transformed in the field DCT mode. The decimating inverse discrete cosine transform unit 27 for field mode performs inverse discrete cosine transform only on the low-range 4×4 coefficients of the DCT block, showing 8×8 coefficients in the macro-block discrete cosine transformed in the field DCT mode, as shown in FIG. 8. That is, the decimating inverse discrete cosine transform unit for field mode performs decimating inverse discrete cosine transform based on four point inverse discrete cosine coefficients in the horizontal direction and in the vertical direction. This decimating inverse discrete cosine transform unit for field mode 27 can decode the standard resolution picture, each DCT block of which is made up of 4×4 pixels, by the above-described decimating inverse discrete cosine transform. The phases of the pixels of the decoded picture data are 1/2, 5/2, . . . , in the vertical direction of the respective pixels of the top field, with the phases in the perpendicular direction of the respective pixels of the bottom field being 1, 3, . . . That is, in the top field of the decoded lower layer, the phase of the leading end pixel (pixel with the phase of 1/2) is intermediate between the first and second pixels (pixels with the phase 0 and the phase 2) as from the leading end of the top field of the upper layer, while the phase of the second pixel as from the leading end pixel (pixel with the phase of 2/5) is intermediate between the third and fourth pixels (pixels with the phase 4 and the phase 6) as from the leading end of the top field of the upper layer. On the other hand, in the bottom field of the decoded lower layer, the phase of the leading end pixel (pixel with the phase of 1) is intermediate between the first and second pixels (pixels with the phase 1 and the phase 3) as from the leading end of the bottom field of the upper layer, whereas the phase of the second pixel as from the leading end pixel (pixel with the phase of 3) is intermediate between the third and fourth pixels (pixels with the phase 5 and the phase 7) as from the leading end of the bottom field of the upper layer.

The decimating inverse discrete cosine transform unit for frame mode 28 is used when the macro-block of the input bitstream is discrete cosine transformed with the frame DCT mode. The decimating inverse discrete cosine transform unit for frame mode 15 performs decimating inverse discrete cosine transform on the DCT block showing 8×8 coefficients in the macro-block discrete cosine transformed in the frame DCT mode. The decimating inverse discrete cosine transform unit for frame mode 28 decodes the standard resolution picture, each DCT block of which is constituted by 4×4 pixels, while generating a picture of the same phase as the phase of the pixel of the standard resolution picture generated by the decimating inverse discrete cosine transform unit for field mode 27. That is, the phases in the perpendicular direction of the respective pixels of picture data decoded by the decimating inverse discrete cosine transform unit for frame mode 28 are such that the phases in the perpendicular direction of respective pixels of the top field are 1/2, 5/2, . . . , with the phases in the perpendicular direction of the respective pixels of the bottom field being 1, 3, . . . , as shown in FIG. 2.

The processing by the decimating inverse discrete cosine transform unit for frame mode 28 will be explained subsequently in detail.

If a macro-block decimating inverse discrete cosine transformed by the decimating inverse discrete cosine transform unit 27 or by the decimating inverse discrete cosine transform unit for frame mode 28 is an intra-picture, the adder 29 directly stores the intra-picture in the frame memory 30. If a macro-block decimating inverse discrete cosine transformed by the decimating inverse discrete cosine transform unit for field mode 27 or by the decimating inverse discrete cosine transform unit for frame mode 28 is an inter-picture, the adder 29 synthesizes the reference picture, motion compensated by the motion compensation unit for field mod 31 or by the motion compensation unit for frame mode 32, to the inter-picture, to store the synthesized picture in the frame memory 30.

The storage capacity of the frame memory corresponding to 1/4 of the resolution of the bitstream input to the compressed information analysis unit 2 suffices.

The motion compensation unit for field mode 31 is used if the motion prediction mode for the macro-block is the field motion prediction mode. The motion compensation unit for field mode 31 performs pixel interpolation, employing orthogonal transform, on the standard resolution reference picture stored in the frame memory 30, to perform motion compensation in keeping with the field motion prediction mode. The reference picture, motion compensated by the motion compensation unit for field mode 31, is sent to the adder 29 for synthesis to the inter-picture.

The motion compensation unit for frame mode 32 is used when the macro-block motion prediction mode is the frame motion prediction mode. The motion compensation unit for frame mode 32 performs pixel interpolation on the reference picture stored in the frame memory 30 to 1/4 pixel precision such as to take dephased components between the top and bottom fields into account. The reference picture, motion compensated by the motion compensation unit for frame mode 32, is routed to the adder 16 for synthesis to the inter-picture.

The picture frame converting unit 33 is fed with the standard resolution reference picture stored in the frame memory 30, or with the picture synthesized by the adder 29, and corrects the picture by post-filtering for phase deviation between the top and bottom fields, while converting the picture frame in meeting with the standard of the standard resolution television.

The picture decoding device 1 decodes the bitstream obtained on picture compression by MPEG-2 while lowering the resolution by one half to output a standard resolution picture.

The processing contents of the decimating inverse discrete cosine transform unit for frame mode 28 will be explained subsequently in further detail.

Meanwhile, the decimating inverse discrete cosine transform unit for frame mode 28 is able to perform one or both of the one-block processing or the two-block processing as now explained. It is possible with the decimating inverse discrete cosine transform unit for frame mode 28 to switch between the one-block processing and the two-block processing as the occasion may demand or to perform only one of the processings.

First, the one-block processing is explained. FIG. 3 illustrates the contents of the one-block processing.

Figure 10:
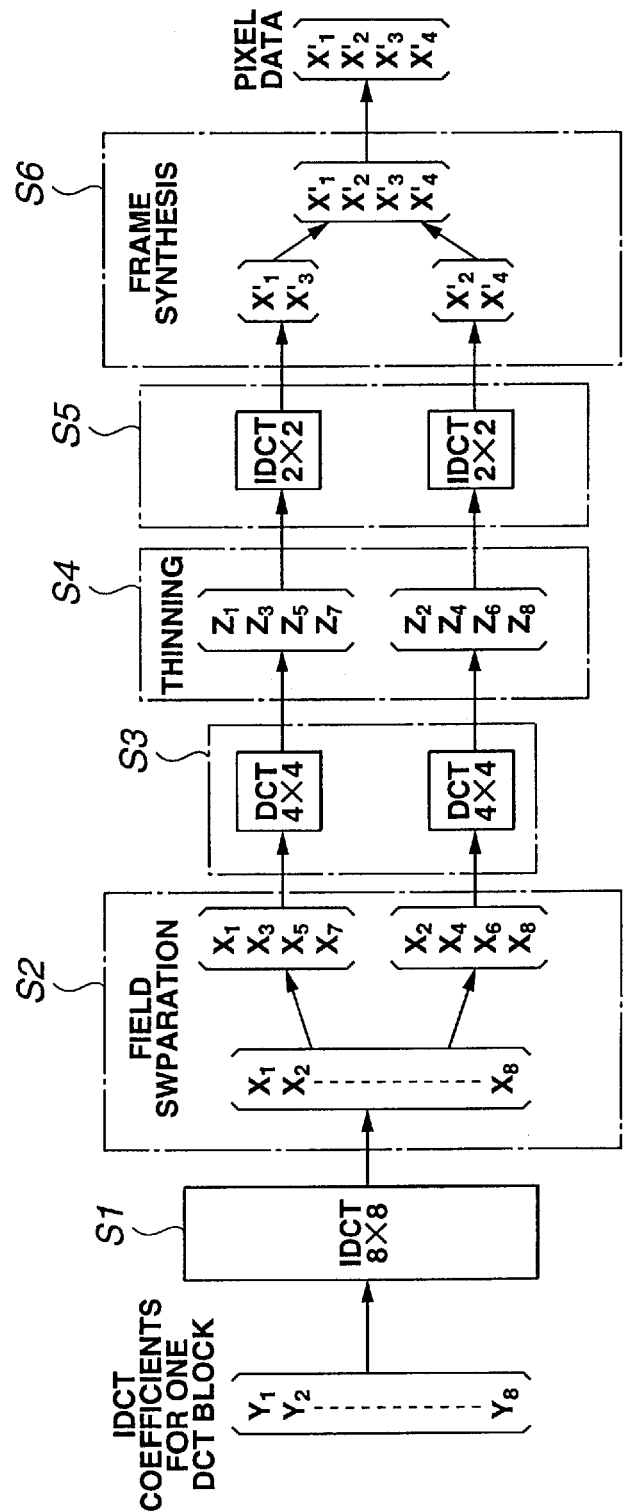
FIG. 10 illustrates the contents of one-block processing of the decimating IDCT device for frame mode of the picture decoding apparatus according to the second embodiment of the present invention.

The decimating inverse discrete cosine transform unit for frame mode 28 is fed with a bitstream, obtained on compression encoding a high resolution picture, in terms of a DCT block as a unit, as shown in FIG. 10.

First, at step S1, 8×8 inverse discrete cosine transform (IDCT 8×8) is performed on the discrete cosine coefficients y of the DCT block. The coefficients in the perpendicular direction, among the totality of the discrete cosine coefficients of the DCT block, are indicated as $y_1$ to $y_8$ in the drawing. By this inverse discrete cosine transform, 8×8 decoded pixel data x are produced. It is noted that pixel data in the perpendicular direction of the totality of pixel data of the DCT block are indicated as $x_1$ to $x_8$ in the drawing.

At the next step S2, the 8×8 pixel data are retrieved alternately on the line basis in the perpendicular direction, and are separated into two pixel blocks, namely a pixel block of the 4×4 top field in meeting with the interlaced scanning and a pixel block of the 4×4 bottom field in meeting with the interlaced scanning. That is, the pixel data $x_1$ on the first line, pixel data $x_3$ on the third line, pixel data $x_5$ on the fifth line and pixel data $x_7$ on the seventh line in the vertical direction are retrieved to generate a pixel block for the top field. On the other hand, the pixel data $x_2$ on the second line, pixel data $x_4$ on the fourth line, pixel data $x_6$ on the sixth line and pixel data $x_8$ on the eighth line in the vertical direction are retrieved to generate a pixel block for the bottom field. The processing for separating pixels of a DCT block into two pixel blocks in meeting with the interlaced scanning is referred to below as field separation.

Then, at step S3, each of the two pixel blocks, resulting from field separation, is processed with 4×4 discrete cosine transform (DCT 4×4).

Next, at step S4, high-frequency components of discrete cosine coefficients of the pixel block for the top field, obtained on 4×4 discrete cosine transform, are thinned out to give a pixel block made up of 2×2 discrete cosine coefficients. It is noted that discrete cosine coefficients in the perpendicular direction, among the totality of the coefficients of the pixel block for the top field, are shown as $z_1$, $z_3$, $z_5$ and $Z_7$ in the drawing. Also, high-frequency components of discrete cosine coefficients of the pixel block for the bottom field, obtained on 4×4 discrete cosine transform, are thinned out to give a pixel block made up of 2×2 discrete cosine coefficients. It is noted that discrete cosine coefficients in the perpendicular direction, among the totality of the coefficients of the pixel block for the bottom field, are shown as $z_2$, $Z_4$, $Z_6$ and $z_8$ in the drawing.

Then, at step S5, 2×2 inverse discrete cosine transform (IDCT 2×2) is performed on the pixel blocks, from which the discrete cosine coefficients of the high-frequency components have been thinned out. 2×2 decoded pixel data x' can be obtained on 2×2 inverse discrete cosine transform. The pixel data in the perpendicular direction, among the totality of pixel data of the pixel block of the top field are shown as $x'_1$ and $x'_3$, while the pixel data in the perpendicular direction, among the totality of pixel data of the pixel block of the bottom field, are shown as $x'_2$ and $x'_4$.

Then, at step S6, pixel data of the pixel block for the top field and pixel data of the pixel block for the bottom field are alternately synthesized along the perpendicular direction on the line basis to generate a DCT block. The processing of alternately synthesizing pixels of the two pixel blocks for the top and bottom fields along the perpendicular direction is referred to below as frame synthesis.

Figure 9:
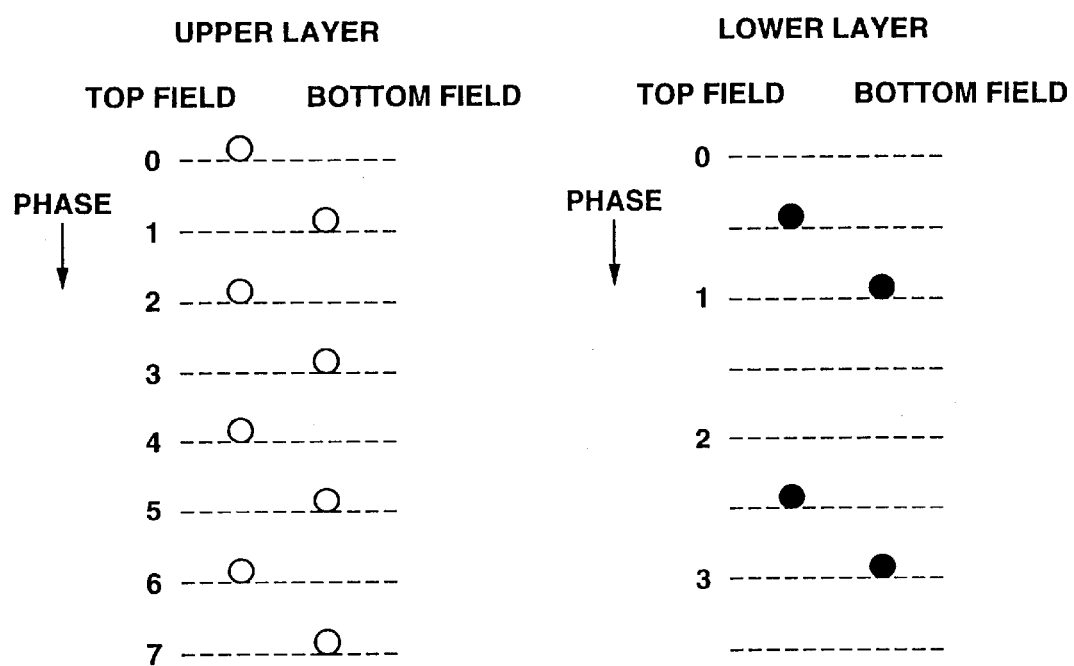
FIG. 9 illustrates the phase of pixels in the vertical direction of a reference picture stored in a frame memory of the picture decoding apparatus according to the second embodiment of the present invention.

By performing the one-block processing, shown in the above steps S1 to S6, the decimating inverse discrete cosine transform unit for frame mode 28 is able to generate a 4×4 DCT block, constituted by pixels of the same phase as the phase of the pixels of the standard resolution picture generated by the decimating inverse discrete cosine transform unit 27, as shown in FIG. 9.

On the other hand, the decimating inverse discrete cosine transform unit for frame mode 28 performs the one-block processing from the above steps S1 to S6 using a sole matrix. Specifically, the decimating inverse discrete cosine transform unit for frame mode 28 performs matrix processing on a matrix [FS'], shown in the following equations 1:

$$[FS'] = \frac{1}{\sqrt{2}} \begin{bmatrix} A & B & D & -E & F & G & H & I \\ A & -C & -D & E & -F & -G & -H & -J \\ A & C & -D & -E & -F & G & -H & J \\ A & -B & D & E & F & -G & H & -I \end{bmatrix} \quad (1)$$

obtained on expansion computations of the above processing using the addition theorem, and on discrete cosine coefficients ($y_1$ to $y_8$) of a sole DCT block to obtain pixel data x' ($x'_1$ to $x'_4$) of the decimating inverse discrete cosine transformed DCT block.

In the above equation (1), A to J are given as follows:

$$A = \frac{1}{\sqrt{2}}$$

$$D = \frac{1}{4}$$

$$H = \frac{1}{4} + \frac{1}{2\sqrt{2}}$$

$$B = \frac{\cos\frac{\pi}{16} + \cos\frac{3\pi}{16} + 3\cos\frac{5\pi}{16} - \cos\frac{7\pi}{16}}{4}$$

$$E = \frac{\cos\frac{\pi}{16} - \cos\frac{3\pi}{16} - 3\cos\frac{5\pi}{16} - \cos\frac{7\pi}{16}}{4}$$

$$I = \frac{\cos\frac{\pi}{16} - \cos\frac{3\pi}{16} + 3\cos\frac{5\pi}{16} + \cos\frac{7\pi}{16}}{4}$$

$$F = \frac{\cos\frac{\pi}{8} - \cos\frac{3\pi}{8}}{4}$$

$$C = \frac{\cos\frac{\pi}{16} - 3\cos\frac{3\pi}{16} - \cos\frac{5\pi}{16} - \cos\frac{7\pi}{16}}{4}$$

$$G = \frac{\cos\frac{\pi}{16} - 3\cos\frac{3\pi}{16} + \cos\frac{5\pi}{16} + \cos\frac{7\pi}{16}}{4}$$

$$J = \frac{\cos\frac{\pi}{16} + 3\cos\frac{3\pi}{16} - \cos\frac{5\pi}{16} + \cos\frac{7\pi}{16}}{4}$$

Figure 11:
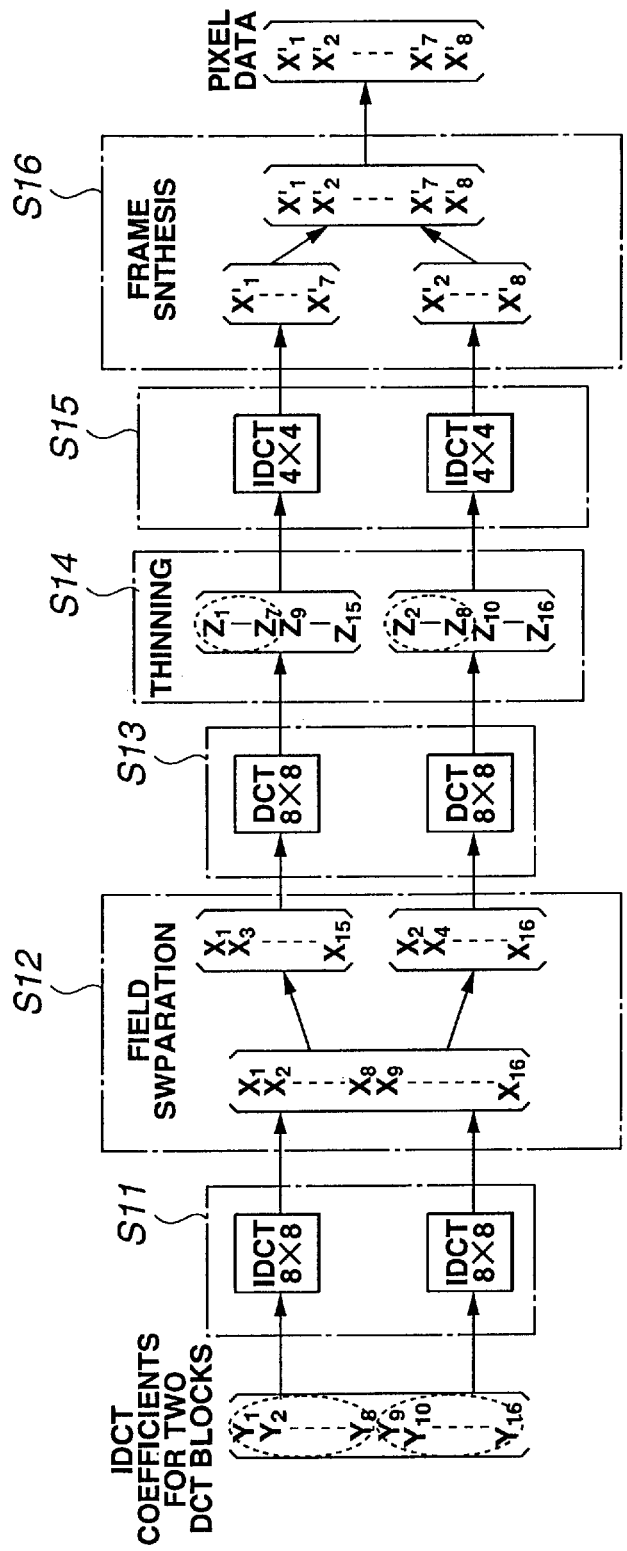
FIG. 11 illustrates the two-block processing of the decimating IDCT device for frame mode of the picture decoding apparatus according to the second embodiment of the present invention.

The two-block processing is now explained. FIG. 11 illustrates the contents of the two-block processing.

To the decimating inverse discrete cosine transform unit for frame mode 28, a bitstream obtained on compression encoding a high resolution picture is input in terms of two DCT blocks as a unit, as shown in FIG. 11. If, for example, a macro-block is made up of four DCT blocks of the luminance components and two DCT blocks of the chroma components, in accordance with the so-called 420 format, two DCT blocks of luminance components, neighboring to each other along the perpendicular direction, are input. If a macro-block is constituted as shown in FIG. 5, DCT blocks 0 and 2 of the luminance components (Y) are input as a pair, whilst DCT blocks 1 and 3 of the luminance components (Y) are also input as a pair.

First, at step S11, 8×8 inverse discrete cosine transform (IDCT 8×8) is executed independently on discrete cosine coefficients y of the two DCT blocks. The coefficients along the perpendicular direction, among the totality of the discrete cosine coefficients of the temporally previous DCT block, are indicated as $y_1$ to $y_8$, whilst the coefficients along the perpendicular direction, among the totality of the discrete cosine coefficients of the temporally previous DCT blocks, are indicated as $y_9$ to $y_{16}$. The inverse discrete cosine transform yields 8×8 decoded pixel data x. The pixel data along the perpendicular direction, among the totality of the pixel data of the temporally previous DCT block, are indicated as $x_1$ to $x_8$, whilst the pixel data along the perpendicular direction, among the totality of the pixel data of the temporally posterior DCT blocks, are indicated as $x_9$ to $x_{16}$.

Then, at step S12, 8×8 pixel data x of two DCT blocks are alternately retrieved on the line basis in the perpendicular direction for field separation into two blocks, namely an 8×8 pixel block of the top field for interlaced scanning and an 8×8 pixel block of the bottom field for interlaced scanning. That is, the pixel data $x_1$ on the first line, pixel data $x_3$ on the third line, pixel data $x_5$ on the fifth line and pixel data $x_7$ on the seventh line in the vertical direction are retrieved from the temporally previous DCT block, while the pixel data $x_9$ on the first line, pixel data $x_{11}$ on the second line, pixel data $x_{13}$ on the third line and pixel data $x_{15}$ on the fourth line in the vertical direction are retrieved from the temporally posterior DCT block to generate an 8×8 pixel block for the top field. On the other hand, the pixel data $x_2$ on the second line, pixel data $x_4$ on the fourth line, pixel data $x_6$ on the sixth line and pixel data $x_8$ on the eighth line in the vertical direction are retrieved from the temporally previous DCT block, while the pixel data $x_{10}$ on the second line, pixel data $x_{12}$ on the second line, pixel data $x_4$ on the fourth line, pixel data $x_6$ on the sixth line and pixel data $x_8$ on the eighth line in the vertical direction are retrieved from the temporally previous DCT block, while the pixel data $x_{10}$ on the second line, pixel data $x_{12}$ on the fourth line, pixel data $x_{14}$ on the sixth line and pixel data $x_{16}$ on the eighth line in the vertical direction are retrieved from the temporally posterior DCT block to generate an 8×8 pixel block for the bottom field.

Then, at step S13, 8×8 discrete cosine transform (DCT 8×8) is executed on each of the field-separated two 8×8 pixel blocks.

Then, at step S14, high-frequency components of discrete cosine coefficients z of the pixel blocks for the top field, obtained on 8×8 discrete cosine transform, are thinned out at step S14 to constitute a pixel block constituted by 4×4 discrete cosine coefficients. The discrete cosine coefficients in the perpendicular direction, among the totality of the coefficients of the pixel blocks for the top field, are indicated as $z_{z1}$, $z_3$, $z_5$, $z_7$, $z_9$, $Z_{11}$, $z_{13}$, $Z_{15}$. Also, high-frequency components of discrete cosine coefficients z of the pixel blocks for the bottom field, obtained on 8×8 discrete cosine transform, are thinned out to constitute a pixel block constituted by 4×4 discrete cosine coefficients. The discrete cosine coefficients in the perpendicular direction, among the totality of the coefficients of the pixel blocks for the bottom field, are indicated as $z_2$, $z_4$, $z_6$, $z_8$, $z_{10}$, $z_{12}$) $z_{14}$, $z_{16}$.

Then, at step S15, 4×4 inverse discrete cosine transform (IDCT 4×4) is performed on each of the 4×4 pixel blocks, from which the discrete cosine coefficients of the high-frequency components have been thinned out. 2×2 decoded pixel data x' can be obtained on 2×2 inverse discrete cosine transform, to yield 4×4 decoded pixel data x'. The pixel data in the perpendicular direction, among the totality of pixel data of the pixel block of the top field, are shown as $x'_1$, $x'_3$, $x'_5$ and $x'_7$, while the pixel data in the perpendicular direction, among the totality of pixel data of the pixel block of the bottom field, are shown as $x'_2$, $x'_4$, $x'_6$ and $x'_8$.

Next, at step S16, pixel data of the pixel block for the top field and pixel data of the pixel block for the bottom field are alternately frame-synthesized on the line basis in the perpendicular direction to generate a decimating inverse discrete cosine transformed DCT block made up of 8×8 pixel data.

By executing the two-block processing as shown by the above steps S11 to S16, the decimating inverse discrete cosine transform unit for frame mode 28 is able to generate a DCT block constituted by pixels of the same phase as the phase of the pixels of the standard resolution picture generated by the decimating inverse discrete cosine transform unit 14 as shown in FIG. 9.

The decimating inverse discrete cosine transform unit for frame mode 15 also executes the two-block processing from the above step S11 up to the step S16 using a sole matrix. Specifically, the decimating inverse discrete cosine transform unit for frame mode 15 performs matrix processing on a matrix [FS"], indicated by the following equation (2):

$$[FS''] = \frac{1}{8\sqrt{2}}[A \quad B \quad C \quad D] \quad (2)$$

obtained on expansion computation of the above processing using an addition theorem, and discrete cosine coefficients y ($y_1$ to $y_{16}$) of two DCT blocks, to obtain pixel data x'($x'_1$ to $x'_8$) of the reducing inverse discrete cosine transformed DCT block.

In the equation 2), A to D denote the following:

In the above equation (2), a to g are defined as follows:

$$a = \cos\frac{\pi}{4}$$

$$b = \cos\frac{\pi}{8}$$

$$c = \cos\frac{3\pi}{8}$$

$$d = \cos\frac{\pi}{16}$$

$$e = \cos\frac{3\pi}{16}$$

$$f = \cos\frac{5\pi}{16}$$

$$g = \cos\frac{7\pi}{26}$$

Figure 12:
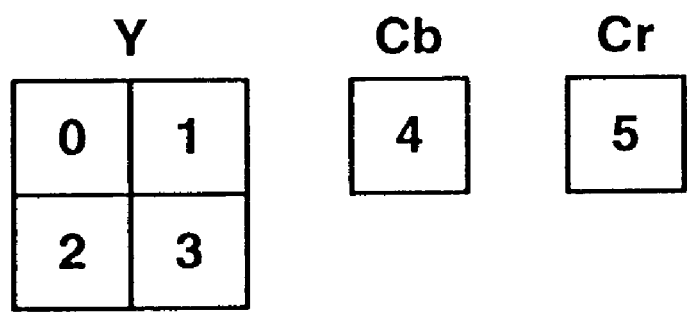
FIG. 12 illustrates a DCT block of luminance and chroma components in a macroblock of the 420 format.

If, in the decimating inverse discrete cosine transform unit for frame mode 28, a so-called 420-format macro-block shown in FIG. 12 is input, two-block processing as indicated by the above steps S11 to S16 is executed on the luminance components by way of performing a decimating inverse discrete cosine transform, while one-block processing as indicated by the above steps S1 to S6 is executed on the chroma components by way of performing a decimating inverse discrete cosine transform.

A

| | | | |
|---|---|---|---|
| 4a + 3d − e + f + g | 1 + a + 2b − c + d + e + 3f − g | 1 + d + 2 − f + g | −2a + 2b + c − d + e + f + g |
| 4a + 3d − e + f + g | 2 − a + b − d + 3e + f + g | −1 − d + e − f + g | −b + d − e − f − g |
| 4a + d + e + f + g | −a − b + d − 3e − f − g | −1 − d − 3e + f + g | −b + 2c − d + e + f + g |
| 4a + d + e + f + g | −1 − a − 3c − d − e − 3f + g | 1 + d − e − f − 3g | −2a + 2b + c + d − e − f − g |
| 4a − d − e − f − g | a + b + d − 3e − f − g | −1 + d + 3e − f − g | b − 2c − d + e + f + g |
| 4a − d − e − f − g | 1 + a + 3c − d − e − 3f + g | 1 − d + e + f + 3g | 2a − 2b − c + d − e − f − g |
| 4a − 3d + e − f − g | −1 − a − 2b + c + d + e + 3f − g | 1 − d − e + f − g | 2a − 2b − c − d + e + f + g |
| 4a − 3d + e − f − g | −2 + a − b − d + 3e + f + g | −1 + d − e + f − g | b + d − e − f − g |

B

| | | | |
|---|---|---|---|
| 2b − 2c − d + e + f + 3g | −1 + 2a + b + d − e + f + g | 1 + 2a + d + e + f − g | 1 + a + b − 2c + d − e + 3f + g |
| −2b + 2c + d − e − f − 3g | −1 − 2a + 3c − d + e − f − g | −1 − 2a − d − e − f − g | −a − 2b − c − d − 3e + f − g |
| −2b + 2c − d + e − f + g | −1 − 2a + 2b − c + d − e + f + g | −1 − 2a + d + e + 3f + g | 2 − a + 2b + c + d + 3e − f + g |
| 2b − 2c + d − e + f − g | 1 − 2a + b − d + e − f − g | 1 + 2a + 3d − e + f + g | −1 − a − b − d + e − 3f − g |
| −2b + 2c + d − e + f − g | 1 + 2a − 2b + c + d − e + f + g | −1 − 2a − d + e + 3f − g | −2 + a − 2b − c + d + 3e − f + g |
| 2b − 2c − d + e − f + g | −1 + 2a − b − d + e − f − g | 1 + 2a − 3d + e − f − g | 1 + a + b − d + e − 3f − g |
| 2b − 2c + d − e − f − 3g | 1 − 2a − b + d − e + f + g | 1 + 2a − d − e − f + g | −1 − a − b + 2c + d − e + 3f + g |
| −2b + 2c − d + e + f + 3g | 1 + 2a − 3c − d + e − f − g | −1 − 2a + d + e + f + g | a + 2b + c − d − 3e + f − g |

C

| | | | |
|---|---|---|---|
| 4a − 3d + e − f − g | 2 − a + b + d − 3e − f − g | −1 + d − e + f − g | −b − d + e + f + g |
| 4a − 3d + e − f − g | 1 + a + 2b − c − d − e − 3f + g | −1 − 2a + d + e + f + g | −2a + 2b + c + d − e − f − g |
| 4a − d + e − f − g | −1 − a − 3c + d + e + 3f − g | 1 − d + e + f + 3g | −2a + 2b + c − d + e + f + g |
| 4a − d + e − f − g | −a − b − d + 3e + f + g | −1 + d − 3e − f − g | −b + 2c + d − e − f − g |
| 4a + d + e + f + g | 1 + a + 3e + d + e + 3f − g | +d − e − f − 3g | 2a − 2b − c + d + e + f + g |
| 4a + d + e + f + g | a + b − d + 3e + f + g | −1 − d − 3e + f + g | b − 2c + d − e − f − g |
| 4a + 3d − e + f + g | −2 + a − b + d − 3e − f − g | −1 − d + e − f + g | b − d + e + f + g |
| 4a + 3d − e + f + g | −1 − a − 2b + c − d − e − 3f + g 1 + d + e − f + g | | 2a − 2b − c + d − e − f − g |

D

| | | | |
|---|---|---|---|
| −2b + 2c − d + e + f + 3g | −1 − 2a + 3c + d − e + f + g | −1 − 2a + d + e + f + g | −a − 2b − c + d + e3 − f + g |
| 2b − 2c + d − e − f − 3g | −1 + 2a + b − d + e − f + g | 1 + 2a − d − e − f + g | 1 + a + b − 2c − d + e − 3f − g |
| 2b − 2c − d + e − f + g | 1 − 2a + b + d − e + f + g | 1 + 2a − 3d + e − f − g | −1 − a − b + d − e + 3f + g |
| −2b + 2c + d − e + f − g | −1 − 2a + 2b − c − d + e − f − g | −1 − 2a + d + e + 3f − g | 2 − a + 2b + c − d − 3e + f + g |
| 2b − 2c + d − e + f − g | −1 + 2a − b − d + e + f + g | 1 + 2a + 3d − e + f + g | 1 + a + b + d − e + 3f + g |
| −2b + 2c − d + e − f + g | 1 + 2a − 2b + c − d + e − f − g | −1 − 2a + d − e − 3f + g | −2 + a − 2b − c − d − 3e + f − g |
| −2b + 2c − d + e − f − 3g | 1 + 2a − 3c + d − e + f + g | −1 − 2a − d − e − f − g | a + 2b + c + d + 3e − f + g |
| 2b − 2c − d + e + f + 3g | 1 − 2a − b − d + e − f − g | 1 + 2a + d + e + f − g | −1 − a − b + 2c + d + e − 3f − g |

In the above-described picture decoding device 20, according to the second embodiment of the present invention, 4×4 decimating IDCT is applied to each of the top and bottom fields for the field DCT mode for chroma signals, thereby decoding a standard resolution picture, while performing frame separation for the frame DCT mode to perform decimating IDCT to decode the standard resolution picture. Since the different operations are performed for the field DCT mode and for the frame DCT mode, in this picture decoding device 20, the properties owned by the interlaced pictures are not lost. Moreover, since the pictures decoded in the field DCT mode and in the frame DCT mode can be equated in phase, the output picture is not deteriorated in picture quality.

In the picture decoding device 20, 4×4 decimating IDCT by the decimating IDCT device for field mode 27 and the decimating IDCT by the decimating IDCT device for frame mode 28 by one block at steps S1 to S6 may be executed by fast algorithms.

For example, the processing speed can be enhanced by employing the Wang algorithm (Zhong D E Wang., "Fast Algorithms for the Discrete W Transform and for the Discrete Fourier Transform", IEEE Tr. ASSP-32, No. 4, predicted upper-order picture. 803 to 816, Aug. 1984).

The matrix used by the decimating inverse discrete cosine transform unit 14 for processing may be resolved by the Wang algorithm as indicated by the following equation (3):

$$[C_d^{II}]^{-1} = [C_d^{III}] = \frac{1}{\sqrt{2}} \begin{bmatrix} 1 & 0 & 0 & 1 \\ 0 & 1 & 1 & 0 \\ 0 & 1 & -1 & 0 \\ 1 & 0 & 0 & -1 \end{bmatrix} \quad (3)$$

$$\begin{bmatrix} C_2^{III} & \\ & \overline{C}_2^{IV} \end{bmatrix} \begin{bmatrix} 1 & 0 & 0 & 1 \\ 0 & 0 & 1 & 0 \\ 0 & 0 & 0 & 1 \\ 0 & 1 & 0 & 0 \end{bmatrix}$$

$$[C_2^{III}] = [C_d^{II}]^T = \begin{bmatrix} \frac{1}{\sqrt{2}} & \frac{1}{\sqrt{2}} \\ \frac{1}{\sqrt{2}} & -\frac{1}{\sqrt{2}} \end{bmatrix}$$

$$= \frac{1}{\sqrt{2}} \begin{bmatrix} 1 & 1 \\ 1 & -1 \end{bmatrix}$$

$$C_r = \cos(r\pi)$$

$$[\overline{C}_2^{IV}] = \begin{bmatrix} -C_{\frac{1}{8}} & C_{\frac{9}{8}} \\ C_{\frac{9}{8}} & C_{\frac{1}{8}} \end{bmatrix}$$

$$= \begin{bmatrix} 1 & 0 & -1 \\ 0 & 1 & 1 \end{bmatrix} \begin{bmatrix} -C_{\frac{1}{8}} + C_{\frac{9}{8}} & 0 & 0 \\ 0 & C_{\frac{1}{8}} + C_{\frac{9}{8}} & 0 \\ 0 & 0 & C_{\frac{9}{8}} \end{bmatrix} \begin{bmatrix} 1 & 0 \\ 0 & 1 \\ 1 & -1 \end{bmatrix}.$$

Figure 13:
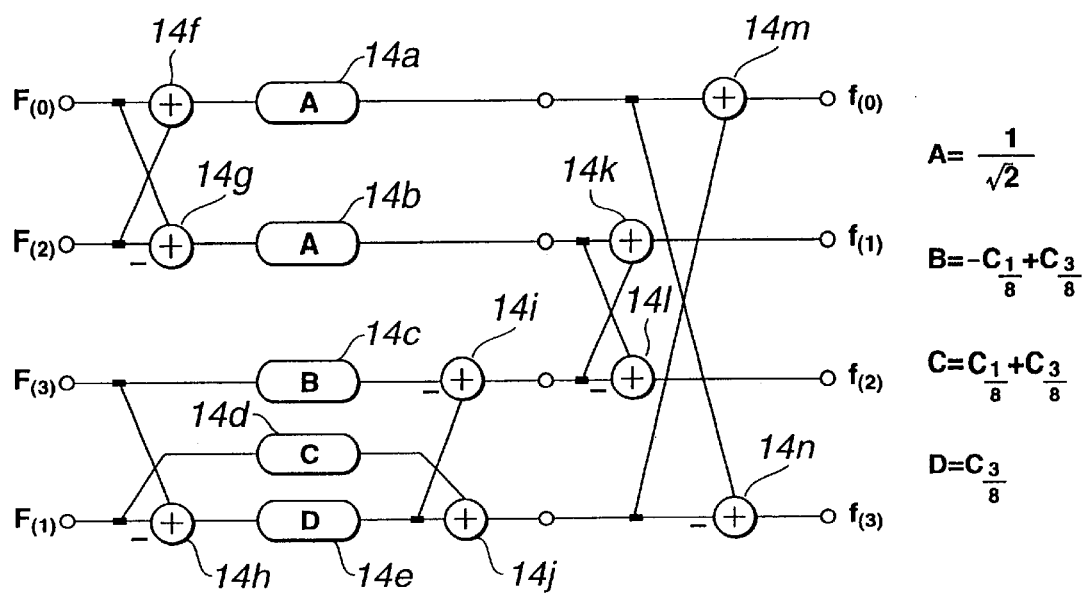
FIG. 13 illustrates a processing flow in case of application o the Wang's algorithm to the processing by a decimating IDCT device for a field mode of the picture decoding apparatus according to the second embodiment of the present invention.
Figure 14:
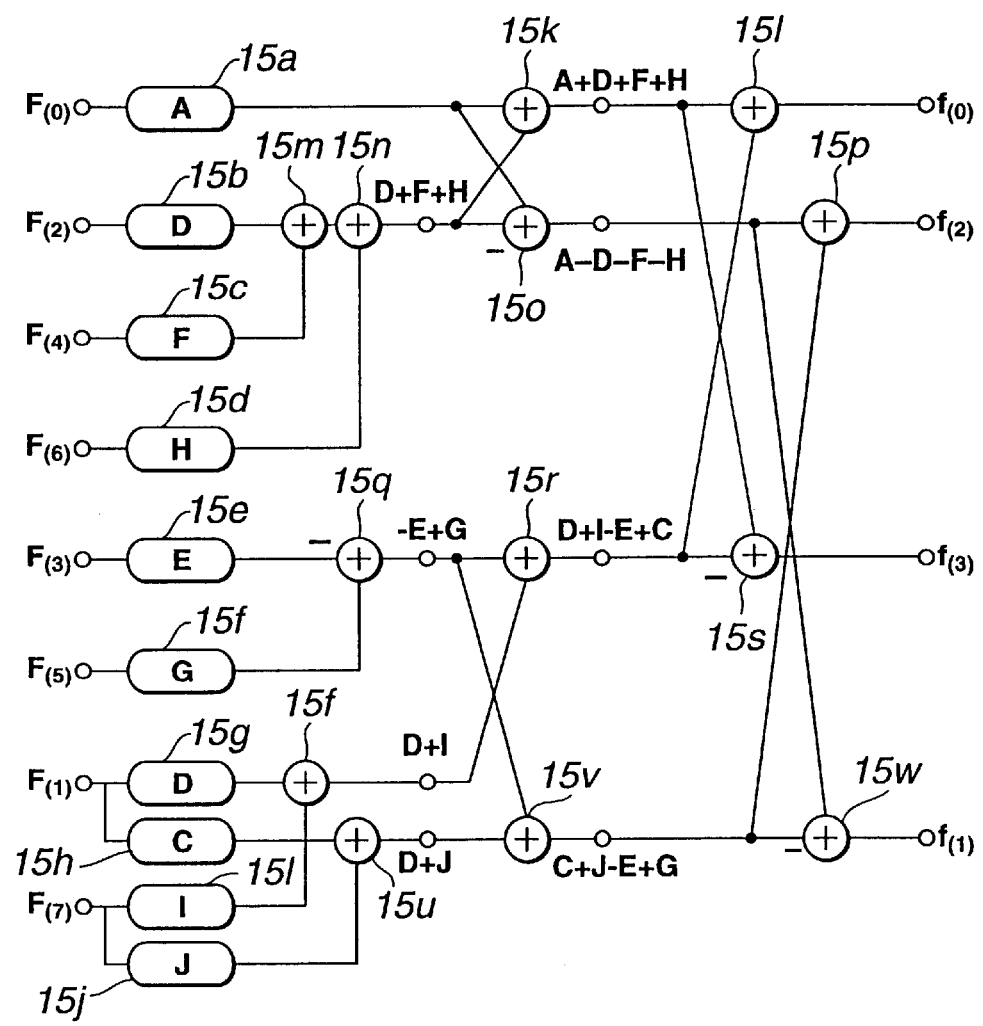
FIG. 14 shows a processing flow in case of application o the Wang's algorithm to the processing by a decimating IDCT device for a frame mode of the picture decoding apparatus according to the second embodiment of the present invention.

FIG. 13 shows the processing flow in the case of applying the Wang algorithm to the processing by the decimating inverse discrete cosine transform unit 1 for field mode 27 As may be seen form this processing flow, a high processing speed can be realized using first to fifth multipliers 14a to 14e and first to ninth adders 14f to 14n.

The matrix [FS'] used by the decimating inverse discrete cosine transform unit 14 for processing may be resolved by the Wang algorithm as indicated by the following equation (4):

$$[FS'] = \frac{1}{\sqrt{2}} \begin{bmatrix} 1 & 0 & 0 & 0 \\ 0 & 0 & 0 & 1 \\ 0 & 1 & 0 & 0 \\ 0 & 0 & 1 & 0 \end{bmatrix} \begin{bmatrix} 1 & 0 & 1 & 0 \\ 0 & 1 & 0 & 1 \\ 1 & 0 & -1 & 0 \\ 0 & 1 & 0 & -1 \end{bmatrix} \quad (4)$$

$$\begin{bmatrix} [M_1] & \\ & [M_2] \end{bmatrix} \begin{bmatrix} 1 & 0 & 0 & 0 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 0 & 1 & 0 \\ 0 & 0 & 0 & 1 & 0 & 0 & 0 & 0 \\ 0 & 0 & 0 & 0 & 0 & 1 & 0 & 0 \\ 0 & 1 & 0 & 0 & 0 & 0 & 0 & 0 \\ 0 & 0 & 0 & 0 & 0 & 0 & 0 & 1 \end{bmatrix}$$

$$[M_1] = \begin{bmatrix} 1 & 1 \\ -1 & -1 \end{bmatrix} \begin{bmatrix} 1 & 0 & 0 & 0 \\ 0 & 1 & 1 & 1 \end{bmatrix} \begin{bmatrix} A & 0 & 0 & 0 \\ 0 & D & 0 & 0 \\ 0 & 0 & F & 0 \\ 0 & 0 & 0 & H \end{bmatrix}$$

$$[M_2] = \begin{bmatrix} 1 & 1 & 0 \\ 1 & 0 & 1 \end{bmatrix} \begin{bmatrix} -1 & 1 & 0 & 0 & 0 & 0 \\ 0 & 0 & 1 & 0 & 1 & 0 \\ 0 & 0 & 0 & 1 & 0 & 1 \end{bmatrix} \begin{bmatrix} E & 0 & 0 & 0 \\ 0 & G & 0 & 0 \\ 0 & 0 & B & 0 \\ 0 & 0 & C & 0 \\ 0 & 0 & 0 & I \\ 0 & 0 & 0 & J \end{bmatrix}.$$

In the equation (4), A to J are defined as follows:

$$A = \frac{1}{\sqrt{2}}$$

$$F = \frac{\cos\frac{\pi}{8} - \cos\frac{3\pi}{8}}{4}$$

$$D = \frac{1}{4}$$

$$H = \frac{1}{4} + \frac{1}{2\sqrt{2}}$$

$$B = \frac{\cos\frac{\pi}{16} + \cos\frac{3\pi}{16} + 3\cos\frac{5\pi}{16} - \cos\frac{7\pi}{16}}{4}$$

$$C = \frac{\cos\frac{\pi}{16} - 3\cos\frac{3\pi}{16} - \cos\frac{5\pi}{16} - \cos\frac{7\pi}{16}}{4}$$

$$E = \frac{\cos\frac{\pi}{16} - \cos\frac{3\pi}{16} - \cos\frac{5\pi}{16} - \cos\frac{7\pi}{16}}{4}$$

$$G = \frac{\cos\frac{\pi}{16} - \cos\frac{3\pi}{16} + \cos\frac{5\pi}{16} + \cos\frac{7\pi}{16}}{4}$$

$$I = \frac{\cos\frac{\pi}{16} - \cos\frac{3\pi}{16} + 3\cos\frac{5\pi}{16} + \cos\frac{7\pi}{16}}{4}$$

$$J = \frac{\cos\frac{\pi}{16} + 3\cos\frac{3\pi}{16} - \cos\frac{5\pi}{16} + \cos\frac{7\pi}{16}}{4}$$

The processing flow in the case of applying the Wang algorithm to the processing by the decimating inverse discrete cosine transform unit for frame mode 28 is shown in FIG. 7. As may be seen from this processing flow, the processing speed can be enhanced by employing first to tenth multipliers 15a to 15j and first to thirteenth adders 15k to 15w.

The motion compensation unit for field mode 31 and the motion compensation unit for frame mode 32 are explained in further detail.

First, the interpolation processing by the motion compensation unit for field mode 31 is explained. In this motion compensation unit for field mode 31, the pixels of the standard resolution picture, stored in the frame memory 30, are interpolated, in meeting with the motion compensation of 1/2 pixel precision of the high resolution picture, to generate pixels of 1/4 pixel precision.

For the pixels in the horizontal direction, pixels of 1/2 pixel precision are generated from the pixels of the integer precision, stored in the frame memory 30, using a two-fold interpolation filter. The motion compensation unit for field mode 31 generates pixels of 1/2 pixel precision, using e.g., a half-band filter and, using a linear filter, and then generates pixels of the 1/4 pixel precision from the pixels of the 1/2 precision generated using the two-fold interpolation filter. The motion compensation unit for field mode 31 is able to output pixels of the standard resolution picture stored in the frame memory 30 as a reference picture corresponding to the standard resolution picture by employing a two-fold interpolation filter, such as a half-band filter, without executing the product and sum operations corresponding to the number of taps. Thus, the motion compensation unit for frame mode 32 is able to perform high speed processing. Moreover, this motion compensation unit for field mode 31 is able to perform high speed processing. In this motion compensation unit for field mode 31, the above processing can be performed using a sole matrix, while the pixels of 1/4 precision may be generated from the pixels of the integer precision using the four-fold interpolation filter.

For the pixels in the vertical direction, pixels of the integer precision of the standard resolution picture, having dephasing between the top and bottom fields, such that the phase in the vertical direction of the pixels of the top field is 1/2, 5/2, . . . , and the phase in the vertical direction of the pixels of the bottom field is 1, 3, . . . , as shown in FIG. 5a, are taken out from the frame memory 30.

Then, for the pixels in the vertical direction, pixels of 1/2 pixel precision are generated from the pixels of the integer precision, taken out from the frame memory 30 within the field, using a two-fold interpolation filter, such as a half-band filter, as shown in FIG. 5b. That is, pixels of 1/2 pixel precision of the top field are generated, based on the pixels of the top field of the integer precision, while the pixels of the 1/2 pixel precision of the bottom field are generated, based on the pixels of the integer precision of the bottom field. For example, the pixels of the top field at the 7/2 vertical phase position are generated on two-fold interpolation from the pixels of the top field at 1/2, 5/2, 9/2, 13/2, positions, as shown in FIG. 5b. On the other hand, the pixels of the bottom field at the 4 vertical phase position are generated on two-fold interpolation from the pixels of the bottom field at 1, 3, 5, 7, . . . .

Then, for the pixels in the vertical direction, pixels of 1/4 pixel precision are generated from the pixels of the 1/2 pixel precision, generated by a two-fold interpolation filter between the top and bottom fields, using a linear interpolation filter, as shown in FIG. 5c. That is, the pixels of the top field at the 1/4 Vertical phase position are generated based on pixels of the top filed with the 1/2 pixel precision, while the pixels of the bottom field at the 1/4 vertical phase position are generated based on pixels of the bottom filed with the 1/2 pixel precision. For example, the pixels of the top field with the phase in the vertical direction of 9/4 are generated on linear interpolation from the pixels of the top field at 1 and 5/2 positions, while the pixels of the bottom field with the phase in the vertical direction of 10/4 are generated on linear interpolation from the pixels of the bottom field at 9/4 and 11/4 positions.

By performing interpolation in the vertical direction, pixels of the same phase as those of the standard resolution picture stored in the frame memory 30 can be output as a reference picture in meeting with the high resolution picture, in the motion compensation unit for field mode 31 employing a two-fold interpolation filter, such as a half-band filter, without executing the product sum processing corresponding to the number of taps. So, the motion compensation unit for field mode 31 is able to perform high speed processing. It is also possible to prevent so-called field inversion or field mixing to prevent deterioration in the picture quality, with there being no dephasing between the top and bottom fields. It is also possible for the motion compensation unit for field mode 31 to execute the above processing using a sole matrix or to generate 1/4 pixel precision from the pixels of the integer precision using the four-fold interpolation filter.

Next, the interpolation processing by the motion compensation unit for frame mode 32 is explained. In this motion compensation unit for frame mode 32, the pixels of the standard resolution picture, stored in the frame memory 30 are interpolated to generate pixels of 1/4 pixel precision.

For the pixels in the horizontal direction, pixels of 1/2 pixel precision are generated from the pixels of the integer precision, stored in the frame memory 30, using a two-fold interpolation filter. The motion compensation unit for frame mode 32 generates pixels of 1/2 pixel precision, using e.g., a half-band filter and, using a linear filter, then generates pixels of the 1/4 pixel precision from the pixels of the 1/2 precision generated using the two-fold interpolation filter. The motion compensation unit for frame mode 32 is able to output pixels of the standard resolution picture stored in the frame memory 30 as a reference picture corresponding to the standard resolution picture by employing a two-fold interpolation filter, such as a half-band filter, without executing the product and sum operations corresponding to the number of taps. Thus, the motion compensation unit for frame mode 32 is able to perform high speed processing. Moreover, this motion compensation unit for frame mode 32 is able to perform high speed processing. In this motion compensation unit for frame mode 32, the above processing can be performed using a sole matrix, while the pixels of 1/4 precision may be generated from the pixels of the integer precision using the four-fold interpolation filter.

For the pixels in the vertical direction, pixels of the integer precision of the standard resolution picture, having dephasing between the top and bottom fields, such that the phase in the vertical direction of the pixels of the top field is 1/2, 5/2, . . . , and the phase in the vertical direction of the pixels of the bottom field is 1, 3, . . . , as shown in FIG. 6a, are taken out from the frame memory 30, Then, for the pixels in the vertical direction, pixels of 1/2 pixel precision are generated from the pixels of the integer precision, taken out from the frame memory 30 in the field, using a two-fold interpolation filter, such as a half-band filter, as shown in FIG. 6b. That is, pixels of 1/2 pixel precision of the bottom top are generated, based on the pixels of the top field of the integer precision, while the pixels of the 1/2 pixel precision of the bottom field are generated, based on the pixels of the integer precision of the bottom field. For example, the pixels of the top field at the 7/2 vertical phase position are generated on two-fold interpolation from the pixels of the top field at 1/2, 5/2, 32/2, 13/2, positions, as shown in FIG. 6b. On the other hand, the pixels of the bottom field at the 4 vertical phase position are generated on two-fold interpolation from the pixels of the bottom field at 1, 3, 5, 7, . . . .

Then, for the pixels in the vertical direction, pixels of 1/4 pixel precision are generated from the pixels of the 1/2 pixel precision, generated by a two-fold interpolation filter between the top and bottom fields, using a linear interpolation filter, as shown in FIG. 6c. For example, the pixels at the 1/4 vertical phase position are generated on linear interpolation from the pixels of the top field at the 0 position and those at the 1/2 position, whilst the pixels at the 1/4 vertical phase position are generated on linear interpolation from the pixels of the top field at the 0 position and those of the top field at the 1/2 position.

By performing interpolation in the vertical direction, pixels of the same phase as those of the standard resolution picture stored in the frame memory 30 can be output as a reference picture consistent with the high resolution picture, in the motion compensation unit for frame mode 32 employing a two-fold interpolation filter, such as a half-band filter, without executing the product sum processing corresponding to the number of taps. So, the motion compensation unit for frame mode 32 is able to perform high speed processing. It is also possible to prevent so-called field inversion or field mixing to prevent deterioration in the picture quality, with there being no dephasing between the top and bottom fields. It is also possible for the motion compensation unit for field mode 31 to execute the above processing using a sole matrix or to generate 1/4 pixel precision from the pixels of the integer precision using a four-fold interpolation filter.

With the picture information conversion device 20, according to the second embodiment of the present invention, as described above, in which IDCT is applied to four coefficients in the horizontal direction in the low frequency range and to eight coefficients in the vertical direction, it is possible to prevent deterioration in the picture quality ascribable to interlaced scanning to reduce the memory capacity and the volume of the calculation processing necessary for decoding the input bitstream.

Moreover, with the picture information conversion device 20, according to the second embodiment of the present invention, as described above, in which IDCT is applied only to 4×4 coefficients in the low frequency range of the chroma signals for which deterioration in picture quality is less perceptible to the human eyes than those of the luminance signals to render it possible to reduce the processing volume and the memory capacity further than is possible with the picture information conversion device 1 of the first embodiment of the present invention.

Figure 15:
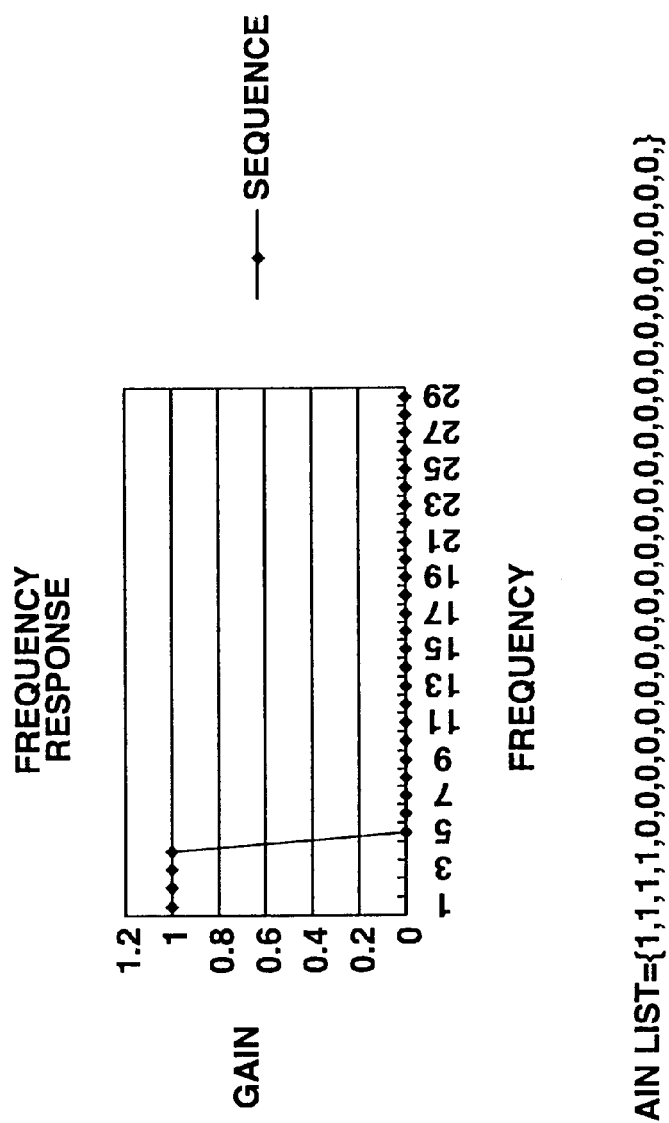
FIG. 15 illustrates a gain list prepared from frequency samples obtained on dividing the frequency range less than the Nyquist frequency at equal intervals into {(N−1)/2}.

Although the bitstream by MPEG-2 is input to the picture information conversion device 1, the bitstream input may also be a bitstream by e.g., MPEG-1 or H.263, provided that the bitstream has been encoded by orthogonal transform and motion compensation. Moreover, if the input bitstream is of the 420 format as shown in FIG. 15, there is only the frame DCT mode for the chroma signals, so that the decimating IDCT unit for field mode 27 is not required.

Referring to the drawings, a third embodiment of the present invention is explained in detail.

Figure 16:
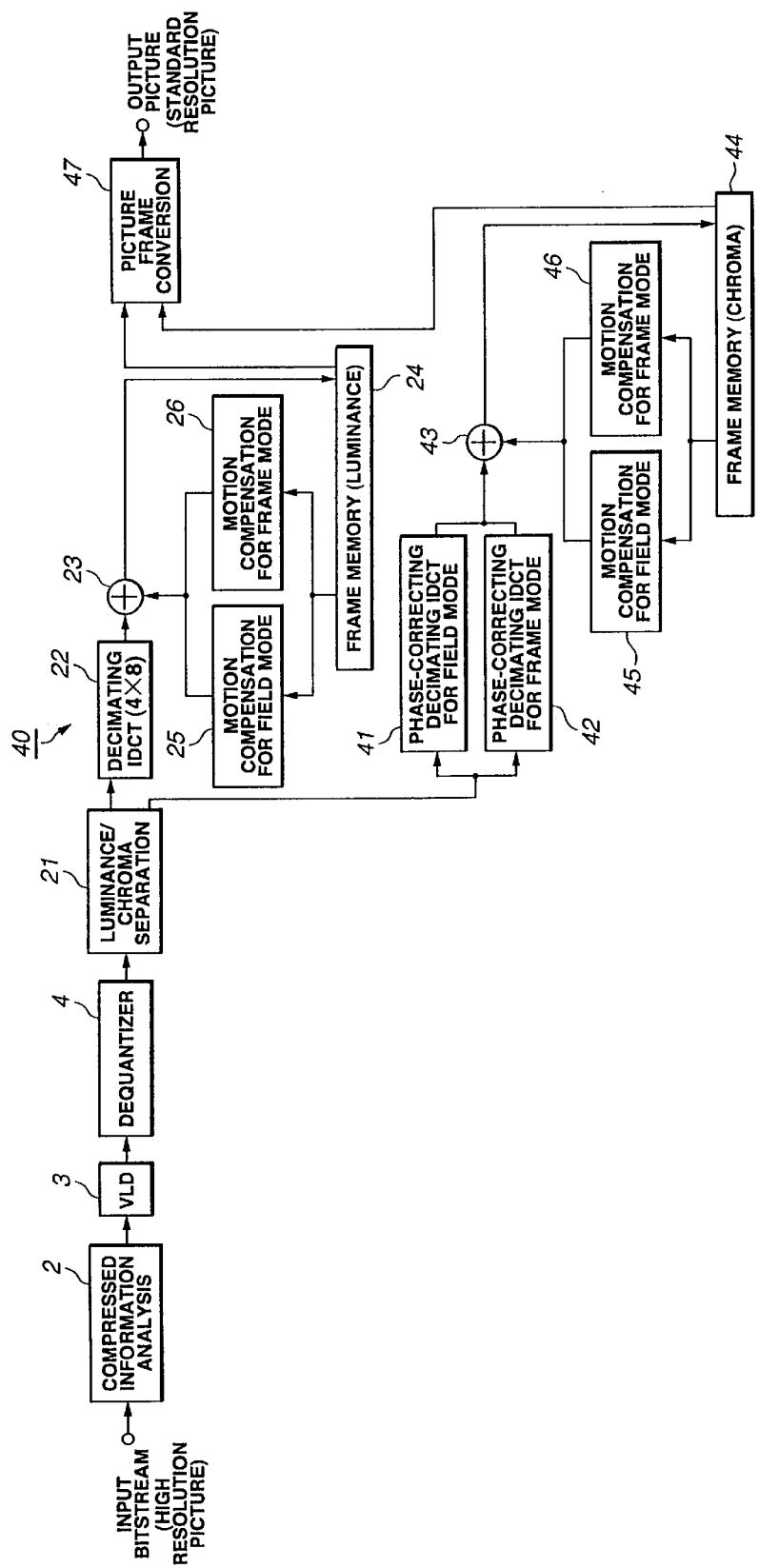
FIG. 16 is a block diagram showing a picture decoding apparatus according to a third embodiment of the present invention.

Similarly to the picture decoding device 20, according to the second embodiment, the picture decoding device 40 according to the third embodiment is fed with a bitstream, obtained on compressing an interlaced scanned picture, as a high resolution picture with 1152 effective lines in the vertical direction, in accordance with MPEG-2 (Moving Picture Experts Group phase-2) and decodes this input bitstream, decimates the bitstream to a 1/2 resolution to output a standard resolution picture with 576 effective vertical lines. FIG. 16 shows a picture decoding device according to the third embodiment of the present invention.

In the following explanation of the picture decoding device 40, the same parts or components as those constituting the picture decoding device 20 of the second embodiment are not explained specifically.

Referring to FIG. 16, this picture decoding device 40 includes a compressed information analysis unit 2 adapted for being fed with and analyzing a bitstream of a compressed high resolution picture, and a variable length decoder 3 for decoding the bitstream encoded with variable length encoding of allocating a code length corresponding to the data occurrence frequency. The picture decoding device 40 also includes an inverse quantizer 4 for multiplying respective coefficients of the DCT block with quantization steps, a luminance signal/chroma signal separating device 21 for separating inverse quantized DCT coefficients into luminance signals and chroma signals, and a decimating inverse discrete cosine transform unit 22 for applying decimating inverse discrete cosine transform to the DCTed DCT block discrete of the luminance signals to generate a standard resolution picture. The picture decoding device 40 also includes an addition unit 23 for summing the decimating inverse discrete cosine transformed standard resolution picture to the motion-compensated reference picture, a frame memory 24 for transiently storing the reference picture, and a motion compensation unit for field mode 25 for motion-compensating the reference picture stored by the frame memory 24 in meeting with the field motion prediction mode. The picture decoding device 40 also includes a motion compensation unit for frame mode 26 for motion-compensating the reference picture stored in the frame memory 24 in meeting with the frame motion prediction mode, a phase-correcting decimating inverse discrete cosine transform unit for field mode 41 for applying decimating IDCT with dephasing correction on the DCT block of the separated chroma signal, DCTed in the field DCT mode, to generate a standard resolution picture, and a phase-correcting decimating inverse discrete cosine transform unit for frame mode 42 for applying decimating IDCT with dephasing correction on the DCT block of the separated chroma signal, DCTed in the frame DCT mode, to generate a standard resolution picture. The picture decoding device 40 also includes an addition unit 43 for summing the decimating inverse discrete cosine transformed standard resolution picture to the motion-compensated reference picture, a frame memory 44 for transiently storing the reference picture, a motion compensation unit for field mode 45 for motion-compensating the reference picture stored by the frame memory 44 in meeting with the field motion prediction mode, and a motion compensation unit for frame mode 46 for motion-compensating the reference picture stored in the frame memory 44 in meeting with the frame motion prediction mode. The picture decoding device 40 also includes a picture frame conversion unit 47 for outputting picture data of the standard resolution for converting the picture frame of a picture stored in the frame memory 17 for display on e.g., a monitor.

Figure 17:
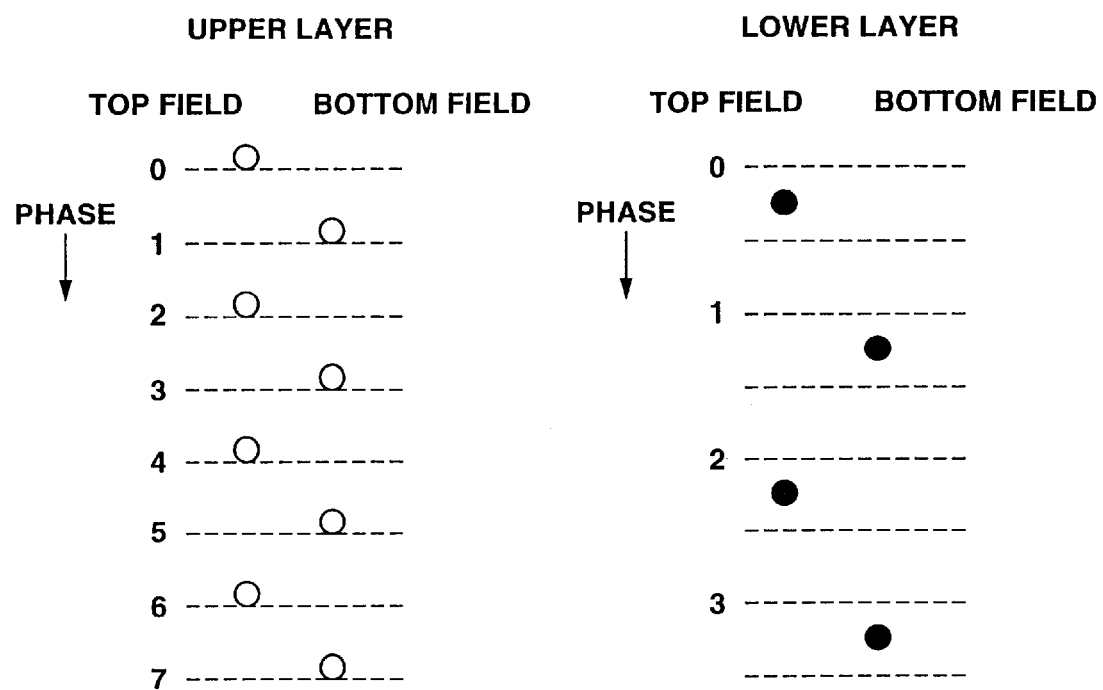
FIG. 17 illustrates the phase of pixels in the vertical direction of a reference picture stored in a frame memory of the picture decoding apparatus according to the third embodiment of the present invention.

The phase-correcting decimating inverse discrete cosine transform unit for field mode 41 is used in the event that a macro-block of an input bitstream is discrete cosine transformed with the field motion prediction mode. In the phase-correcting decimating inverse discrete cosine transform unit for field mode 41, inverse discrete cosine transform, in which has been corrected the dephasing of pixels in the vertical direction of the top and bottom fields, is applied to only 4×8 coefficients in the low frequency range, among the totality of the coefficients of the DCT block with 8×8 coefficients in the macro-block discrete cosine transformed with the field DCT mode. That is, the phase-correcting decimating inverse discrete cosine transform unit for field mode 41 effects inverse discrete cosine transform in the horizontal direction based on the four low-range point discrete cosine coefficients, while effecting inverse discrete cosine transform corrected for de-phasing in the vertical direction based on the eight point discrete cosine coefficients. Specifically, the phase-correcting decimating inverse discrete cosine transform unit for field mode 41 corrects the phase in an amount corresponding to 1/4 pixel for each pixel of the top field in the vertical direction, while correcting the phase in an amount corresponding to 3/4 pixel for each pixel of the bottom field in the vertical direction. By performing the above-described decimating inverse discrete cosine transform, a standard resolution picture (lower layer) is generated in which the phases of the respective pixels of the top field in the vertical direction are 1/4, 9/4, . . . , with the phases of the respective pixels of the bottom field in the vertical direction being 5/1, 13/4, . . . ,as shown in FIG. 17. The phase-correcting decimating inverse discrete cosine transform unit for field mode 41, performing the above-described decimating IDCT, is able to decode the phase-corrected standard resolution picture each DCT block of which is made up of 4×4 pixels.

The phase-correcting decimating inverse discrete cosine transform unit for frame mode 42 is used if a macro-block of an input bitstream has been discrete cosine transformed with the frame DCT mode. In the phase-correcting decimating inverse discrete cosine transform unit for frame mode 42, decimating inverse discrete cosine transform, in which the pixel dephasing along the vertical direction of the top field and the bottom field has been corrected, is applied to the DCT block with 8×8 coefficients in the macro-block discrete cosine transformed with the frame DCT mode. The phase-correcting decimating inverse discrete cosine transform unit for frame mode 42 generates a picture of the same phase as the phase of the pixels of the standard resolution picture generated by the phase-correcting decimating inverse discrete cosine transform unit for field mode 41. That is, the phase-correcting decimating inverse discrete cosine transform unit for frame mode 32 executes decimating inverse discrete cosine transform with one-block or two-block processing to generate a standard resolution picture (lower layer) in which the phases in the vertical direction of the respective pixels of the top field are 1/4, 9/4, . . . , with the phases in the vertical direction of the respective pixels of the bottom field being 5/4, 13/4, as shown in FIG. 17.

Meanwhile, the processing by the phase-correcting decimating inverse discrete cosine transform unit for frame mode 42 will be explained in detail subsequently.

If the macroblock, decimating-IDCTed by the phase-correcting decimating inverse discrete cosine transform unit for field mode 41 or phase-correcting decimating inverse discrete cosine transform unit for frame mode 42, is an intra-picture, the addition unit 43 directly stores the intra-picture in the frame memory 44. If a macro-block, decimating inverse discrete cosine transformed by the phase-correcting decimating inverse discrete cosine transform unit for field mode 41 or by the decimating phase-correcting inverse discrete cosine transform unit 42 for frame mode, is an inter-picture, the addition unit 43 synthesizes the reference picture, motion compensated by the motion compensation unit for field mode 45 or by the motion compensation unit for frame mode 46, to the inter-picture, to store the synthesized picture in the frame memory 44.

It is noted that the memory capacity of the frame memory 44 one-half the resolution proper to the bitstream input to the compressed information analysis unit 2 suffices.

The motion compensation unit for field mode 45 is used if the motion prediction mode of the macro-block is the field motion prediction mode. The motion compensation unit for field mode 45 applies interpolation with the 1/4 pixel precision to the reference picture of the standard resolution picture stored in the frame memory 44 in a manner of taking the dephasing between the top and bottom fields into account, by way of performing motion compensation in meeting with the field motion prediction mode. The reference picture, motion-compensated by the motion compensation unit for field mode 45, is sent to the addition unit 43, where it is synthesized to an inter-picture.

The motion compensation unit for frame mode 46 is used if the motion prediction mode of the macro-block is the frame motion prediction mode. The motion compensation unit for frame mode 46 applies interpolation with the 1/4 pixel precision to the reference picture of the standard resolution picture stored in the frame memory 44 in a manner of taking the dephasing between the top and bottom fields into account. The reference picture, motion-compensated by the motion compensation unit for frame mode 46, is sent to the addition unit 43, where it is synthesized to an inter-picture.

The picture frame conversion unit 47 is fed with a reference picture of the standard resolution stored in the frame memory 24 or the picture synthesized by the addition unit 23, and with the reference picture of the standard resolution stored in the frame memory 44 or the picture synthesized by the addition unit 43, to convert the picture frame of this reference picture by post-filtering for conformity to the a standard for a standard resolution television. That is, the picture frame conversion unit 47 converts the picture frame of the high resolution television standard to the picture frame of the standard resolution television reduced in size to 1/4. Meanwhile, with the present picture frame conversion unit 47, since the picture stored in the frame memory 44 is not subjected to dephasing between the top and bottom fields, it is unnecessary to effect the correction for pixel dephasing in contradistinction from the picture frame converting unit 33 of the above-described second embodiment.

With the picture decoding device 40 of the second embodiment, constructed as described above, the bitstream of a high resolution picture, compressed in accordance with MPEG2, can be decoded and simultaneously reduced in resolution to 1/2 in order to output a standard resolution picture.

The processing contents of the phase-correcting decimating inverse discrete cosine transform unit for field mode 41 will be explained in further detail.

Figure 18:
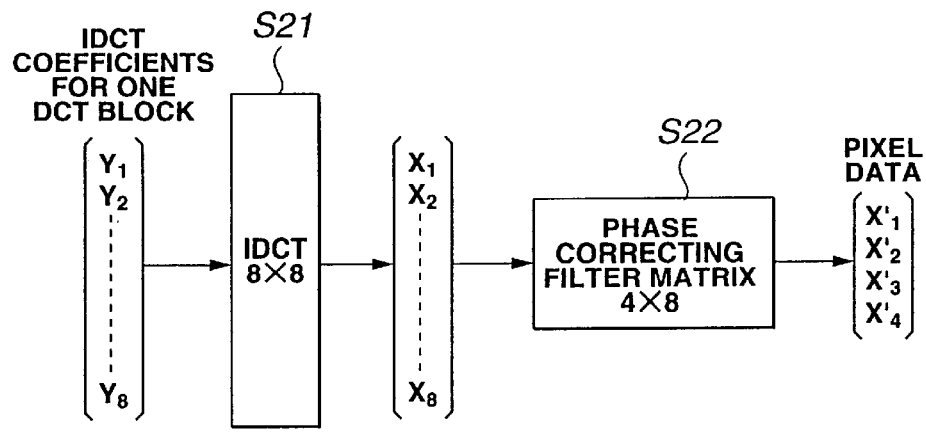
FIG. 18 illustrates the processing contents of a phase-correcting decimating IDCT device for the field mode of the picture decoding apparatus according to the third embodiment of the present invention.
Figure 19:
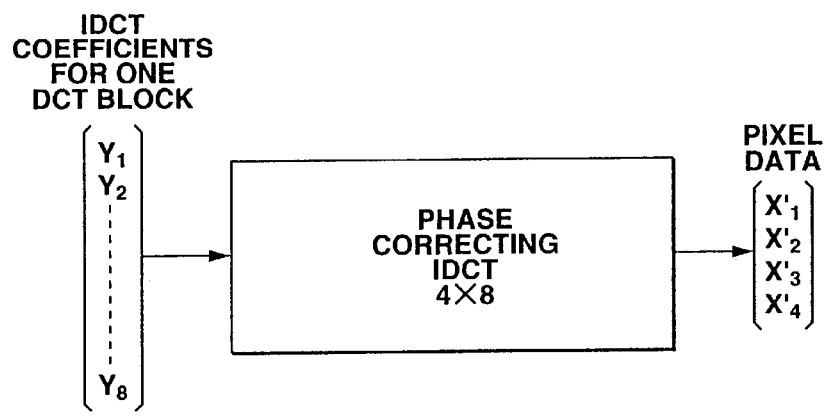
FIG. 19 illustrates the processing contents of the phase-correcting decimating IDCT device for the field mode in case of processing by a sole matrix.

The phase-correcting decimating inverse discrete cosine transform unit for field mode 41 is fed with a bitstream, compression-coded from a high resolution picture, in terms of a DCT block as a unit, as shown in FIG. 18.

First, at step S21, 8×8 inverse discrete cosine transform (IDCT 8×8) is applied to the discrete cosine coefficients y of the sole DCT block. It is noted that the coefficients in the vertical direction, among the totality of the discrete cosine coefficients in the DCT block, are denoted as $y_1$ to $y_8$ in the drawing. By the inverse discrete cosine transform, 8×8 decoded pixel data x are obtained. It is noted that pixel data along the vertical direction, among the totality of pixel data of the DCT block, are indicated as $x_1$ to $x_8$ in the drawing.

Then, at step S22, these 8×8 pixel data are processed with transform closed in the DCT block, by a 4×8 phase-correcting filter matrix, in order to produce phase-corrected pixel data x'. It is noted that the pixel data along the vertical direction, among the totality of pixel data, are denoted as $x'_1$, $x'_2$, $x'_3$, $x'_4$ in the drawing.

By performing the processing of steps S21 and S22, the phase-correcting decimating inverse discrete cosine transform unit for field mode 41 can generate a picture not subjected to dephasing between the top and bottom fields.

It is also possible with the phase-correcting decimating inverse discrete cosine transform unit for field mode 41 to perform the above processing using a sole matrix (4×8 phase-correcting IDCT matrix).

Figure 20:
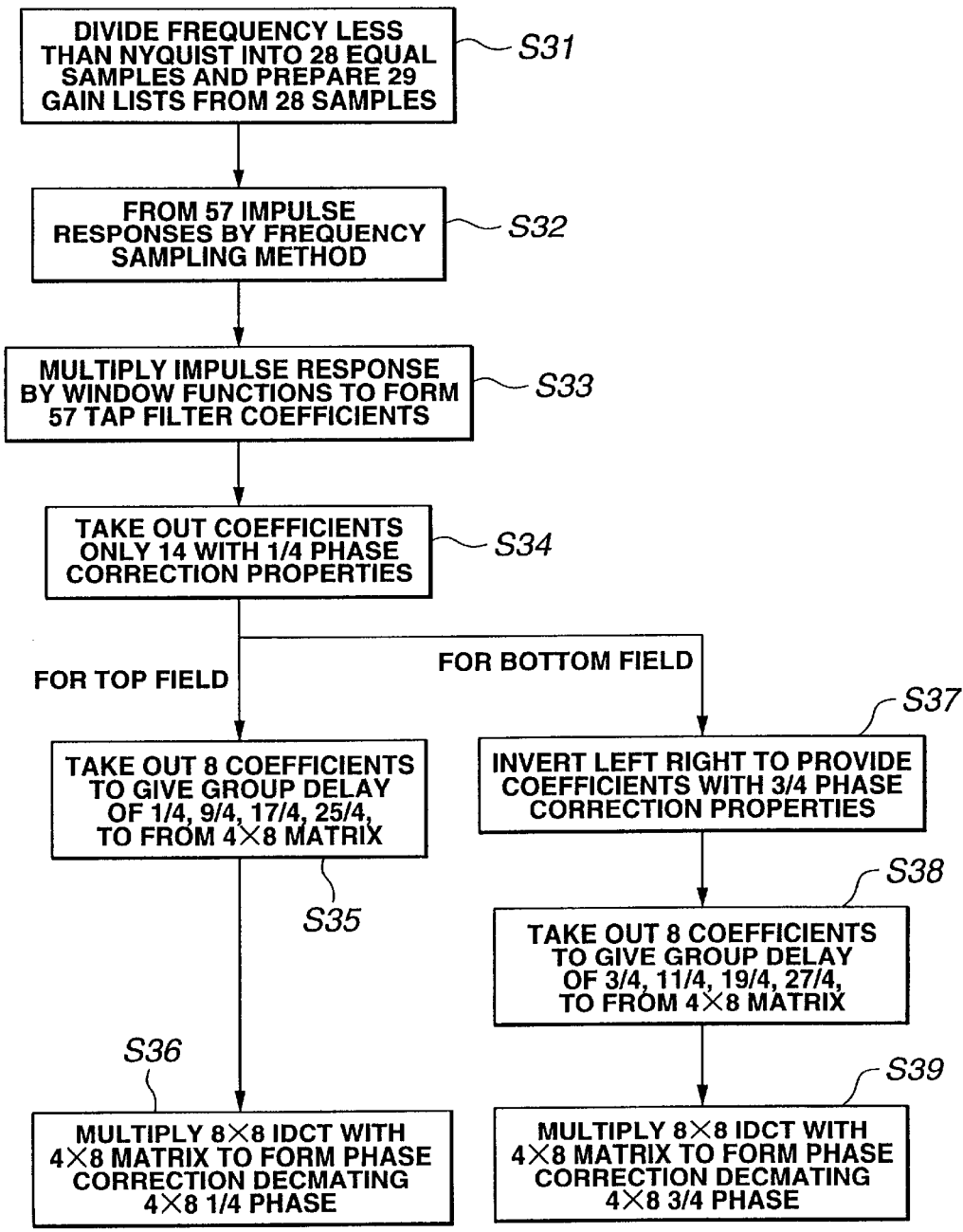
FIG. 20 is a flowchart for illustrating the designing sequence for a 4×8 phase-correcting IDCT matrix in which calculations are performed by the phase-correcting decimating IDCT device for the field mode.

FIG. 20 shows the designing procedure of the 4×8 phase correcting IDCT matrix, in which commutations are executed by the above-described phase-correcting decimating inverse discrete cosine transform unit for field mode 41. This 4×8 phase correcting IDCT matrix is hereinafter explained. This 4×8 phase correcting IDCT matrix is formulated by polyphase resolution of a prototype filter.

Figure 21A:
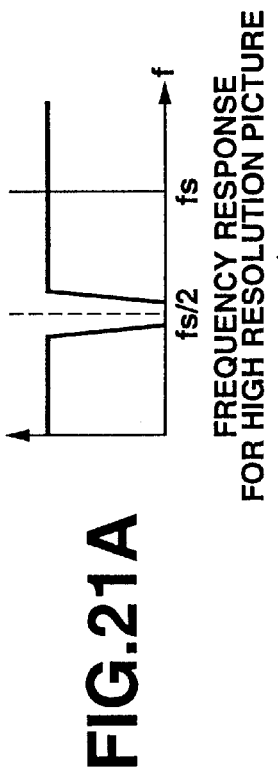
FIG. 21 consisting of FIGS. 21A through 21C, illustrates frequency characteristics of a prototype filter necessary in designing the 4×8 phase-correcting IDCT matrix.
Figure 21B:
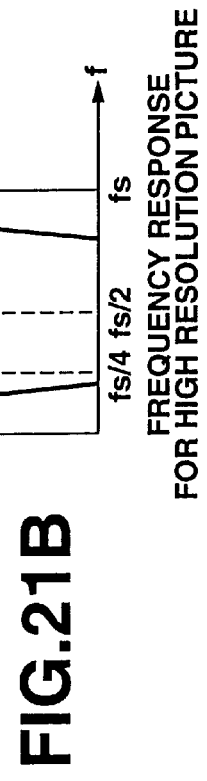
Figure 21C:
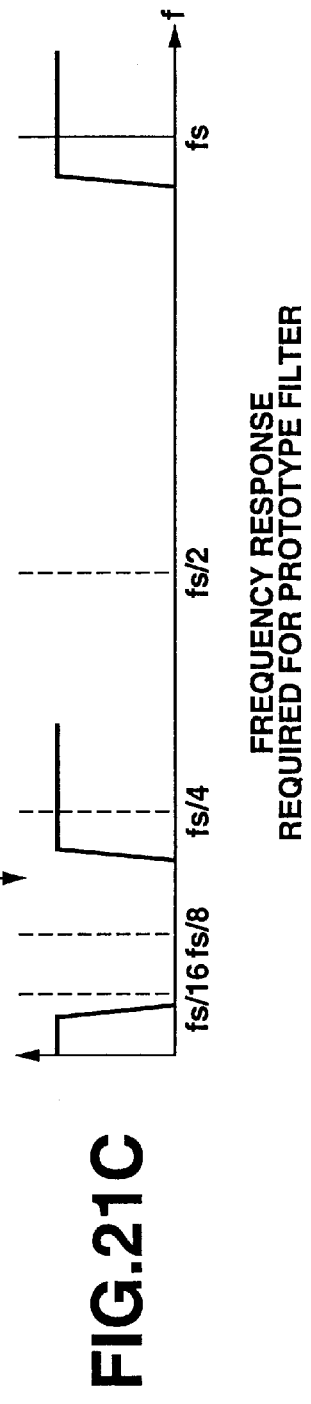

The picture decoding device 40 downdecodes the high resolution picture having the frequency response as shown in FIG. 21*a* to a standard resolution picture of a one-half resolution, having the frequency characteristics as shown in FIG. 21*b*. Thus, the frequency characteristics required of the prototype filter result from the 4-tupled oversampling, as shown in FIG. 21*c*, in order to obtain a pixel value of the 1/4 phase of the standard resolution picture.

First, at step S31, the Nyquist frequency and the lower frequency are divided into {(N−1)/2} equal intervals, and a gain list is formulated from the frequency samples. For example, the Nyquist frequency and the lower frequency are divided into equal (57−1)/2=28 intervals to formulate 29 gain lists.

Figure 22:
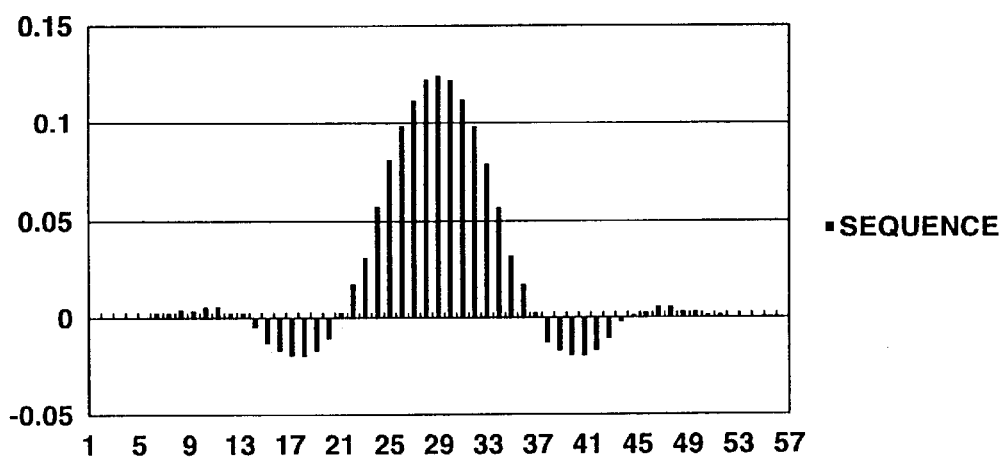
FIG. 22 illustrates the impulse response prepared on IDCT of the gain list.

Then, at step S32, 57 impulse responses are formulated by the frequency sampling method. That is, 29 gain lists ate inverse discrete cosine transformed to formulate 57 FIR impulse responses. These 57 impulse responses are shown in FIG. 22.

Next, at step S33, these impulse responses are multiplied with a window function to formulate 57-tap filter coefficients c1 to c57.

The filter prepared at this step S33 serves as the prototype filter.

Then, at step S34, the prototype filter, having the 57 filter coefficients c1 to c57, is polyphase-resolved to retrieve only 14 filter coefficients c'1 to c'14 having the 1/4 phase correction characteristics to formulate a polyphase filter.

Figure 23:
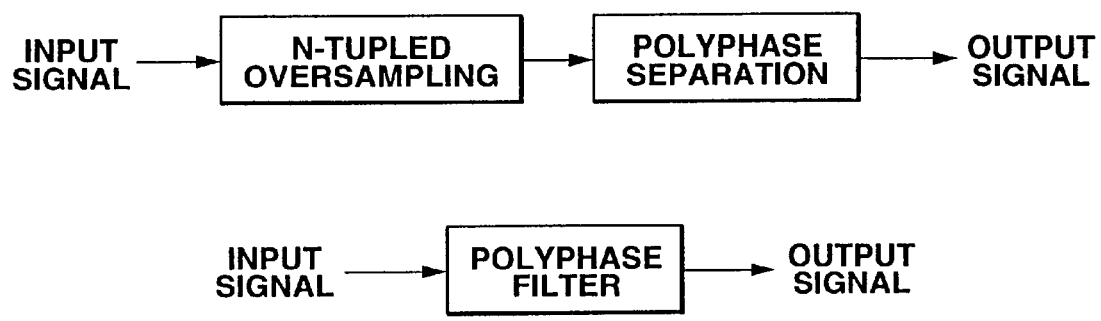
FIG. 23 illustrates a polyphase filter.
Figure 24:
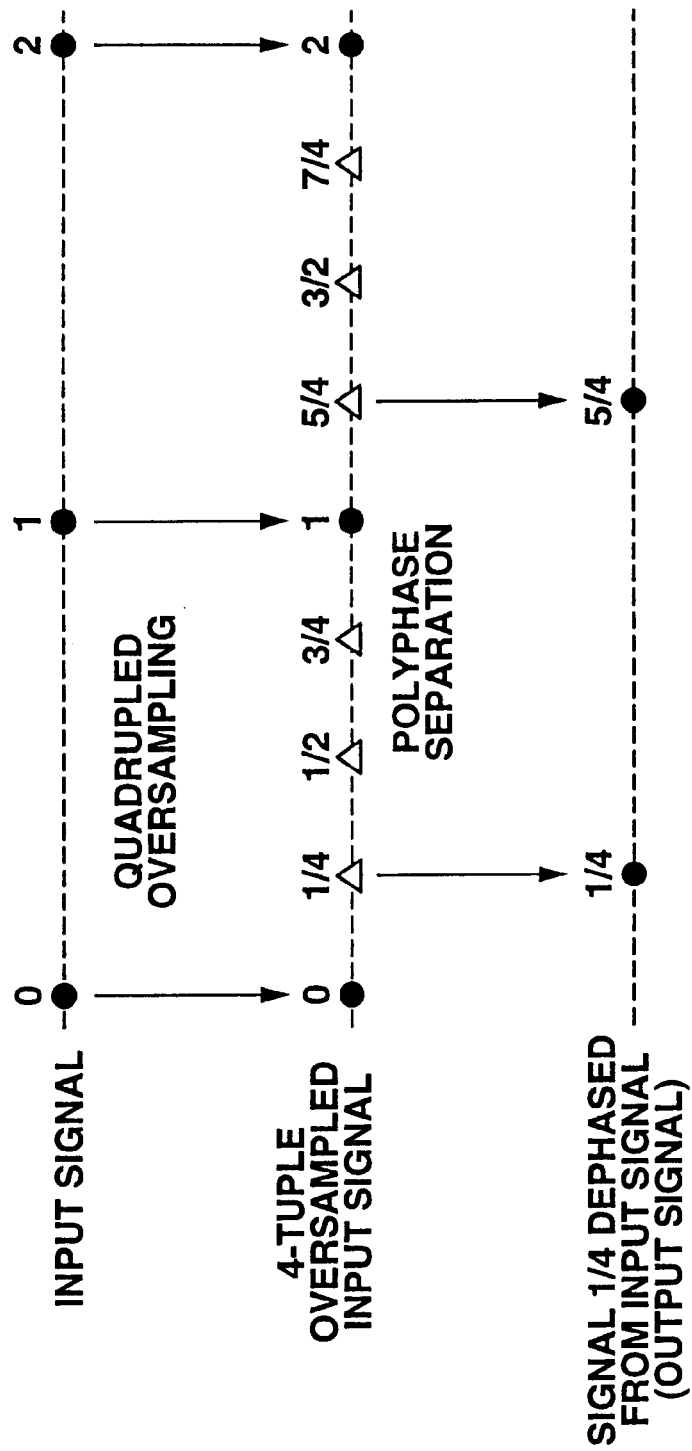
FIG. 24 illustrates the polyphase filter used for outputting a signal dephased by 1/e phase with respect to an input signal.

This polyphase filter is such a filter for oversampling an input signal to N times, and extracting pixels at an interval of N pixels from the oversampled signals, by way of polyphase resolution, for outputting signals dephased 1/N with respect to the input signal, as shown in FIG. 23. If desired to obtain a signal 1/4 dephased with respect to the input signal, it suffices if the input signal is oversamples by a factor of four to retrieve a signal dephased by 1/4 from the oversampled signal, as shown in FIG. 24.

Specifically, the 14 filter coefficients, c'1 to c'14, formulated from the prototype filters c1 to c57 having 57 coefficients, are those having the following equation (5):

$$\begin{array}{ccccccc} -0.000413627 & 0.0039878 & 0.00229913 & -0.015080 & -0.00939227 & 0.0561242 & 0.119497 \\ 0.095091 & 0.0017216 & -0.0190084 & -0.00554409 & 0.00518009 & 0.0014488 & -0.00122162. \end{array} \qquad (5)$$

After formulating the polyphase filter, the design processing is split between the 4×8 phase correction IDCT matrix for the top field and the 4×8 phase correction IDCT matrix for the bottom field.

Figure 25:
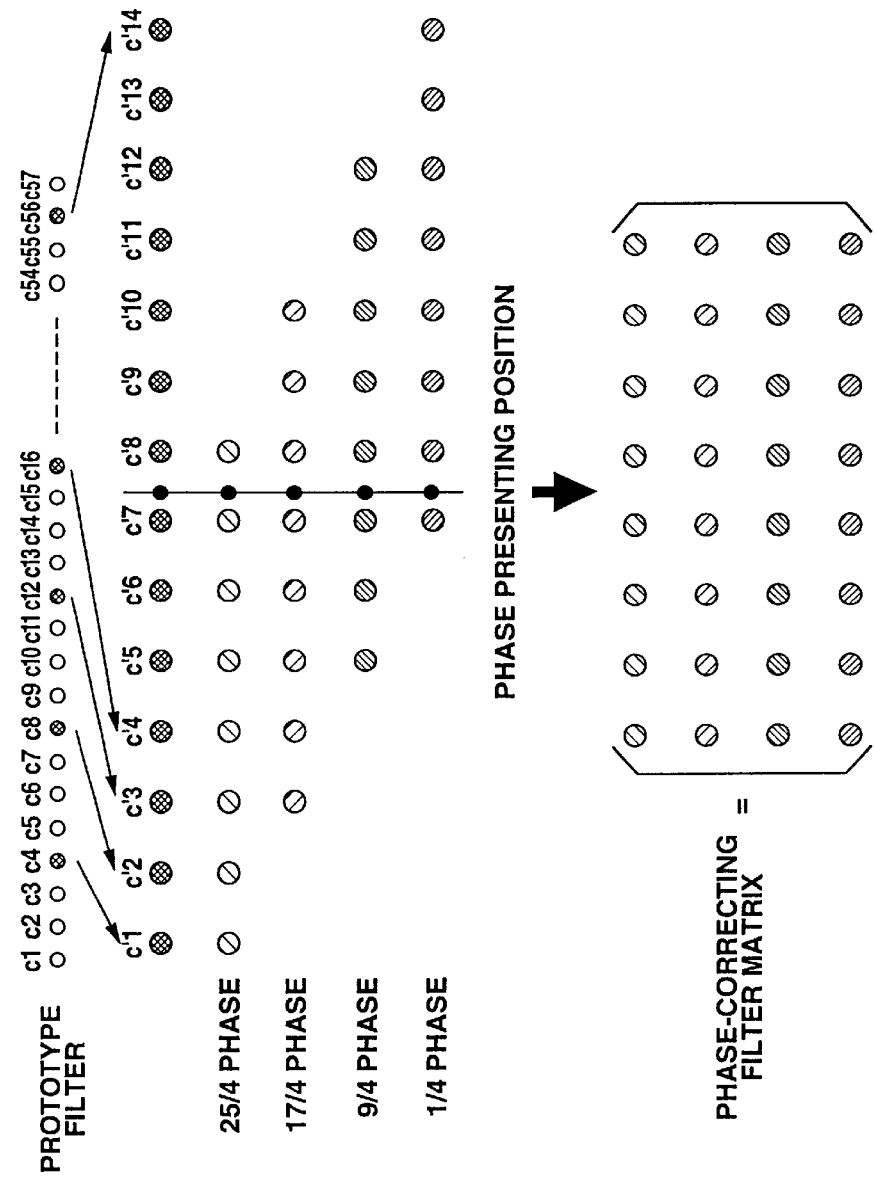
FIG. 25 illustrates the 4×8 phase-correcting IDCT matrix in which calculations are performed by the phase-correcting decimating IDCT device for the field mode.

First, in formulating the 4×8 phase correction IDCT matrix for the top field, eight coefficients with the group delay of 1/4, 9/4, 17/4 and 25/4 phase are retrieved at step S35 from the polyphase-resolved 14 filter coefficients c'1 to c'14, so that the filter characteristics will be 1/4 phase correction characteristics, to formulae a 4×8 phase correction filter matrix. The 4×8 phase correction filter matrix, this prepared, is shown in FIG. 25.

From the 14 filter coefficients c'1 to c'14 of the equation (5), the coefficients shown by the following equation (6) are retrieved:

| | | | | | | |
|---|---|---|---|---|---|---|
| 25/4 phase −0.000413627 | 0.0039878 | 0.00229913 | −0.015080 | −0.00939227 | 0.0561242 | 0.119497 |
| 17/4 phase | | 0.00229913 | −0.015080 | −0.00939227 | 0.0561242 | 0.119497 |
| 9/4 phase | | | | −0.00939227 | 0.0561242 | 0.119497 |
| 1/4 phase | | | | | | 0.119497 |
| 0.095091 | | | | | | |
| 0.095091 | 0.017216 | −0.0190084 | | | | |
| 0.095091 | 0.017216 | −0.0190084 | −0.00554409 | −0.00518009 | | |
| 0.095091 | 0.017216 | −0.0190084 | −0.00554409 | −0.00518009 | 0.0014488 | −0.00122162 |

If a 4×8 phase correcting IDCT matrix is found from the coefficients of the equation (6), a matrix shown in the following equation (7) is found:

| | | | | | | | |
|---|---|---|---|---|---|---|---|
| 0.119497 | 0.095091 | 0.017216 | −0.0190084 | −0.00554409 | 0.00518009 | 0.0014488 | −0.00122162 |
| −0.00939227 | 0.0561242 | 0.119497 | 0.095091 | 0.017216 | −0.0190084 | −0.00554409 | 0.00518009 |
| 0.00229913 | −0.015080 | −0.00939227 | 0.0561247 | 0.119497 | 0.095091 | 0.017216 | −0.0190084 |
| −0.000413627 | 0.0039878 | 0.00229913 | −0.015080 | −0.00939227 | 0.0561242 | 0.119497 | 0.095091 |

If the 4×8 phase correcting IDCT matrix of the equation (7) is normalized, a matrix shown in the following equation (8) is obtained:

| | | | | | | | |
|---|---|---|---|---|---|---|---|
| 0.561919 | 0.447153 | 0.809559 | −0.0893847 | −0.0260704 | 0.0243587 | 0.0068128 | −0.00574453 |
| −0.0382407 | 0.216559 | 0.461087 | 0.368915 | 0.066429 | −0.0733453 | −0.0213923 | 0.0199877 |
| 0.00931777 | −0.0611172 | −0.0380645 | 0.227457 | 0.484291 | 0.38538 | 0.069772 | −0.0770364 |
| −0.00164064 | 0.0158176 | 0.00911943 | −0.0598162 | −0.0372542 | 0.222615 | 0.473982 | 0.377176 |

At step S36, the 8×8 IDCT matrix is multiplied with this 4×8 phase correcting filter matrix to formulate a 4×8 phase correcting IDCT matrix for the top field.

The 4×8 phase correcting IDCT matrix, obtained on multiplying the 8×8 IDCT matrix with the 4×8 phase correcting filter matrix, is shown in the following equation (9):

| | | | | | | | |
|---|---|---|---|---|---|---|---|
| 0.353553 | 0.470989 | 0.376964 | 0.182877 | −0.0419176 | −0.0790523 | −0.0325452 | −0.0123689 |
| 0.353553 | 0.249119 | −0.244534 | −0.39214 | −0.0586254 | 0.0447449 | 0.00293145 | 0.0032419 |
| 0.353553 | −0.154747 | −0.424867 | 0.327667 | 0.101844 | −0.0599048 | 0.00729624 | −0.0053086 |
| 0.353553 | −0.437751 | 0.267694 | −0.00183147 | −0.156649 | 0.0892455 | −0.0287812 | 0.0126261 |

For formulating a 4×8 phase correcting IDCT matrix for the bottom field, polyphase-resolved 14 filter coefficients c'1 to c'14 are inverted at step S37 in the left-and-right direction so that the filter coefficients will be of 3/4 phase correcting characteristics.

Then, at step S38, eight coefficients which will give the group delay of 3/4, 11/4, 19/4 and 27/4 phase are retrieved at step S38 from the left-to-right inverted 14 filter coefficients c'1 to c'14 to formulate a 4×8 phase-correcting filter matrix.

Next, at step S39, the 8×8 IDCT matrix is multiplied with the 4×8 phase-correcting filter matrix to formulate a 4×8 phase correcting IDCT matrix for the bottom field.

By executing the processing of steps S31 to S39, it is possible to formulate a 4×8 phase correcting IDCT matrix worked on by the phase-correcting decimating inverse discrete cosine transform unit for field mode 41.

By the phase-correcting decimating inverse discrete cosine transform unit for field mode 41 performing matrix processing on the 4×8 phase-correcting filter matrix and on the input DCT coefficients discrete cosine transformed with the field DCT mode, a standard resolution picture devoid of dephasing between the top and bottom field can be produced on decoding. That is, with the phase-correcting decimating inverse discrete cosine transform unit for field mode 41, it is possible to generate a standard resolution picture (lower layer) which will give the phases in the vertical direction of the respective pixels of the top field of 1/4, 9/4, ... and the phases in the vertical direction of the respective pixels of the bottom field of 5/4, 13/4, ..., as shown in FIG. 24.

The processing contents of the phase-correcting decimating inverse discrete cosine transform unit for frame mode 42 are explained in further detail.

Meanwhile, it is possible for the phase-correcting decimating inverse discrete cosine transform unit for frame mode 42 to execute the one-block processing and/or the two-block processing which will be explained subsequently. If necessary, it is possible to switch between the one-block processing and the two-block processing or to execute one of these processings.

Figure 26:
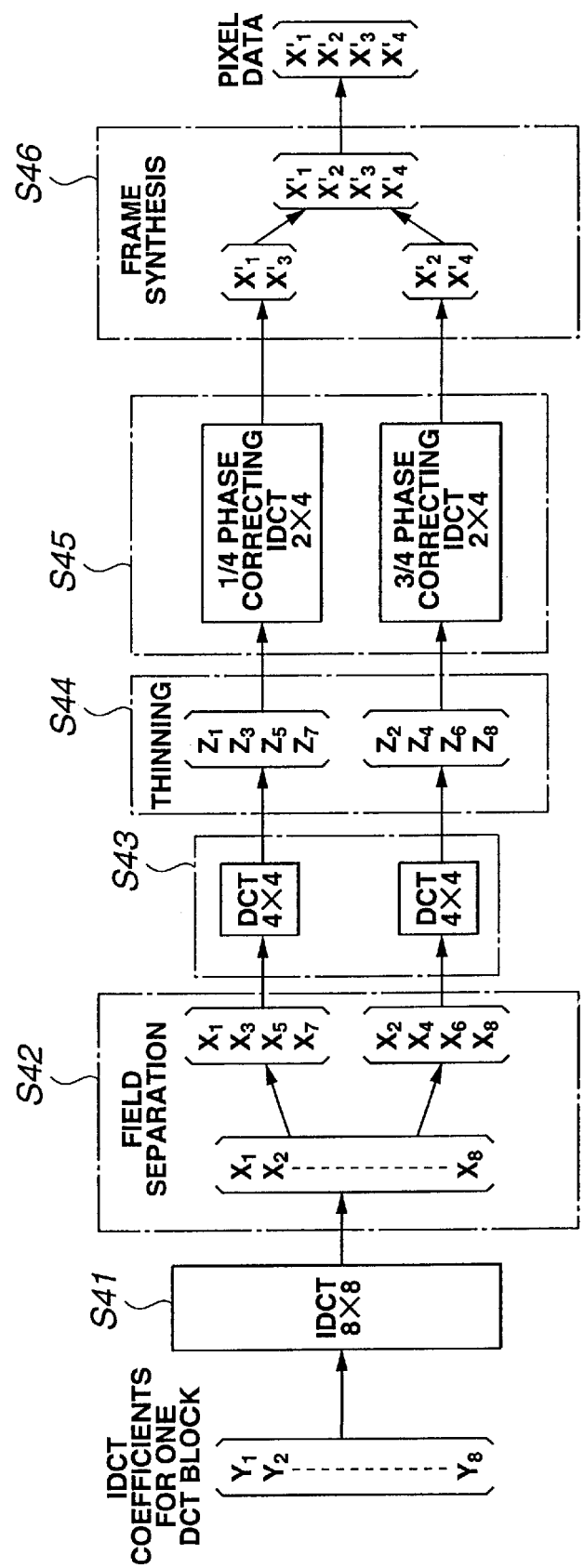
FIG. 26 illustrates the contents of one-block processing of the phase-correcting decimating IDCT device for the frame mode of the picture decoding apparatus according to the third embodiment of the present invention.

First, the one-block processing is explained. FIG. 26 illustrates the contents of the one-block processing.

The phase-correcting decimating inverse discrete cosine transform unit for frame mode 42 is fed with a bitstream, corresponding to a compression-encoded high resolution picture, in terms of a DCT block as a unit, as shown in FIG. 26.

First, at step S41, 8×8 inverse discrete cosine transform is applied to discrete cosine coefficients y of the sole DCT block. Then, at step S42, the 8×8 pixel data are field-separated into two pixel blocks. Then, at step S43, 4×4 discrete cosine transform is applied to each of the field-separated two pixel blocks. Next, at step S44, high-frequency components of the discrete cosine coefficients z of the respective pixel blocks are thinned out to give pixel blocks each made up of 2×2 discrete cosine coefficients. The processing as from the step S41 to the step S44 is the same as that from step S1 to step S4 for the one-block processing shown in FIG. 25.

Then, at step S45, inverse discrete cosine transform, correcting the pixel dephasing in the vertical direction, is performed on the pixel block corresponding to the top field, using a 2×4 phase correcting IDCT matrix adapted for performing 1/4 pixel phase correction. On the other hand, inverse discrete cosine transform, correcting the pixel dephasing in the vertical direction, is performed on the pixel block corresponding to the bottom field, using a 2×4 phase correcting IDCT matrix adapted for performing for 3/4 pixel phase correction. By performing the above-described decimating inverse discrete cosine transform, it is possible to produce 2×2 pixel data x', it being noted that pixel data in the vertical direction, among the totality of the pixel data of the pixel block corresponding to the top field, are denoted as $x'_1$ and $x'_3$, with pixel data in the vertical direction, among the totality of the pixel data of the pixel block corresponding to the bottom field, being denoted as $x'_2$, $x'_4$ in the drawing. These pixel data $x'$ give a standard resolution picture (lower layer) in which the phases in the vertical direction of the respective pixels of the top field are 1/4, 9/4 and those in the vertical direction of the respective pixels of the bottom field are 5/4, 13/4. The method for designing the 2×4 phase correcting IDCT matrix will be explained subsequently in detail.

Then, at step S46, pixel data of the pixel block corresponding to the top field and pixel data of the pixel block corresponding to the bottom field are synthesized to a frame. The processing at step S46 is the same as the processing at step S6 in the one-block processing shown in FIG. 25.

By performing the processing of steps S41 to S46, the phase-correcting decimating inverse discrete cosine transform unit for frame mode 42 is able to generate a picture free of phase deviation between respective pixels. On the other hand, the phase-correcting decimating inverse discrete cosine transform unit for field mode 41 is able to generate a picture free of dephasing with respect to the picture obtained on decoding by the phase-correcting decimating inverse discrete cosine transform unit for field mode 41.

It is also possible for the phase-correcting decimating inverse discrete cosine transform unit for frame mode 42 to execute the processing from step S41 to step S46 using a sole matrix.

Figure 27:
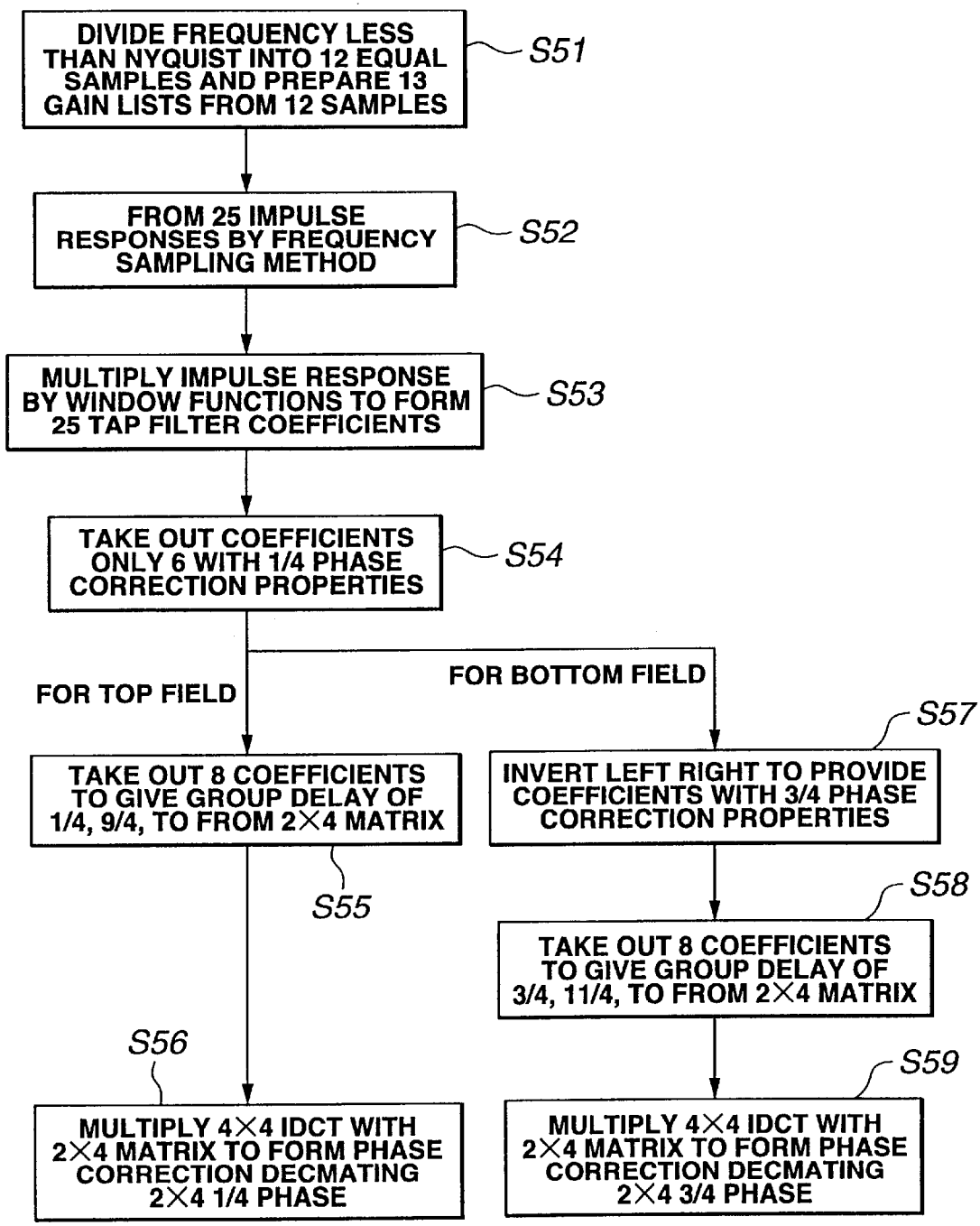
FIG. 27 is a flowchart for illustrating the designing sequence of the 2×4 phase-correcting IDCT matrix in which calculations are performed by the phase-correcting decimating IDCT device for the frame mode.
Figure 28:
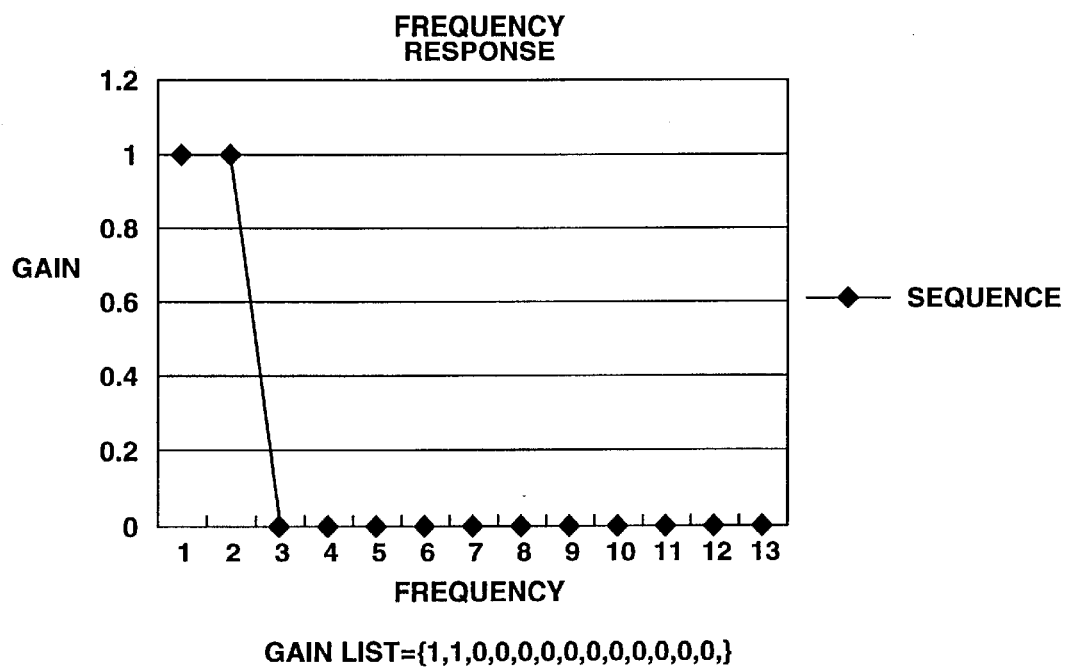
FIG. 28 illustrates a gain list prepared from frequency samples obtained on dividing the frequency range less than the Nyquist frequency at equal intervals into {(N−1)/2}.

The designing procedure for the 2×4 phase correcting IDCT matrix, processed at step S45 of the phase-correcting decimating inverse discrete cosine transform unit for frame mode 32, is shown in FIG. 27. This 2×8 phase correcting IDCT matrix is now explained.

First, at step S51, the Nyquist frequency and the lower frequency are divided into $\{(N-1)/2\}$ equal intervals, and gain lists are formulated from the frequency samples. For example, the Nyquist frequency and the lower frequency are divided into equal $(25-1)/2=12$ intervals to formulate 13 gain lists.

Figure 29:
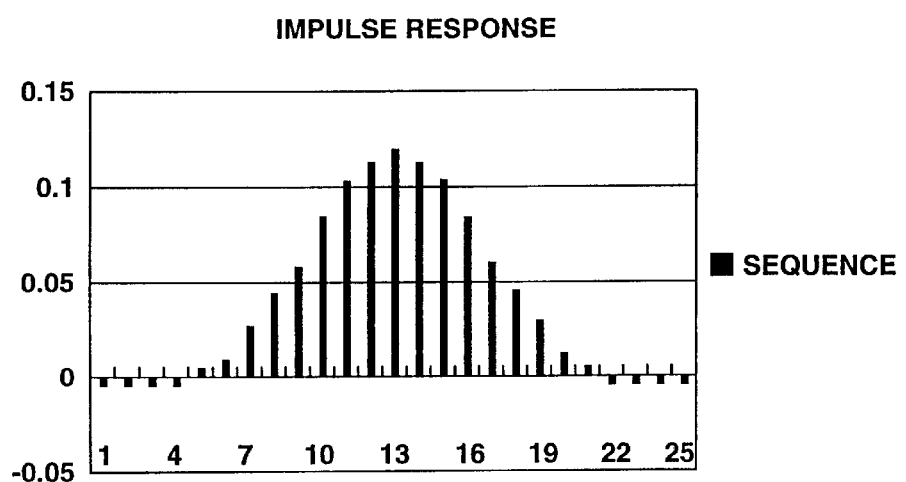
FIG. 29 illustrates the impulse response prepared on IDCT of the gain list.

Then, at step S52, 25 impulse responses are formulated by the frequency sampling method. That is, 13 gain lists are inverse discrete cosine transformed to formulate 25 FIR impulse responses. These 25 impulse responses are shown in FIG. 29.

Next, at step S53, these impulse responses are multiplied with a window function to formulate 25-tap filter coefficients c1 to c25.

The filter prepared at this step S53 serves as the prototype filter.

Then, at step S54, the prototype filter, having the 25 filter coefficients c1 to c25, is polyphase-resolved to retrieve only 6 filter coefficients c'1 to c'6 having the 1/4 phase correction characteristics to formulate a polyphase filter.

Specifically, the 14 filter coefficients c'1 to c'6, formulated from the prototype filters c1 to c25, having 57 coefficients, are as shown in the following equation (10):

$$-0.00236073\ 0.042655\ 0.115645\ 0.0850711\ 0.0105276$$
$$0.00328948 \qquad (10).$$

In this manner, the designing processing is split, after formulating the polyphase filter, into a 2×4 phase-correcting IDCT matrix for the top field and a 2×4 phase-correcting IDCT matrix for the bottom field.

Figure 30:
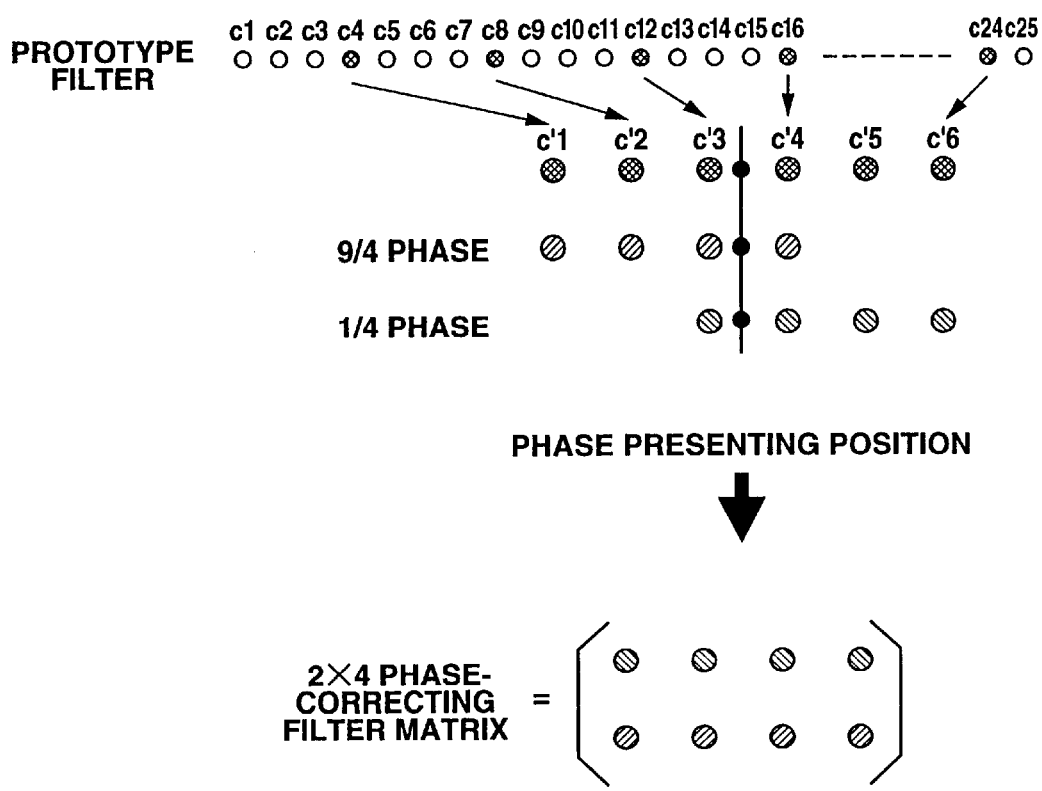
FIG. 30 illustrates the 2×4 phase-correcting IDCT matrix in which calculations are performed by the phase-correcting decimating IDCT device for the frame mode.

First, in formulating the 2×4 phase-correcting IDCT matrix for the top field, two coefficients are retrieved from each of the six polyphase-resolved filter coefficients c'1 to c'6, so that the group delay will be 1/4 and 9/4, respectively, to formulate a 2×4 phase-correcting filter matrix. The 2×4 phase-correcting filter matrix, thus formulated, is shown in FIG. 30.

For example, from the six filter coefficients c'1 to c'6 of the equation (10), the coefficients shown by the following equation (11) are retrieved:

| 9/4 phase | −0.00236073 | 0.042655 | 0.115645 | 0.0850711 | (11). |
|---|---|---|---|---|---|
| 1/4 phase | 0.115645 | 0.0850711 | 0.0105276 | 0.00328948 | |

If a 2×4 phase-correcting filter matrix is found from the coefficients of the equation (11), the matrix indicated by the following equation (12) is obtained:

| 0.115645 | 0.0850711 | 0.0105276 | 0.00328948 | (12). |
|---|---|---|---|---|
| −0.00236073 | 0.042655 | 0.115645 | 0.0850711 | |

If the 2×4 phase-correcting filter matrix, shown by the equation (12), is normalized, the matrix shown by the following equation (13) is obtained:

| 0.556108 | 0.409085 | 0.0506245 | −0.0158183 | (12). |
|---|---|---|---|---|
| −0.00979515 | 0.176984 | 0.479834 | 0.352977 | |

At step S56, the 4×4 IDCT matrix is multiplied with this 2×4 phase-correcting filter matrix to formulate a 2×4 phase-correcting IDCT matrix for the top field.

The 2×4 phase-correcting IDCT matrix, obtained on multiplying the 2×4 IDCT matrix with the 2×4 phase-correcting filter indicated by the above equation (13), is as shown in the following equation (14):

| 0.5 | 0.470628 | 0.0402901 | −0.0794137 | (14). |
|---|---|---|---|---|
| 0.5 | −0.318943 | −0.156819 | 0.0996811 | |

On the other hand, in formulating a 2×4 phase-correcting IDCT matrix for the bottom field, the six polyphase-resolved filter coefficients c'1 to c'6 are inverted at step S57 in the left-and-right direction so that the filter coefficients will be of the 3/4 phase correcting characteristics.

Then, at step S58, two coefficients are retrieved from each of the six polyphase-resolved filter coefficients c'1 to c'6, so that the group delay will be 3/4 and 11/4, respectively, to formulate a 2×4 phase-correcting filter matrix.

At step S59, the 4×4 IDCT matrix is multiplied at step S59 with the 2×4 phase-correcting filter matrix to formulate the phase-correcting filter matrix for the bottom field.

By performing the processing of the steps S51 to S59 as described above, it is possible to formulate the 2×4 phase-correcting filter matrix which the phase-correcting decimating inverse discrete cosine transform unit for frame mode 42 uses to perform the computations at step S45.

Figure 31:
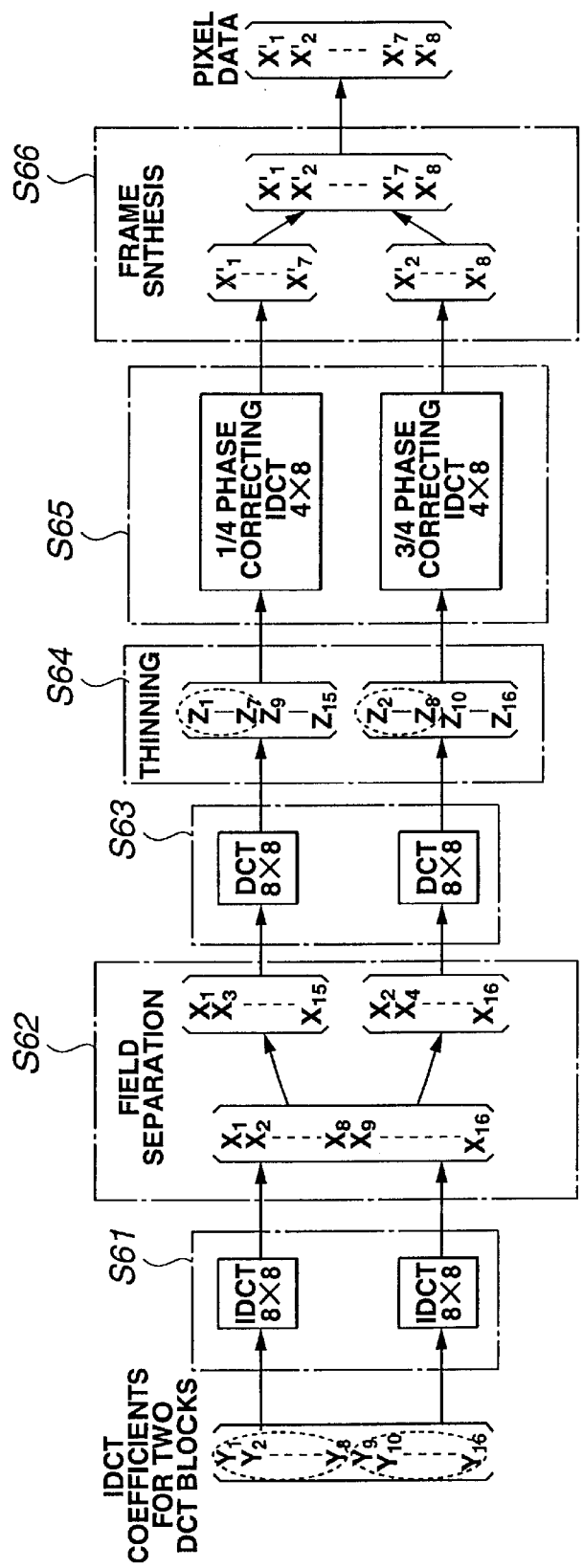
FIG. 31 illustrates the contents of the 2-block processing of the phase-correcting decimating IDCT device for the frame mode of the picture decoding apparatus according to the third embodiment of the present invention.

The two-block processing is now explained. FIG. 31 illustrates the contents of the two-block processing.

The phase-correcting decimating inverse discrete cosine transform unit for frame mode 42 is fed with a bitstream, corresponding to the compression-coded high resolution picture, in terms of two DCT blocks as a unit, as shown in FIG. 31. If, for example, a macro-block is made up of four DCT blocks of luminance components and two DCT blocks of chroma components, two DCT blocks neighboring along the vertical direction are input. If, for example, a macro-block is constituted as shown in FIG. 27, DCT blocks 0 and 2 of the luminance component (Y) are input as pairs, while DCT blocks 1 and 3 are also input as a pair.

First, at step S61, 8×8 inverse discrete cosine transform is applied independently to discrete cosine coefficients y of the two DCT blocks. The inverse discrete cosine transform gives 8×8 decoded pixel data x. Then, at step S62, two 8×8 pixel data are separated into respective fields. At the next step S63, 8×8 discrete cosine transform is executed on each of the two 8×8 pixel blocks separated into the respective fields. At the next step S64, high-frequency components of the discrete cosine coefficients z of the pixel block of the top field obtained on 8×8 discrete cosine transform are thinned out to give a pixel block constituted by 4×4 discrete cosine coefficients. Also, high-frequency components of the discrete cosine coefficients z of the pixel block of the bottom field obtained on 8×8 discrete cosine transform are thinned out to give a pixel block constituted by 4×4 discrete cosine coefficients.

The above-described processing from the step S61 to the step S64 is the same as the processing from step S11 to step S14 in the two-block processing shown in FIG. 26.

Then, at step S65, inverse discrete cosine transform, corrected for dephasing of pixels in the vertical direction, is performed on the pixel blocks of the top field, using a 4×8 phase-correcting IDCT matrix adapted for correcting the phase by 1/4 pixel. Similarly, inverse discrete cosine transform, corrected for dephasing of pixels in the vertical direction, is performed on the pixel blocks of the bottom field, using a 4×8 phase-correcting IDCT matrix adapted for correcting the phase by 3/4 pixel. By executing the above-described decimating inverse discrete cosine transform, it is possible to produce 4×4 pixel data x', it being noted that the pixel data along the vertical direction, among the totality of the pixel data of the pixel blocks of the top field are denoted as $x'_1, x'_2, x'_3 x'_5, x'_7$, with the pixel data along the vertical direction, among the totality of the pixel data of the pixel blocks of the bottom field, being denoted as $x'_2, x'_4, x'_6, x'_8$. These pixel data x' generate a standard resolution picture (lower layer) in which the phases of the respective pixels of the top field in the vertical direction are 1/4, 9/4, ..., with the phases of the respective pixels of the bottom field in the vertical direction being 5/4, 13/4, .... This designing method of the 4×8 phase-correcting IDCT matrix is the same as the matrix used in the processing by the phase-correcting decimating inverse discrete cosine transform unit for field mode 41.

Then, at step S66, pixel data of the pixel blocks of the top field and those of the pixel blocks of the bottom field are alternately taken on the line basis along the vertical direction and synthesized into a frame to generate decimating inverse discrete cosine transformed DCT blocks made up of 8×8 pixel data.

By the above-described two-block processing of the steps S61 to S66, it is possible with the phase-correcting decimating inverse discrete cosine transform unit for frame mode 42 to generate a picture free of dephasing between respective pixels. It is also possible to generate a picture free of dephasing with respect to the picture obtained on decoding by the phase-correcting decimating inverse discrete cosine transform unit for field mode 41.

It is also possible for the phase-correcting decimating inverse discrete cosine transform unit for frame mode 42 to perform the processing from the step S61 to the step S66 using a sole matrix.

The motion compensation unit for field mode 45 and motion compensation unit for frame mode 46 are explained in further detail.

First, the interpolation processing, executed by the motion compensation unit for frame mode 46, is explained.

In the motion compensation unit for frame mode 46, the pixels of the standard resolution picture stored in the frame memory 44 are interpolated, such as to cope with motion compensation of the 1/2 pixel precision of the high resolution picture, to generate pixels of 1/4 pixel precision.

For the pixels in the horizontal direction, pixels of the 1/2 pixel precision are generated from the pixels of integer precision stored in the frame memory 44. The motion compensation unit for field mode 45 generates pixels of the 1/2 pixel precision, using e.g., a half-band filter. Then, using a linear interpolation filter, the motion compensation unit for field mode 45 generates pixels of 1/4 pixel precision from the pixels of 1/2 pixel precision generated using a two-fold interpolation filter. The motion compensation unit for field mode 45 is able to output pixels of the standard resolution picture stored in the frame memory 44 as a reference picture corresponding to the standard resolution picture by employing a two-fold interpolation filter, such as a half-band filter, without executing the product and sum operations corresponding to the number of taps. Thus, the motion compensation unit for frame mode 45 is able to perform high speed processing. Moreover, this motion compensation unit for frame mode 45 is able to perform high speed processing. In this motion compensation unit for frame mode 45, the above processing can be performed using a sole matrix, while the pixels of 1/4 precision may be generated from the pixels of the integer precision using the four-fold interpolation filter.

Figure 32:
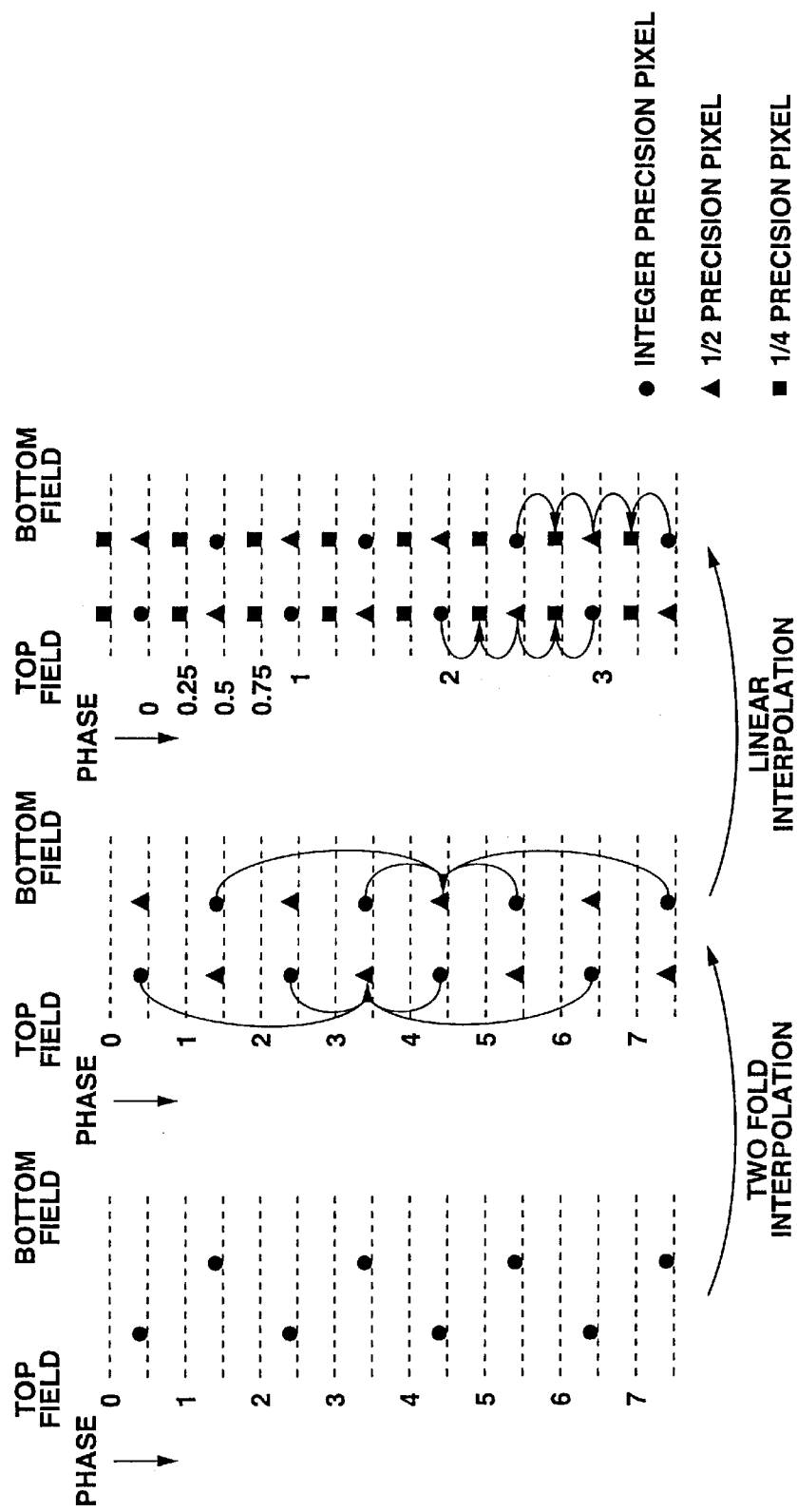
FIG. 32 consisting of FIGS. 32A through 32C, illustrates the interpolation processing in the motion compensation device for the field mode of the picture decoding apparatus according to the third embodiment of the present invention.

For the pixels in the vertical direction, pixels of the integer precision of the standard resolution picture, having dephasing between the top and bottom fields corrected such that the phase in the vertical direction of the pixels of the top field is 1/2, 5/2, ..., and the phase in the vertical direction of the pixels of the bottom field is 1, 3, ..., as shown in FIG. 32a, are taken out from the frame memory 44.

Then, for the pixels in the vertical direction, pixels of 1/2 pixel precision are generated from the pixels of the integer precision, taken out from the frame memory 44 in the field, using a two-fold interpolation filter, such as a half-band filter, as shown in FIG. 32b. That is, pixels of 1/2 pixel precision of the bottom top are generated, based on the pixels of the top field of the integer precision, while the pixels of the 1/2 pixel precision of the bottom field are generated, based on the pixels of the integer precision of the bottom field. For example, the pixels of the top field at the 7/2 vertical phase position are generated on two-fold interpolation from the pixels of the top field at 1/2, 5/2, 32/2, 13/2, positions, as shown in FIG. 32b. On the other hand, the pixels of the bottom field at the 9/2 vertical phase position are generated on two-fold interpolation from the pixels of the bottom field at 1, 3, 5, 7, ....

Then, for the pixels in the vertical direction, pixels of 1/2 pixel precision are generated from the pixels of the integer precision, generated by a two-fold interpolation filter between the top and bottom fields, using a linear interpolation filter, e.g., a half-band filter, as shown in FIG. 32c. For example, the pixels at the 1/2 vertical phase position are generated on linear interpolation from the pixels of the top field with integer precision, whilst the pixels at the 1/2 position of the bottom field are generated from the pixels of the bottom field of the integer precision. For example, pixels of the top field with the phase in the vertical direction of 7/2 are generated on twofold interpolation from the pixels of the top field at ... 1/2, 2/5, 9/2, 13/2 position On the other hand, the pixels of the bottom field at the 9/2 vertical phase position are generated on two-fold interpolation from the pixels of the bottom field at 3/2, 7/2, 11/2, 15/2 ....

Then, for the pixels in the vertical direction, pixels of 1/4 pixel precision are generated from the pixels of the 1/2 pixel precision, generated by a two-fold interpolation filter between the top and bottom fields, using a linear interpolation filter, e.g., a half-band filter, in a field, as shown in FIG. 32c. That is, pixels of the 1/4 pixel precision of the bottom field are generated based on the pixels of the 1/2 pixel precision of the top field, while pixels of the 1/4 pixel precision of the bottom field are generated based on the pixels of the 1/2 pixel precision of the bottom field. For example, the pixels at the 9/4 vertical phase position are generated on linear interpolation from the pixels of the top field at 2, 5/2 positions, whilst the pixels at the 1/2 vertical phase position of the bottom field are generated from the pixels of the bottom field at the 104, 3 positions.

By performing interpolation in the vertical direction, pixels of the same phase as those of the standard resolution picture stored in the frame memory 30 can be output as a reference picture consistent with the high resolution picture, in the motion compensation unit for field mode 45 employing a two-fold interpolation filter, such as a half-band filter, without executing the product sum processing corresponding to the number of taps. So, the motion compensation unit for frame mode 32 is able to perform high speed processing. It is also possible for the motion compensation unit for field mode 31 to execute the above processing using a sole matrix or to generate 1/4 pixel precision from the pixels of the integer precision using a four-fold interpolation filter.

Next, the interpolation processing, executed by the motion compensation unit for frame mode 46, is explained. In the motion compensation unit for frame mode 46, the pixels of the standard resolution picture stored in the frame memory 44 are interpolated, such as to cope with motion compensation of the 1/2 pixel precision of the high resolution picture, to generate pixels of 1/4 pixel precision.

For the pixels in the horizontal direction, pixels of the 1/2 pixel precision are generated from the pixels of integer precision stored in the frame memory 44, using a two-fold interpolation filter. The motion compensation unit for frame mode 46 generates pixels of the 1/2 pixel precision, using e.g., a half-band filter. Then, using a linear filter, the motion compensation unit for frame mode 46 generates pixels of the 1/4 pixel precision from the pixels of the 1/2 precision generated using the two-fold interpolation filter. The motion compensation unit for frame mode 46 is able to output pixels of the standard resolution picture stored in the frame memory 44 as a reference picture corresponding to the standard resolution picture by employing a two-fold interpolation filter, such as a half-band filter, without executing the product and sum operations corresponding to the number of taps. Thus, the motion compensation unit for frame mode 46 is able to perform high speed processing. Moreover, this motion compensation unit for frame mode 32 is able to perform high speed processing. In this motion compensation unit for frame mode 32, the above processing can be performed using a sole matrix, while the pixels of 1/4 precision may be generated from the pixels of the integer precision using the four-fold interpolation filter.

Figure 33:
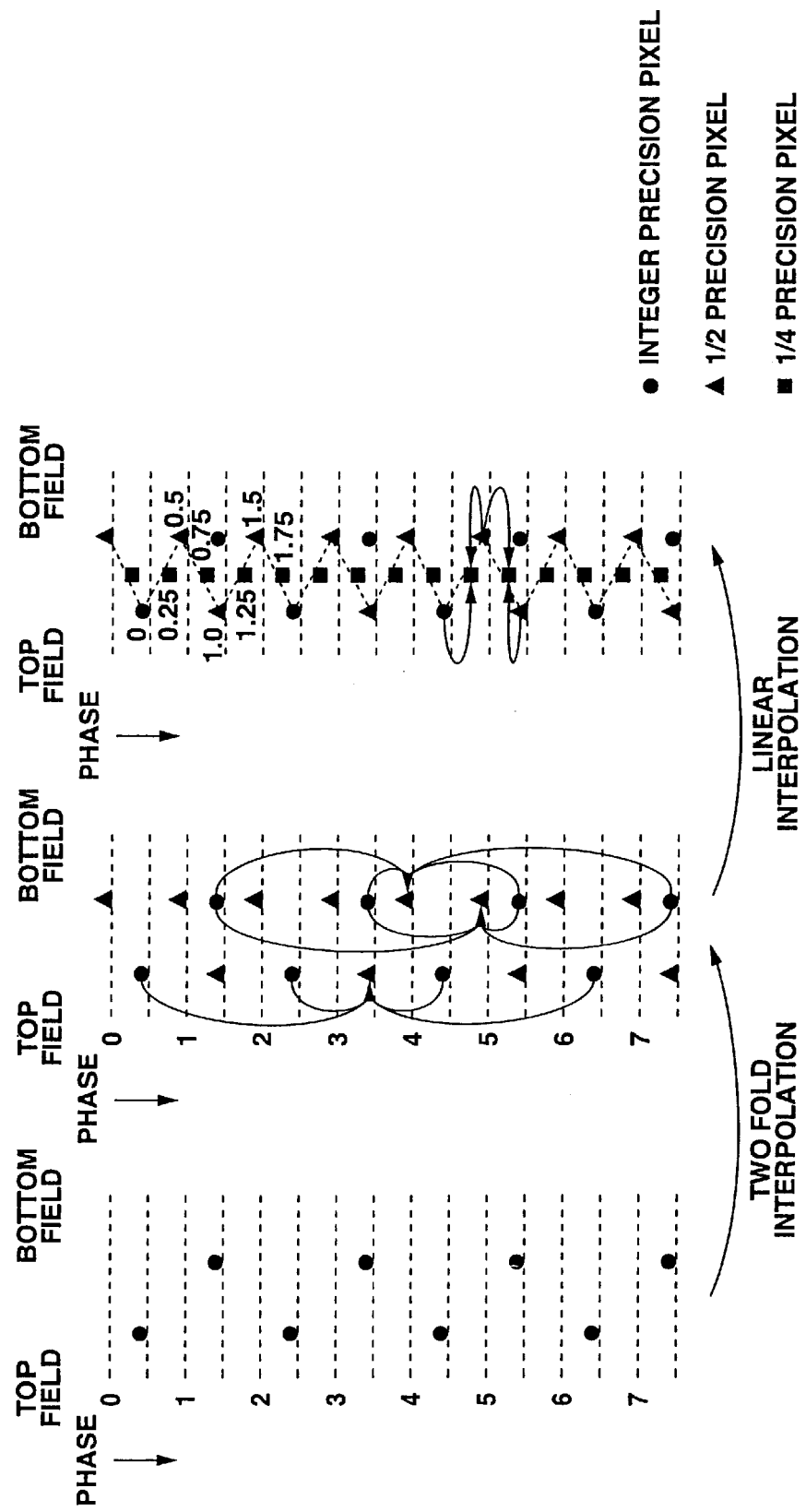
FIG. 33 consisting of FIGS. 33A through 33C, illustrates the interpolation processing in the motion compensation device for the frame mode of the picture decoding apparatus according to the third embodiment of the present invention.

For the pixels in the vertical direction, pixels of the integer precision of the standard resolution picture, having dephasing between the top and bottom fields, such that the phase in the vertical direction of the pixels of the top field is 1/2, 5/2, 9/2, . . . , and the phase in the vertical direction of the pixels of the bottom field is 3/2, 7/2, 11/2 . . . , as shown in FIG. 33a, are taken out from the frame memory 30, Then, for the pixels in the vertical direction, pixels of 1/2 pixel precision are generated from the pixels of the integer precision, taken out from the frame memory 30 in the field, using a two-fold interpolation filter, such as a half-band filter, as shown in FIG. 33b. For the other field, pixels dephased 1/4 and 3/4 are generated from the pixels of the integer precision taken out from the frame memory 44, with the aid of a filter. For example, the pixels of the top field with 1/2 pixel precision are generated based on the integer precision pixels of the top field, while pixels dephased by 1/4 and 3/4 pixels are generated based on the integer precision pixels of the bottom field. Specifically, the top field pixels at the 7/2 vertical phase positions are generated on two-fold interpolation from the pixels of the top field at 1/2, 5/2, 32/2, 13/2, . . . positions, as shown in FIG. 33b. On the other hand, the pixels of the bottom field at the 4 and 5 vertical phase positions are generated on two-fold interpolation from the pixels dephased by 1/4 or 3/4 from the pixels of the bottom field at 3/2, 7/2, 11/2 and 15/2, Then, for the pixels in the vertical direction, pixels of 1/4 pixel precision are generated from the pixels of the 1/2 pixel precision, generated by a two-fold interpolation filter between the top and bottom fields, using a linear interpolation filter, as shown in FIG. 33c. For example, the pixels at the 1/4 vertical phase position are generated on linear interpolation from the pixels of the top field at the 0 position and those at the 1/2 position, whilst the pixels at the 3/4 vertical phase position are generated on linear interpolation from the pixels of the bottom field at the 1/2 position and those of the top field at the 1 position.

By performing interpolation in the vertical direction, pixels of the same phase as those of the standard resolution picture stored in the frame memory 44 can be output as a reference picture consistent with the high resolution picture, in the motion compensation unit for frame mode 46 employing a two-fold interpolation filter, such as a half-band filter, without executing the product sum processing corresponding to the number of taps. So, the motion compensation unit for frame mode 45 is able to perform high speed processing. It is also possible to prevent so-called field inversion or field mixing to prevent deterioration in the picture quality, with there being no dephasing between the top and bottom fields. It is also possible for the motion compensation unit for frame mode 46 to execute the above processing using a sole matrix or to generate 1/4 pixel precision from the pixels of the integer precision using a four-fold interpolation filter.

The picture decoding device 40 according to the third embodiment of the present invention applies 4×4 decimating IDCT to each of the top and bottom fields in the field DCT mode to the chroma signals, decodes the standard resolution picture with phase correction, while separating the frames and applying decimating IDCT with phase correction to decode the standard resolution picture. Since the processing is preferred embodiment: for each of the field DCT mode and the frame DCT mode, the properties innate to the interlaced scanned pictures are not lost. Moreover, dephasing between the top and bottom fields produced on decimating IDCT is eliminated to prevent deterioration of the output picture quality. That is, in the present picture decoding device 40, no phase correction is required in outputting the decoded picture stored in the frame memory 24 to simplify the processing without deteriorating the picture quality.

In the picture information conversion device 40 of the third embodiment of the present invention, described above, IDCT is applied to four low-range coefficients in the horizontal direction and to eight coefficients in the vertical direction, for luminance signals, to prevent deterioration of the picture quality ascribable to interlaced scanning to reduce the processing volume necessary for decoding the input bitstream to reduce the memory capacity.

Moreover, with the picture information conversion device 40, according to the third embodiment of the present invention, as described above, in which IDCT is applied only to 4×4 coefficients in the low frequency range of the chroma signals for which deterioration in picture quality is less perceptible to the human eyes than those of the luminance signals so that the processing volume and the memory capacity further may be diminished.

Although the bitstream by MPEG-2 is input to the picture information conversion device 1, the bitstream input may also be a bitstream by e.g., MPEG-1 or H.263, provided that the bitstream has been encoded by orthogonal transform and motion compensation. Moreover, if the input bitstream is of the 420 format as shown in FIG. 29, there is only the frame DCT mode for the chroma signals, so that the decimating IDCT unit for field mode 41 is not required.

Referring to the drawings, a fourth embodiment of the present invention is explained in detail.

Figure 34:
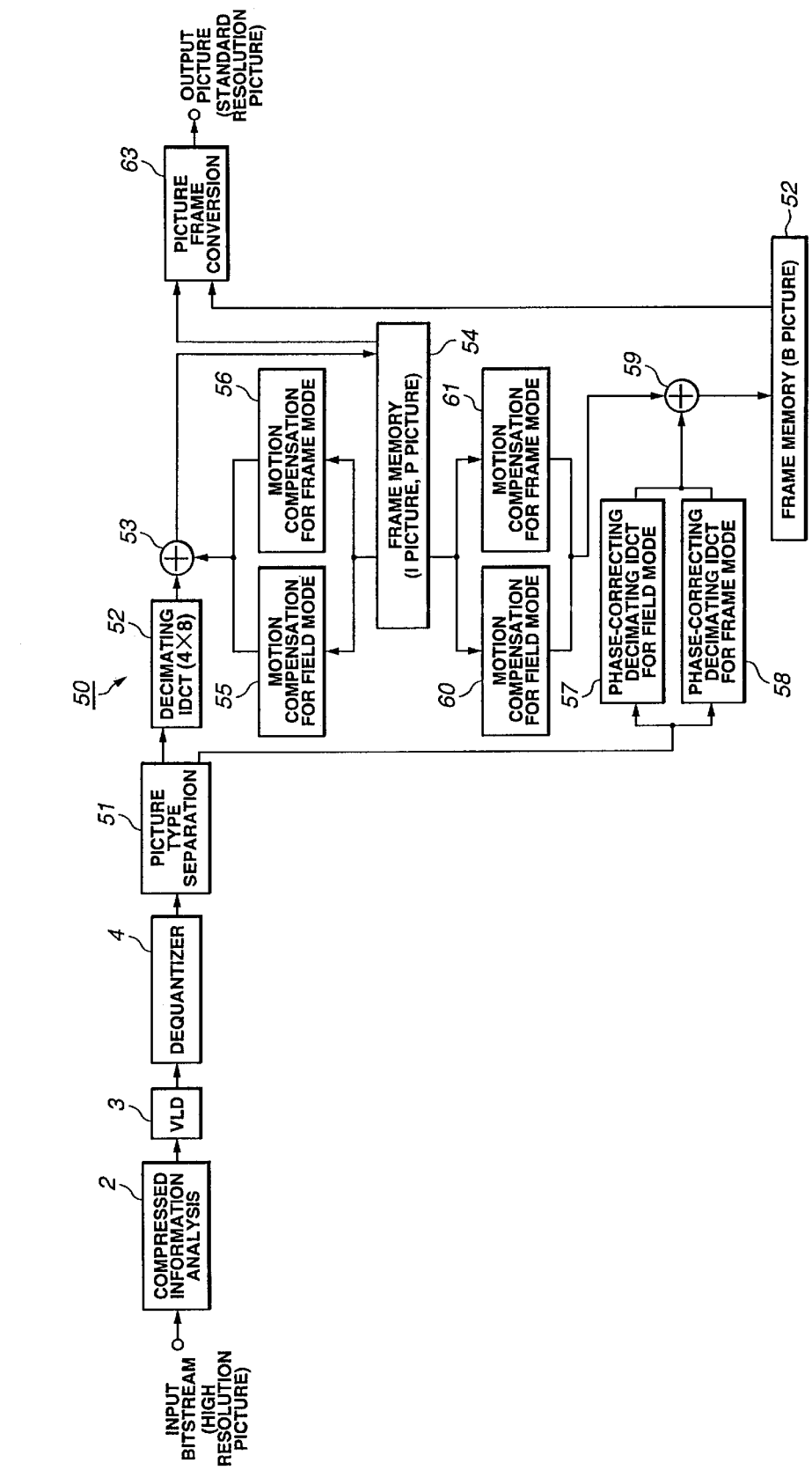
FIG. 34 is a block diagram showing a picture decoding apparatus according to a fourth embodiment of the present invention.

Similarly to the picture decoding device 40, according to the third embodiment, the picture decoding device according to the third embodiment is fed with a bitstream, obtained on compressing an interlaced scanned picture, as a high resolution picture with 1152 effective lines in the vertical direction, in accordance with MPEG-2 (Moving Picture Experts Group phase-2) and decodes this input bitstream, decimates the bitstream to a 1/2 resolution to output a standard resolution picture with 576 effective vertical lines. FIG. 34 shows a picture decoding device according to the fourth embodiment of the present invention.

In the following explanation of the picture decoding device 50, the same parts or components as those constituting the picture decoding device 40 of the above-described third embodiment are not explained specifically.

Referring to FIG. 34, this picture decoding device 50 includes a bitstream analysis unit 2 for analyzing an input bitstream of a compressed high resolution picture, and a variable length decoder 3 for decoding the bitstream encoded with variable length encoding of allocating a code length corresponding to the data occurrence frequency. The picture decoding device 50 also includes an inverse quantizer 4 for multiplying respective coefficients of the DCT block with quantization steps, a luminance signal/chroma signal separating device 51 for separating inverse quantized DCT coefficients into luminance signals and chroma signals, and a decimating inverse discrete cosine transform unit 52 for applying decimating inverse discrete cosine transform to the DCTed DCT block of the luminance signals to generate a standard resolution picture. The picture decoding device 50 also includes an addition unit 53 for summing the decimating inverse discrete cosine transformed standard resolution picture to the motion-compensated reference picture, a frame memory 54 for transiently storing the reference picture, a motion compensation unit for field mode 55 for motion-compensating the reference picture stored by the frame memory 54 in meeting with the field motion prediction mode, and a motion compensation unit for frame mode 56 for motion-compensating the reference picture stored in the frame memory 54 in meeting with the frame motion prediction mode. The picture decoding device 50 also includes a phase-correcting decimating inverse discrete cosine transform unit for field mode 57 for applying decimating IDCT with dephasing correction on the DCT block of the separated chroma signal, DCTed in the field DCT mode, to generate a standard resolution picture, and a phase-correcting decimating inverse discrete cosine transform unit for frame mode 58 for applying decimating IDCT with dephasing correction on the DCT block of the separated chroma signal, DCTed in the frame DCT mode, to generate a standard resolution picture. The picture decoding device 50 also includes an addition unit 59 for summing the decimating inverse discrete cosine transformed standard resolution picture to the motion-compensated reference picture, a motion compensation unit for field mode 60 for motion-compensating the reference picture stored by the frame memory 54 in meeting with the field motion prediction mode, and a motion compensation unit for frame mode 61 for motion-compensating the reference picture stored in the frame memory 54 in meeting with the frame motion prediction mode. The picture decoding device 50 also includes frame memory 62 for transiently storing the reference picture pertinent to a B-picture and a picture frame conversion unit 63 for outputting picture data of the standard resolution for converting the picture frame of a picture stored in the frame memory 62 and for correcting the pixel dephasing for display on e.g., a TV monitor.

Based on the analysis result information by the compressed information analysis unit 2, the picture type separating device 51 separates the input bitstream into a bitstream pertinent to I- and P-pictures and a bitstream pertinent to B-pictures. The picture type separating device 51 furnishes the bitstream pertinent to the I- and P-pictures to a decimating inverse discrete cosine transform unit 52, while furnishing the bitstream pertinent to the B-pictures to the phase-correcting decimating IDCT unit for field mode 57 or to the decimating IDCT unit for frame mode 58.

The decimating inverse discrete cosine transform unit 52 applies IDCT to the four coefficients in the horizontal direction for the low range and to the eight coefficients in the vertical direction in the DCTed macroblock of the luminance signals indicating 8×8 coefficients, as shown in FIG. 2. That is, the decimating inverse discrete cosine transform unit 52 applies decimating IDCT to the four coefficients in the horizontal direction for the low range and to the eight coefficients in the vertical direction. Specifically, the decimating inverse discrete cosine transform unit 52 executes decimating IDCT, using a 4×8 matrix executing a DCT in the horizontal direction consisting of a transposed matrix of an order four IDCT matrix $iD_4^t$ and a zero-matrix $0_4$ of 4×4, and an 8×8 matrix executing the DCT in the vertical direction consisting of an order eight inverse DCT matrix $iD_8$, on the input quantized 8×8 DCT coefficients C for luminance coefficients, to yield 4×8 decoded pixel data, as shown in FIG. 3. This decimating inverse discrete cosine transform unit 22, executing the above-described decimating IDCT, is able to decode the standard resolution picture in which each DCT block is made up of 4×8 pixels.

If the macroblock, processed with decimating IDCT by the decimating inverse discrete cosine transform unit 52, is an intra-picture, the intra-picture is directly stored by the adder 53 in the frame memory 54. If a macro-block, processed with decimating IDCT by the decimating inverse discrete cosine transform unit 52, is an inter-picture, the adder 53 synthesizes the reference picture, motion compensated by the motion compensation unit for field mode 55 or by the motion compensation unit for frame mode 56, to the inter-picture, to store the synthesized picture in the frame memory 54.

Since the resolution in the horizontal direction is decimated by one half in the decimating inverse discrete cosine transform unit 52, it is sufficient if the memory capacity of the frame memory 24 is one-half the resolution proper to the bitstream input to the compressed information analysis unit 2.

The motion compensation unit for field mode 55 is used if the motion prediction mode for the macro-block is the field motion prediction mode. The motion compensation unit for field mode 55 interpolates the reference picture of the standard resolution picture stored in the frame memory 54, depending e.g., on the value of the motion vector in the input bitstream, by linear interpolation of one-half pixel precision in the vertical direction.

As for the horizontal direction, the motion compensation unit for field mode 55 creates pixels of approximately one-half pixel precision, with respect to the reference picture of the standard resolution picture stored in the frame memory 54, by a two-fold interpolation filter, such as a half-band filter, depending on e.g., the value of the motion vector in the input bitstream, to perform interpolation to approximately 1/4 pixel precision based on the so-created pixels. The reason is that, in the decimating inverse discrete cosine transform unit 52, the resolution of the input bitstream is decimated to 1/2.

For outputting pixel values of the same phase as the pixel supplied from the frame memory 54, as a predicted picture, using a half-band filter, fast calculation processing is feasible, because there is no necessity of executing product-sum processing in meeting with the number of taps. On the other hand, if a half-band filter is used, since the coefficient can be represented by $x/2^n$, it is possible to perform division necessary for filtering at high speed by shift processing. Alternatively, pixels necessary for motion compensation can be directly produced by four-fold interpolation filtering. In actuality, those coefficients which permit two-stage interpolation, executed by the two-fold interpolation filter and the linear interpolation, at a time, may be provided at the outset to perform the processing as if the interpolation is one-stage interpolation.

The motion compensation unit for field mode 55, performing the above-described processing, performs motion compensation in meeting with the field motion prediction mode. The reference picture, motion compensated by the motion compensation unit for field mode 55, is sent to the adder 53 for synthesis to an inter-picture.

The motion compensation unit for frame mode 56 is used if the motion prediction mode for the macro-block is the frame motion prediction mode. The motion compensation unit for frame mode 56 interpolates the reference picture of the standard resolution picture stored in the frame memory 54, depending e.g., on the value of the motion vector in the input bitstream, by linear interpolation of one-half pixel precision in the vertical direction.

As for the horizontal direction, the motion compensation unit for frame mode 56 creates pixels of approximately one-half pixel precision, with respect to the reference picture of the standard resolution picture stored in the frame memory 54, by a two-fold interpolation filter, such as a half-band filter, depending on e.g., the value of the motion vector in the input bitstream, to perform interpolation of approximately 1/4 pixel precision based on the so-created pixels.

For outputting pixel values of the same phase as the pixel supplied from the frame memory 54, as a predicted picture, using a half-band filter, fast calculation processing is feasible, because there is no necessity of executing product-sum processing in meeting with the number of taps. On the other hand, if a half-band filter is used, since the coefficient can be represented by $x/2^n$, it is possible to perform division necessary for filtering at high speed by shift processing. Alternatively, pixels necessary for motion compensation can be directly produced by four-fold interpolation filtering. In actuality, those coefficients which permit two-stage interpolation, executed by the two-fold interpolation filter and the linear interpolation, at a time, may be provided at the outset to perform the processing as if the interpolation is one-stage interpolation.

The motion compensation unit for frame mode 56, performing the above-described processing, performs motion compensation in meeting with the field motion prediction mode. The reference picture, motion compensated by the motion compensation unit for frame mode 56, is sent to the adder 53 for synthesis to an inter-picture.

The phase-correcting decimating inverse discrete cosine transform unit for field mode 57 is used if the macro-block of an input bitstream is discrete cosine transformed in the field DCT mode. The decimating inverse discrete cosine transform unit for field mode 57 performs inverse discrete cosine transform only on the low-range 4×4 coefficients of the DCT block, showing 8×8 coefficients in the macro-block discrete cosine transformed in the field DCT mode, as shown in FIG. 8. That is, the phase-correcting decimating inverse discrete cosine transform unit for field mode 57 performs decimating inverse discrete cosine transform based on four point inverse discrete cosine coefficients in the horizontal direction and in the vertical direction. This phase-correcting decimating inverse discrete cosine transform unit for field mode 57 can decode the standard resolution picture, each DCT block of which is made up of 4×4 pixels, by the above-described decimating inverse discrete cosine transform. The phases of the pixels of the decoded picture data are 1/2, 5/2, . . . , in the vertical direction of the respective pixels of the top field, with the phases in the vertical direction of the respective pixels of the bottom field being 1, 3, . . . That is, in the top field of the decoded lower layer, the phase of the leading end pixel (pixel with the phase of 1/2) is intermediate between the first and second pixels (pixels with the phase 0 and the phase 2) as from the leading end of the top field of the upper layer, while the phase of the second pixel as from the leading end pixel (pixel with the phase of 2/5) is intermediate between the third and fourth pixels (pixels with the phase 4 and the phase 6) as from the leading end of the top field of the upper layer. On the other hand, in the bottom field of the decoded lower layer, the phase of the leading end pixel (pixel with the phase of 1) is intermediate between the first and second pixels (pixels with the phase 1 and the phase 3) as from the leading end of the bottom field of the upper layer, whereas the phase of the second pixel as from the leading end pixel (pixel with the phase of 3) is intermediate between the third and fourth pixels (pixels with the phase 5 and the phase 7) as from the leading end of the bottom field of the upper layer.

The phase-correcting decimating inverse discrete cosine transform unit for frame mode 58 is used when the macro-block of the input bitstream is discrete cosine transformed with the frame DCT mode. The decimating inverse discrete cosine transform unit for frame mode 58 performs decimating inverse discrete cosine transform on the DCT block showing 8×8 coefficients in the macro-block discrete cosine transformed in the frame DCT mode. The decimating inverse discrete cosine transform unit for frame mode 58 decodes the standard resolution picture, each DCT block of which is constituted by 4×4 pixels, while generating a picture of the same phase as the phase of the pixel of the standard resolution picture generated by the phase-correcting decimating inverse discrete cosine transform unit for field mode 57. That is, the phases in the perpendicular direction of the respective pixels of picture data decoded by the decimating inverse discrete cosine transform unit for frame mode 58 are such that the phases in the perpendicular direction of respective pixels of the top field are 1/2, 5/2, . . . , with the phases in the perpendicular direction of the respective pixels of the bottom field being 1, 3, . . . , as shown in FIG. 31.

If the macroblock, processed with decimating IDCT by the phase-correcting decimating inverse discrete cosine transform unit for field mode 57 or the phase-correcting decimating inverse discrete cosine transform unit for frame mode 58, is an intra-picture, the intra-picture is directly stored by the adder 59 in the frame memory 62. If a macro-block, processed with decimating IDCT by the phase-correcting decimating inverse discrete cosine transform unit for field mode 57 or the phase-correcting decimating inverse discrete cosine transform unit for frame mode 58, is an inter-picture, the adder 59 synthesizes the reference picture, motion compensated by the motion compensation unit for field mode 60 or by the motion compensation unit for frame mode 61, to the inter-picture, to store the synthesized picture in the frame memory 62.

The motion compensation unit for field mode 60 is used if the motion prediction mode for the macro-block is the field motion prediction mode. The motion compensation unit for field mode 60 interpolates the reference picture of the standard resolution picture stored in the frame memory 54, depending e.g., on the value of the motion vector in the input bitstream, by linear interpolation of one-half pixel precision in the vertical direction, before proceeding to decimation by 1/2 taking the field-to-phase into account.

As for the horizontal direction, the motion compensation unit for field mode 60 creates pixels of approximately one-half pixel precision, with respect to the reference picture of the standard resolution picture stored in the frame memory 54, by a two-fold interpolation filter, such as a half-band filter, depending on e.g., the value of the motion vector in the input bitstream, to perform interpolation of approximately 1/4 pixel precision based on the so-created pixels.

By performing the above processing, the motion compensation unit for field mode 60 performs motion compensation in meeting with the field motion prediction mode. The reference picture, motion compensated by the motion compensation unit for field mode 60, is routed to the adder 59 for synthesis to an inter-picture.

The motion compensation unit for frame mode 61 is used if the motion prediction mode for the macro-block is the frame motion prediction mode. The motion compensation unit for frame mode 61 interpolates the reference picture of the standard resolution picture stored in the frame memory 54, depending e.g., on the value of the motion vector in the input bitstream, by linear interpolation of one-half pixel precision in the vertical direction, before proceeding to decimation by 1/2 which takes the field-to-field phase into account.

As for the horizontal direction, the motion compensation unit for frame mode 61 creates pixels of approximately one-half pixel precision, with respect to the reference picture of the standard resolution picture stored in the frame memory 54, by a two-fold interpolation filter, such as a half-band filter, depending on e.g., the value of the motion vector in the input bitstream, to perform interpolation of approximately 1/4 pixel precision based on the so-created pixels.

By performing the above processing, the motion compensation unit for frame mode 61 performs motion compensation in meeting with the field motion prediction mode. The reference picture, motion compensated by the motion compensation unit for frame mode 61, is routed to the adder 59 for synthesis to an inter-picture.

It is sufficient if the memory capacity of the frame memory 62 is one-fourth of the resolution proper to the bitstream input to the compressed information analysis unit 2.

The picture frame conversion device 63 is fed with the reference picture of the standard resolution stored in the frame memory 54 or a picture synthesized by the adder 53, and with the reference picture of the standard resolution stored in the frame memory 44 or the picture synthesized by the addition unit 59, to convert the picture frame of this reference picture by post-filtering for conformity to the a standard for a standard resolution television.

The picture decoding device 50, described above, decodes the bitstream, compressed from the high resolution picture in accordance with MPEG-2, while decimating the resolution to 1/2 to output a standard resolution picture.

The motion compensation unit for field mode 55 and the motion compensation unit for frame mode 56 are explained in further detail.

The interpolation processing, performed by the motion compensation unit for field mode 55, is first explained. This motion compensation unit for field mode 55 interpolates pixels of the standard resolution picture stored in the frame memory 54, in keeping with the motion compensation of 1/2 pixel precision of the high resolution picture, to generate pixels of 1/4 pixel precision.

For the pixels in the horizontal direction, pixels of 1/2 pixel precision are generated from the pixels of the integer precision, stored in the frame memory 54, using a two-fold interpolation filter. The motion compensation unit for field mode 55 generates pixels of 1/2 pixel precision, using e.g., a half-band filter and, using a linear filter, then generates pixels of the 1/4 pixel precision from the pixels of the 1/2 precision generated using the two-fold interpolation filter. The motion compensation unit for field mode 55 is able to output pixels of the standard resolution picture stored in the frame memory 54 as a reference picture corresponding to the standard resolution picture by employing a two-fold interpolation filter, such as a half-band filter, without executing the product and sum operations corresponding to the number of taps. Thus, the motion compensation unit for field mode 55 is able to perform high speed processing. In this motion compensation unit for field mode 55, the above processing can be performed using a sole matrix, while the pixels of 1/4 precision may be generated from the pixels of the integer precision using the four-fold interpolation filter.

For the pixels in the vertical direction, pixels of the integer precision of the standard resolution picture, having dephasing between the top and bottom fields, such that the phase in the vertical direction of the pixels of the top field is 1/2, 5/2, . . . , and the phase in the vertical direction of the pixels of the bottom field is 1, 3, . . . , as shown in FIG. 26*a*, are taken out from the frame memory 54.

Then, for the pixels in the vertical direction, pixels of 1/2 pixel precision are generated from the pixels of the integer precision, taken out from the frame memory 54 within the field, using a two-fold interpolation filter, such as a half-band filter, as shown in FIG. 26*b*. That is, pixels of 1/2 pixel precision of the top field are generated, based on the pixels of the top field of the integer precision, while the pixels of the 1/2 pixel precision of the bottom field are generated, based on the pixels of the integer precision of the bottom field. For example, the pixels of the top field at the 7/2 vertical phase position are generated on two-fold interpolation from the pixels of the top field at 1/2, 5/2, 32/2, 13/2, ... positions, as shown in FIG. 26b. On the other hand, the of the bottom field at the 4 vertical phase position are generated on two-fold interpolation from the pixels of the bottom field at 1, 3, 5, 7, . . . .

Then, for the pixels in the vertical direction, pixels of 1/2 pixel precision are generated from the pixels of the integer precision, taken out within the field, using a two-fold interpolation filter, such as a half-band filter, as shown in FIG. 26c. That is, pixels of 1/4 pixel precision of the top field are generated, based on the pixels of the top field of the 1/2 pixel precision, while the pixels of the 1/4 pixel precision of the bottom field are generated, based on the pixels of the 1/2 pixel precision of the bottom field. For example, the pixels of the top field at the 9/4 vertical phase position are generated on two-fold interpolation from the pixels of the top field at 2, 5/2 positions, as shown in FIG. 26c. On the other hand, the pixels of the bottom field at the 10/4 vertical phase position are generated on linear interpolation from the pixels of the bottom field at 9/4 and 11/4 positions.
with the reference picture of the standard resolution stored in the frame memory 44 or the picture synthesized by the addition unit 43, to convert the picture frame of this reference picture by post-filtering for conformity to the a standard for a standard resolution television.

By performing the interpolation in the vertical direction, in the motion compensation unit for field mode 55, employing a two-fold interpolation filter, such as a half-band filter, the pixels of the same phase as the pixels of the standard resolution picture stored in the frame memory 54 can be output as a reference picture consistent with the high resolution picture without executing the product and sum operations corresponding to the number of taps. Thus, the motion compensation unit for field mode 55 is able to perform high speed processing. Moreover, this motion compensation unit for field mode 55 is able to perform high speed processing. In this motion compensation unit for field mode 55, the above processing can be performed using a sole matrix, while the pixels of 1/4 precision may be generated from the pixels of the integer precision using the four-fold interpolation filter.

Next, the interpolation performed by the motion compensation unit for frame mode 56 is explained. In this motion compensation unit for frame mode 56, the pixels of the standard resolution picture stored in the frame memory 54 are interpolated, in keeping with the motion compensation of 1/2 pixel precision of the high resolution picture to generate pixels of 1/4 pixel precision.

For the pixels in the horizontal direction, pixels of 1/2 pixel precision are generated from the pixels of the integer precision, stored in the frame memory 54, using a two-fold interpolation filter. The motion compensation unit for frame mode 56 generates pixels of 1/2 pixel precision, using e.g., a half-band filter and, using a linear filter, then generates pixels of the 1/4 pixel precision from the pixels of the 1/2 precision generated using the two-fold interpolation filter. The motion compensation unit for frame mode 56 is able to output pixels of the same phase as the standard resolution picture stored in the frame memory 54 as a reference picture corresponding to the standard resolution picture by employing a two-fold interpolation filter, such as a half-band filter, without executing the product and sum operations corresponding to the number of taps. Thus, the motion compensation unit for frame mode 56 is able to perform high speed processing. Moreover, this motion compensation unit for frame mode 56 is able to perform high speed processing. In this motion compensation unit for frame mode 56, the above processing can be performed using a sole matrix, while the pixels of 1/4 precision may be generated from the pixels of the integer precision using the four-fold interpolation filter.

For the pixels in the vertical direction, pixels of the integer precision of the standard resolution picture, having dephasing between the top and bottom fields, such that the phase in the vertical direction of the pixels of the top field is 1/2, 5/2, . . . , and the phase in the vertical direction of the pixels of the bottom field is 1, 3, . . . , as shown in FIG. 27a, are taken out from the frame memory 54.

Then, for the pixels in the vertical direction, pixels of 1/2 pixel precision are generated from the pixels of the integer precision, taken out from the frame memory 54 within the field, using a two-fold interpolation filter, such as a half-band filter, as shown in FIG. 27b. That is, pixels of 1/2 pixel precision of the top field are generated, based on the pixels of the top field of the integer precision, while the pixels of the 1/2 pixel precision of the bottom field are generated, based on the pixels of the integer precision of the bottom field. For example, the pixels of the top field at the 7/2 vertical phase position are generated on two-fold interpolation from the pixels of the top field at 1/2, 5/2, 32/2, 13/2, . . . positions, as shown in FIG. 27b. On the other hand, the of the bottom field at the 4 vertical phase position are generated on two-fold interpolation from the pixels of the bottom field at 1, 3, 5, 7, . . . .

Then, for the pixels in the vertical direction, pixels of 1/4 pixel precision are generated from the pixels of the 1/2 pixel precision, generated by a two-fold interpolation filter between the top and bottom fields, using a linear interpolation filter, as shown in FIG. 27c. For example, the pixels at the 1/4 vertical phase position are generated on linear interpolation from the pixels of the top field at the 0 position and those at the 1/2 position, whilst the pixels at the 3/4 vertical phase position are generated on linear interpolation from the pixels of the top field at the 1/2 position and those of the top field at the 1 position.

By performing interpolation in the vertical direction, pixels of the same phase as those of the standard resolution picture stored in the frame memory 54 can be output as a reference picture consistent with the high resolution picture, in the motion compensation unit for frame mode 56 employing a two-fold interpolation filter, such as a half-band filter, without executing the product sum processing corresponding to the number of taps. So, the motion compensation unit for frame mode 55 is able to perform high speed processing. It is also possible to prevent so-called field inversion or field mixing to prevent deterioration in the picture quality, with there being no dephasing between the top and bottom fields. It is also possible for the motion compensation unit for frame mode 56 to execute the above processing using a sole matrix or to generate 1/4 pixel precision from the pixels of the integer precision using a four-fold interpolation filter.

The picture decoding device 50 according to the fourth embodiment of the present invention applies 4×4 decimating IDCT to each of the top and bottom fields in the field DCT mode to the chroma signals, to decode the standard resolution picture with phase correction, while separating the frames and applying decimating IDCT with phase correction in the frame DCT mode to decode the standard resolution picture. Since the processing is performed for each of the field DCT mode and the frame DCT mode, the properties innate to the interlaced scanned pictures are not lost. Moreover, dephasing between the top and bottom fields produced on decimating IDCT is eliminated to prevent deterioration of the output picture quality. That is, in the present picture decoding device 50, no phase correction is required in outputting the decoded picture stored in the frame memory 54 to simplify the processing without deteriorating the picture quality.

With the picture information conversion device 50 according to the fourth embodiment of the present invention, in which IDCT is applied to the four low-range coefficients in the horizontal direction and to the eight coefficients in the vertical direction, for the referenced I- and P-pictures, it is possible to prevent deterioration in the picture quality due to drift noise ascribable to interlaced scanning and to reduce the memory capacity and the processing volume necessary for decoding the input bitstream.

Moreover, with the picture information conversion device 50 according to the fourth embodiment of the present invention, in which IDCT is applied to the four low-range coefficients in the horizontal direction, it is possible to apply IDCT only to low-range 4×4 coefficients to prevent deterioration in the picture quality due to drift noise ascribable to interlaced scanning and to achieve further reduction in the memory capacity and the processing volume necessary for decoding the input bitstream.

Although the bitstream by MPEG-2 is input to the picture information conversion device 1, the bitstream input may also be a bitstream by e.g., MPEG-1 or H.263, provided that the bitstream has been encoded by orthogonal transform and motion compensation. Moreover, if the input bitstream is of the 420 format as shown in FIG. 29, there is only the frame DCT mode for the chroma signals, so that the decimating IDCT unit for field mode 57 is not required.

Referring to the drawings, a fifth embodiment of the present invention is explained in detail.

Figure 35:
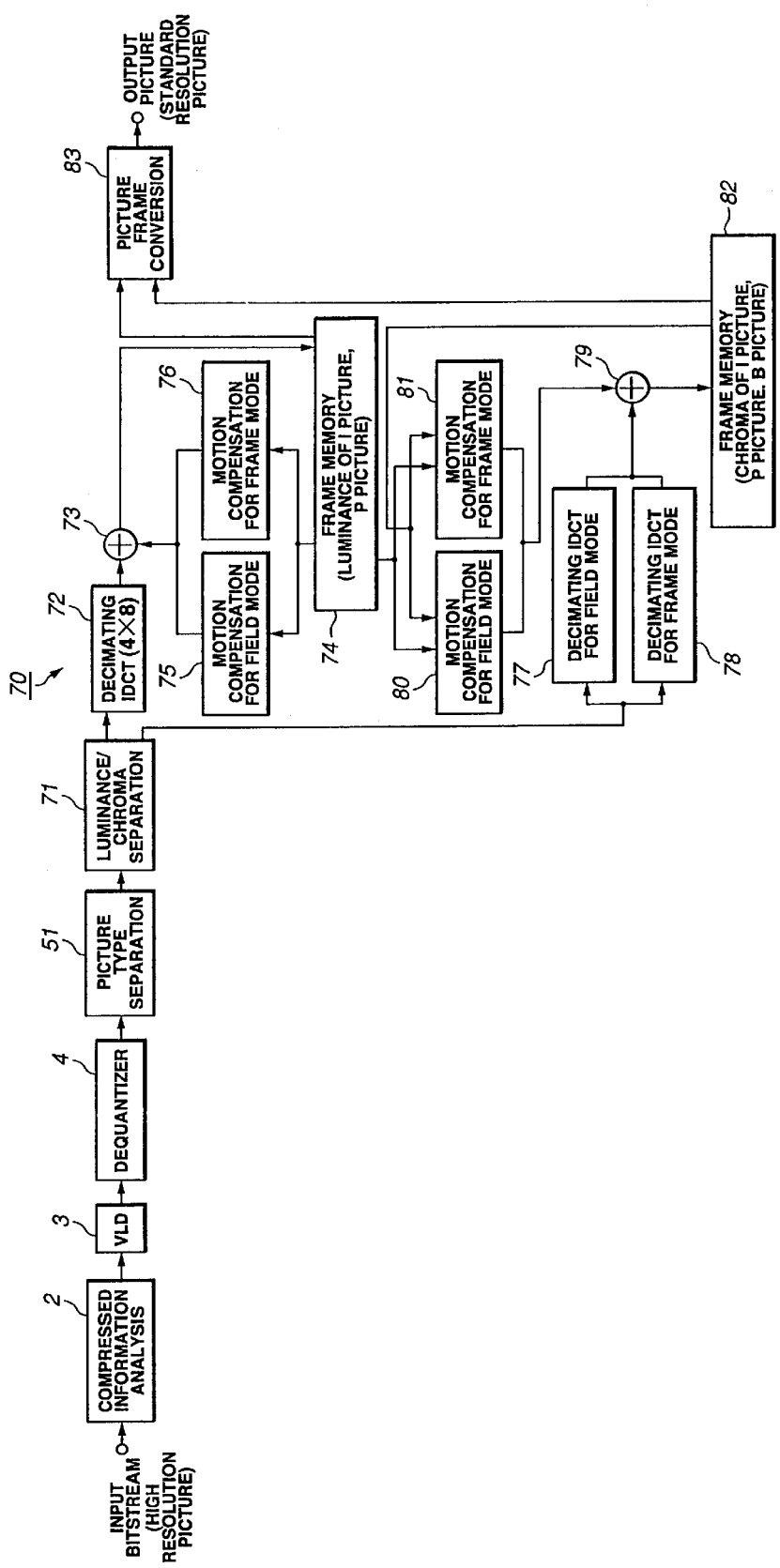
FIG. 35 is a block diagram showing a picture decoding apparatus according to a fifth embodiment of the present invention.

Similarly to the picture decoding device 50, according to the fourth embodiment, the picture decoding device according to the fifth embodiment is fed with a bitstream, obtained on compressing an interlaced scanned picture, as a high resolution picture with 1152 effective lines in the vertical direction, in accordance with MPEG-2 (Moving Picture Experts Group phase-2), decodes this input bitstream and decimates the bitstream to a 1/2 resolution to output a standard resolution picture with 576 effective vertical lines. FIG. 35 shows a picture decoding device 70 according to the fifth embodiment of the present invention.

In the following description of the present picture decoding device 70, the same parts or components as those constituting the picture decoding device 50 of the fourth embodiment are depicted by the same reference numerals and are not explained specifically.

Referring to FIG. 35, this picture decoding device 70 includes a bitstream analysis unit 2 for analyzing an input bitstream of a compressed high resolution picture, a variable length decoder 3 for decoding the bitstream encoded with variable length encoding of allocating a code length corresponding to the data occurrence frequency and an inverse quantizer 4 for multiplying the coefficients of the DCT block with a quantization step. The picture decoding device 70 also includes a picture type separating device 51 for separating the input bitstream into a bitstream pertinent to I- and P-pictures and a bitstream pertinent to the B-pictures, a luminance signal/chroma signal separating device 71 for separating the DCT coefficients pertinent to the I- and P-pictures into luminance signals and chroma signals, and a decimating inverse discrete cosine transform unit 72 for applying decimating inverse discrete cosine transform to the DCTed DCT block of the luminance signals of the separated I- and P-pictures to generate a standard resolution picture. The picture decoding device 70 also includes an addition unit 73 for summing the decimating inverse discrete cosine transformed standard resolution picture to the motion-compensated reference picture, a frame memory 74 for transiently storing the reference picture pertinent to the luminance signals of the I- and P-pictures, a motion compensation unit for field mode 75 for motion-compensating the reference picture stored by the frame memory 74 in meeting with the field motion prediction mode, and a motion compensation unit for frame mode 76 for motion-compensating the reference picture stored in the frame memory 74 in meeting with the frame motion prediction mode. The picture decoding device 70 also includes a phase-correcting decimating inverse discrete cosine transform unit for field mode 77 for applying decimating IDCT to the chroma signal of the separated I- and P-pictures and to the DCT block of the B-picture DCTed in the field DCT mode, to generate a standard resolution picture, and a phase-correcting decimating inverse discrete cosine transform unit for frame mode 78 for applying decimating IDCT to the chroma signal of the separated I- and P-pictures and to the DCT block of the, B-picture DCTed in the frame DCT mode, to generate a standard resolution picture. The picture decoding device 70 also includes an addition unit 79 for summing the decimating inverse discrete cosine transformed standard resolution picture to the motion-compensated reference picture, a motion compensation unit for field mode 310 for motion-compensating the reference picture stored in the frame memories 74, 82 in meeting with the field motion prediction mode, and a motion compensation unit for frame mode 81 for motion-compensating the reference picture stored in the frame memories 74, 82 in meeting with the frame motion prediction mode. The picture decoding device 70 also includes the frame memory 82 for transiently storing the chroma signals of the I- and P-pictures and the reference picture pertinent to a B-picture, and a picture frame conversion unit 83 for post-filtering the pictures picture stored in the frame memories 74, 82 to output picture data of the standard resolution as the picture frame is converted and pixel dephasing is corrected for display on e.g., a TV monitor.

The luminance signal/chroma signal separating device 71 separates the DCT coefficients pertinent to the I- and P-pictures, separated by the picture type separating device 51, into DCT coefficients pertinent to the I- and P-pictures and to the luminance signals and into DCT coefficients pertinent to the I- and P-pictures and to the chroma signals. The luminance signal/chroma signal separating device 71 furnishes DCT coefficients of the luminance signals of the I- and P-pictures to the decimating IDCT device 22, while furnishing the chroma signals of the I- and P-pictures and DCT coefficients of the B-pictures to the decimating inverse discrete cosine transform unit for field mode 77 and to the decimating inverse discrete cosine transform unit for frame mode 78.

The decimating inverse discrete cosine transform unit 72 applies IDCT to the four coefficients in the horizontal direction for the low range and to the eight coefficients in the vertical direction in the DCTed macroblock indicating 8×8 coefficients, in the DCTed macroblock pertinent to luminance signals of I- and P-pictures, as shown in FIG. 2. That is, the decimating inverse discrete cosine transform unit 72 applies decimating IDCT to the four coefficients in the horizontal direction for the low range and to the eight coefficients in the vertical direction. Specifically, the decimating inverse discrete cosine transform unit 72 executes decimating IDCT on the input quantized 8×8 DCT coefficients C for luminance coefficients, using a 4×8 matrix executing a DCT in the horizontal direction consisting of a transposed matrix of an order four IDCT matrix $iD_4^t$ and a zero-matrix $0_4$ of 4×4, and an 8×8 matrix, executing the DCT in the vertical direction, consisting of an order eight inverse DCT matrix $iD_8$, to yield 4×8 decoded pixel data, as shown in FIG. 3. This decimating inverse discrete cosine transform unit 72, executing the above-described decimating IDCT, is able to decode the standard resolution picture in which each DCT block is made up of 4×8 pixels.

If the macroblock, processed with decimating IDCT by the decimating inverse discrete cosine transform unit 72, is an intra-picture, the intra-picture is directly stored by the adder 73 in the frame memory 74. If a macro-block, processed with decimating IDCT by the decimating inverse discrete cosine transform unit 72, is an inter-picture, the adder 73 synthesizes the reference picture, motion compensated by the motion compensation unit for field mode 75 or by the motion compensation unit for frame mode 76, to the inter-picture, to store the synthesized picture in the frame memory 74.

Since the resolution in the horizontal direction is decimated by one half in the decimating inverse discrete cosine transform unit 72, it is sufficient if the memory capacity of the frame memory 74 is one-half the resolution proper to the bitstream input to the compressed information analysis unit 2.

The motion compensation unit for field mode 75 is used if the motion prediction mode for the macro-block is the field motion prediction mode. The motion compensation unit for field mode 75 interpolates the reference picture of the standard resolution picture stored in the frame memory 74, depending e.g., on the value of the motion vector in the input bitstream, by linear interpolation of one-half pixel precision in the vertical direction .

As for the horizontal direction, the motion compensation unit for field mode 75 creates pixels of approximately one-half pixel precision, with respect to the reference picture of the standard resolution picture stored in the frame memory 74, by a two-fold interpolation filter, such as a half-band filter, depending on e.g., the value of the motion vector in the input bitstream, to perform interpolation approximately of 1/4 pixel precision based on the so-created pixels. The reason is that, in the decimating inverse discrete cosine transform unit 72, the resolution of the input bitstream is decimated to 1/2.

For outputting pixel values of the same phase as the pixel supplied from the frame memory 74, as a predicted picture, using a half-band filter, fast calculation processing is feasible, because there is no necessity of executing product-sum processing in meeting with the number of taps. On the other hand, if a half-band filter is used, since the coefficient can be represented by $x/2^n$, it is possible to perform division necessary for filtering at a high speed by shift processing. Alternatively, pixels necessary for motion compensation can be directly produced by four-fold interpolation filtering. In actuality, those coefficients which permit two-stage interpolation, executed by the two-fold interpolation filter and the linear interpolation, at a time, may be provided at the outset to perform the processing as if the interpolation is one-stage interpolation.

The motion compensation unit for field mode 75, performing the above-described processing, performs motion compensation in meeting with the field motion prediction mode. The reference picture, motion compensated by the motion compensation unit for field mode 75, is sent to the adder 73 for synthesis to an inter-picture.

The motion compensation unit for frame mode 76 is used if the motion prediction mode for the macro-block is the frame motion prediction mode. The motion compensation unit for frame mode 76 interpolates the reference picture of the standard resolution picture stored in the frame memory 74, depending e.g., on the value of the motion vector in the input bitstream, by linear interpolation of one-half pixel precision in the vertical direction.

As for the horizontal direction, the motion compensation unit for frame mode 76 creates pixels of approximately one-half pixel precision, with respect to the reference picture of the standard resolution picture stored in the frame memory 74, by a two-fold interpolation filter, such as a half-band filter, depending on e.g., the value of the motion vector in the input bitstream, to perform interpolation approximately of 1/4 pixel precision based on the so-created pixels.

For outputting pixel values of the same phase as the pixel supplied from the frame memory 74, as a predicted picture, using a half-band filter, fast calculation processing is feasible, because there is no necessity of executing product-sum processing in meeting with the number of taps. On the other hand, if a half-band filter is used, since the coefficient can be represented by $x/2^n$, it is possible to perform division necessary for filtering at high speed by shift processing. Alternatively, pixels necessary for motion compensation can be directly produced by four-fold interpolation filtering. In actuality, those coefficients which permit two-stage interpolation, executed by the two-fold interpolation filter and the linear interpolation, at a time, to perform the processing as if the interpolation is one-stage interpolation.

The motion compensation unit for frame mode 76, performing the above-described processing, performs motion compensation in meeting with the field motion prediction mode. The reference picture, motion compensated by the motion compensation unit for frame mode 76, is sent to the adder 73 for synthesis to an inter-picture.

The decimating inverse discrete cosine transform unit 77 for field mode is used if the bitstream of the input I- and P-pictures and B-pictures is discrete cosine transformed in the field DCT mode. The decimating inverse discrete cosine transform unit for field mode 77 performs inverse discrete cosine transform only on the low-range 4×4 coefficients of the DCT block, showing 8×8 coefficients in the macro-block discrete cosine transformed in the field DCT mode, as shown in FIG. 8. That is, the decimating inverse discrete cosine transform unit for field mode performs decimating inverse discrete cosine transform based on four point inverse discrete cosine coefficients in the horizontal direction and in the vertical direction. This decimating inverse discrete cosine transform unit for field mode 77 can decode the standard resolution picture, each DCT block of which is made up of 4×4 pixels, by the above-described decimating inverse discrete cosine transform. The phases of the pixels of the decoded picture data are 1/2, 5/2, . . . , in the vertical direction of the respective pixels of the top field, with the phases in the vertical direction of the respective pixels of the bottom field being 1, 3, . . . . That is, in the top field of the decoded lower layer, the phase of the leading end pixel (pixel with the phase of 1/2) is intermediate between the first and second pixels (pixels with the phase 0 and the phase 2) as from the leading end of the top field of the upper layer, while the phase of the second pixel as from the leading end pixel (pixel with the phase of 2/5) is intermediate between the third and fourth pixels (pixels with the phase 4 and the phase 6) as from the leading end of the top field of the upper layer. On the other hand, in the bottom field of the decoded lower layer, the phase of the leading end pixel (pixel with the phase of 1) is intermediate between the first and second pixels (pixels with the phase 1 and the phase 3) as from the leading end of the bottom field of the upper layer, whereas the phase of the second pixel as from the leading end pixel (pixel with the phase of 3) is intermediate between the third and fourth pixels (pixels with the phase 5 and the phase 7) as from the leading end of the bottom field of the upper layer.

The decimating inverse discrete cosine transform unit for frame mode 78 is used when the macro-block of the input bitstream of chroma signals of the input I- and P-pictures and B-pictures is discrete cosine transformed with the frame DCT mode. The decimating inverse discrete cosine transform unit for frame mode 78 performs decimating inverse discrete cosine transform on the DCT block showing 8×8 coefficients in the macro-block discrete cosine transformed in the frame DCT mode. The decimating inverse discrete cosine transform unit for frame mode 78 decodes the standard resolution picture, each DCT block of which is constituted by 4×4 pixels, while generating a picture of the same phase as the phase of the pixel of the standard resolution picture generated by the decimating inverse discrete cosine transform unit for field mode 77. That is, the phases in the vertical direction of the respective pixels of picture data decoded by the decimating inverse discrete cosine transform unit for frame mode 78 are such that the phases in the vertical direction of respective pixels of the top field are 1/2, 5/2, ..., with the phases in the perpendicular direction of the respective pixels of the bottom field being 1, 3, ....

If the macroblock, processed with decimating IDCT by the phase-correcting decimating inverse discrete cosine transform unit for field mode 7 or the phase-correcting decimating inverse discrete cosine transform unit for frame mode 78, is an intra-picture, the intra-picture is directly stored by the adder 79 in the frame memory 82. If a macro-block, processed with decimating IDCT by the phase-correcting decimating inverse discrete cosine transform unit for field mode 77 or the phase-correcting decimating inverse discrete cosine transform unit for frame mode 78, is an inter-picture, the adder 79 synthesizes the reference picture, motion compensated by the motion compensation unit for field mode 77 or by the motion compensation unit for frame mode 78, to the inter-picture, to store the synthesized picture in the frame memory 82.

The motion compensation unit for field mode 80 is used if the motion prediction mode for the macro-block is the field motion prediction mode. The motion compensation unit for field mode 80 interpolates the reference picture of the standard resolution picture stored in the frame memory 74, depending e.g., on the value of the motion vector in the input bitstream, by linear interpolation of one-half pixel precision in the vertical direction, before proceeding to decimation by 1/2 taking the field-to-phase into account. As for the vertical direction, the motion compensation unit for field mode 80 interpolates the reference picture of the standard resolution picture stored in the frame memory 82 by linear interpolation to 1/2 pixel precision, depending on e.g., a value of the motion vector in the input bitstream, and subsequently preforms thinning by 1/2 taking the field-to-field phase into account.

As for the horizontal direction, the motion compensation unit for field mode 80 creates pixels of approximately one-half pixel precision, with respect to the reference picture of the standard resolution picture stored in the frame memory 74, by a two-fold interpolation filter, such as a half-band filter, depending on e.g., the value of the motion vector in the input bitstream, to perform interpolation of approximately 1/4 pixel precision based on the so-created pixels. Also, the motion compensation unit for field mode 80 creates pixels of approximately one-half pixel precision, with respect to the reference picture of the standard resolution picture stored in the frame memory 82, by a two-fold interpolation filter, such as a half-band filter, depending on e.g., the value of the motion vector in the input bitstream, to perform interpolation of approximately 1/4 pixel precision based on the so-created pixels.

By performing the above processing, the motion compensation unit for field mode 80 performs motion compensation in meeting with the field motion prediction mode. The reference picture, motion compensated by the motion compensation unit for field mode 80, is routed to the adder 79 for synthesis to an inter-picture.

The motion compensation unit for frame mode 81 is used if the motion prediction mode for the macro-block is the frame motion prediction mode. The motion compensation unit for frame mode 81 interpolates the reference picture of the standard resolution picture stored in the frame memory 74, depending e.g., on the value of the motion vector in the input bitstream, by linear interpolation of one-half pixel precision in the vertical direction, before proceeding to decimation by 1/2 which takes the field-to-phase into account. As for the vertical direction, the motion compensation unit for frame mode 81 applies the interpolation to 1/2 pixel precision by linear interpolation to the reference picture, such as standard resolution picture, stored in the frame memory 82, responsive to e.g., a motion vector value in the input bitstream, and subsequently performs decimation taking the field-to-phase into account.

As for the horizontal direction, the motion compensation unit for frame mode 81 creates pixels of approximately one-half pixel precision, with respect to the reference picture of the standard resolution picture stored in the frame memory 74, by a two-fold interpolation filter, such as a half-band filter, depending on e.g., the value of the motion vector in the input bitstream, to perform interpolation of approximately 1/4 pixel precision based on the so-created pixels. Also, the motion compensation unit for frame mode 81 creates pixels of approximately one-half pixel precision, with respect to the reference picture of the standard resolution picture stored in the frame memory 82, by a two-fold interpolation filter, such as a half-band filter, depending on e.g., the value of the motion vector in the input bitstream, to perform interpolation of approximately 1/4 pixel precision based on the so-created pixels.

By performing the above processing, the motion compensation unit for frame mode 81 performs motion compensation in meeting with the field motion prediction mode. The reference picture, motion compensated by the motion compensation unit for frame mode 81, is routed to the adder 79 for synthesis to an inter-picture.

It is sufficient if the memory capacity of the frame memory 82 is one-fourth of the resolution proper to the bitstream input to the compressed information analysis unit 2.

The picture frame conversion device 83 is fed with the reference picture of the standard resolution stored in the frame memory 74 or a picture synthesized by the adder 73, and with the reference picture of the standard resolution stored in the frame memory 82 or the picture synthesized by the addition unit 79, to convert the picture frame of this reference picture by post-filtering for conformity to the a standard for a standard resolution television.

The picture decoding device 50, described above, decodes the bitstream, compressed from the high resolution picture in accordance with MPEG-2, while decimating the resolution to 1/2 to output a standard resolution picture.

The picture decoding device 70 according to the fifth embodiment of the present invention applies 4×4 decimating IDCT to each of the top and bottom fields in the field DCT mode to the chroma signals of the I- and P-pictures and to B-pictures and decodes the standard resolution picture with phase correction, while separating the frames and applying decimating IDCT with phase correction in the frame DCT mode to decode the standard resolution picture. Since the processing is performed in the present picture decoding device 70 for each of the field DCT mode and the frame DCT mode, the properties innate to the interlaced scanned pictures are not lost. Moreover, dephasing between the top and bottom fields produced on decimating IDCT is eliminated to prevent deterioration of the output picture quality. That is, in the present picture decoding device 70, no phase correction is required in outputting the decoded picture stored in the frame memory 74 to simplify the processing without deteriorating the picture quality.

In the picture information conversion device 70 of the fifth embodiment of the present invention, described above, IDCT is applied to four low-range coefficients in the horizontal direction and to eight coefficients in the vertical direction, for luminance signals of referenced I- and P-pictures, to prevent deterioration of the picture quality ascribable to drift noise caused by interlaced scanning to reduce the processing volume necessary for decoding the input bitstream to reduce the memory capacity.

With the picture information conversion device 70 according to the fifth embodiment of the present invention, in which IDCT is applied to the four low-range coefficients in the horizontal direction and to the eight coefficients in the vertical direction, for the chroma signals of the referenced I- and P-pictures, for which picture quality deterioration is less apparent to human eyes than luminance signals, and for non-referenced B-pictures, it is possible to prevent deterioration in the picture quality due to drift noise ascribable to interlaced scanning and to reduce the memory capacity as well as the processing volume.

Although the bitstream by MPEG-2 is input to the picture information conversion device 70, the bitstream input may also be a bitstream by e.g., MPEG-1 or H.263, provided that the bitstream has been encoded by orthogonal transform with motion compensation. Moreover, if the input bitstream is of the 420 format as shown in FIG. 29, there is only the frame DCT mode for the chroma signals, so that the decimating IDCT unit for field mode 57 is not required.

Referring to the drawings, a sixth embodiment of the present invention is explained in detail.

Figure 36:
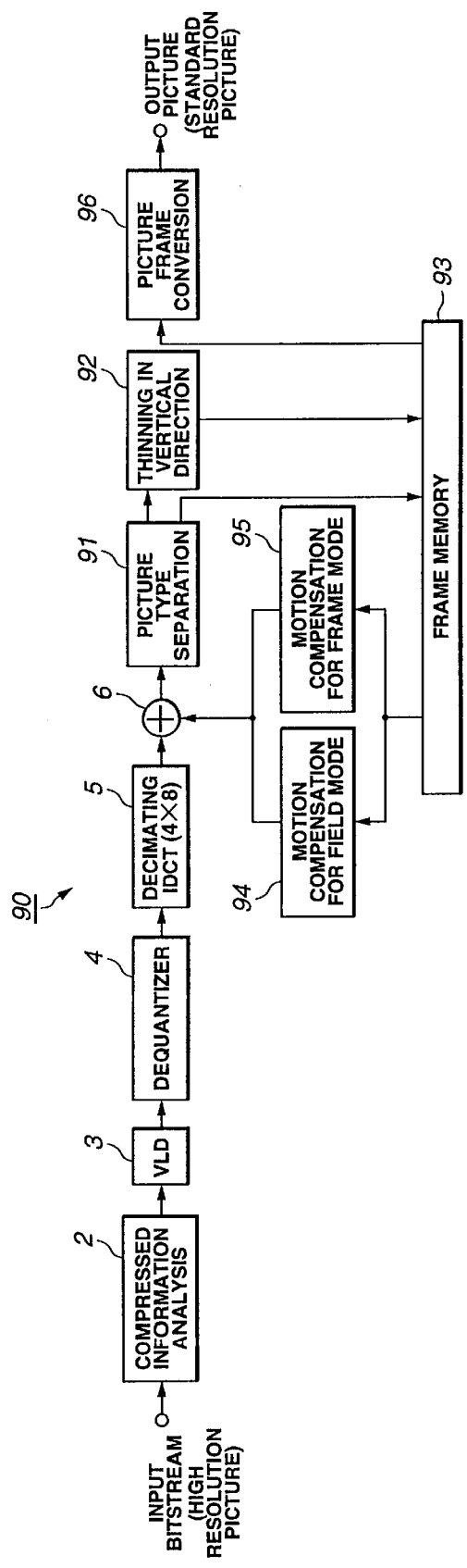
FIG. 36 is a block diagram showing a picture decoding apparatus according to a fifth embodiment of the present invention.
Figure 37:
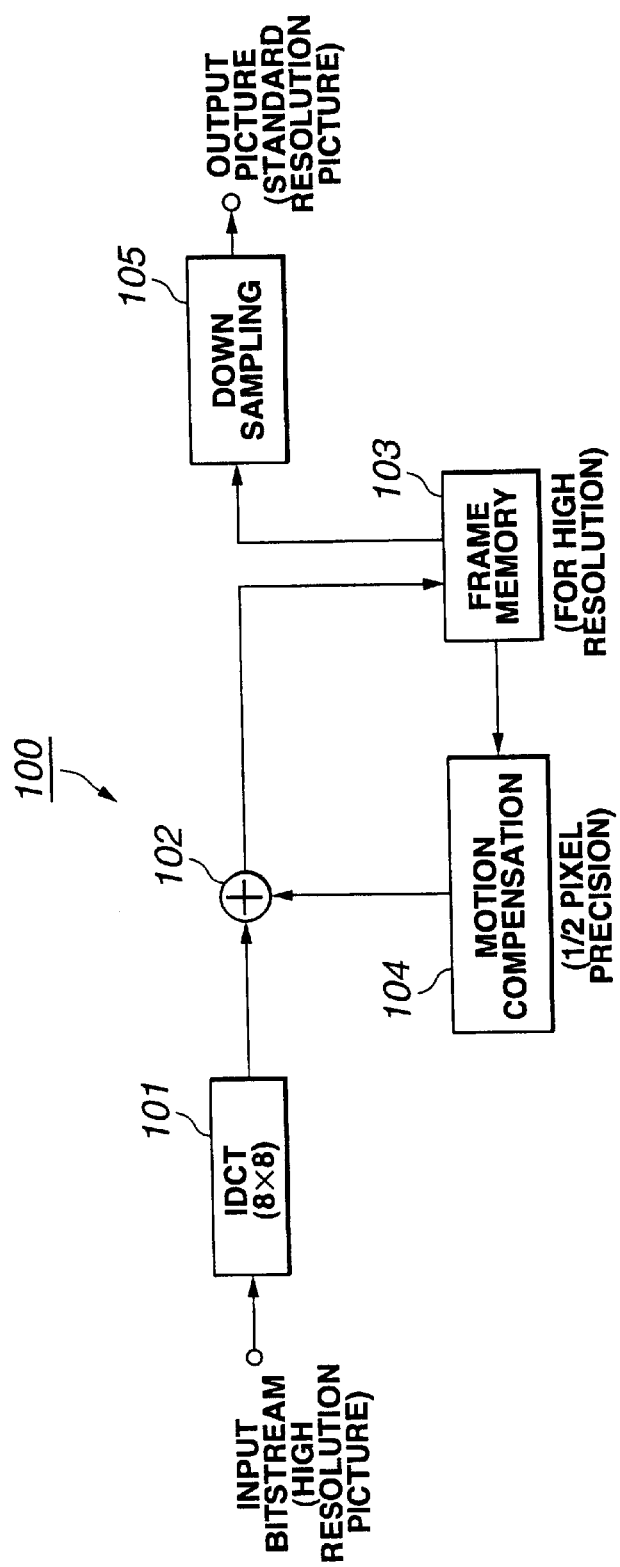
FIG. 37 is a block diagram showing a conventional first picture decoding apparatus.
Figure 38:
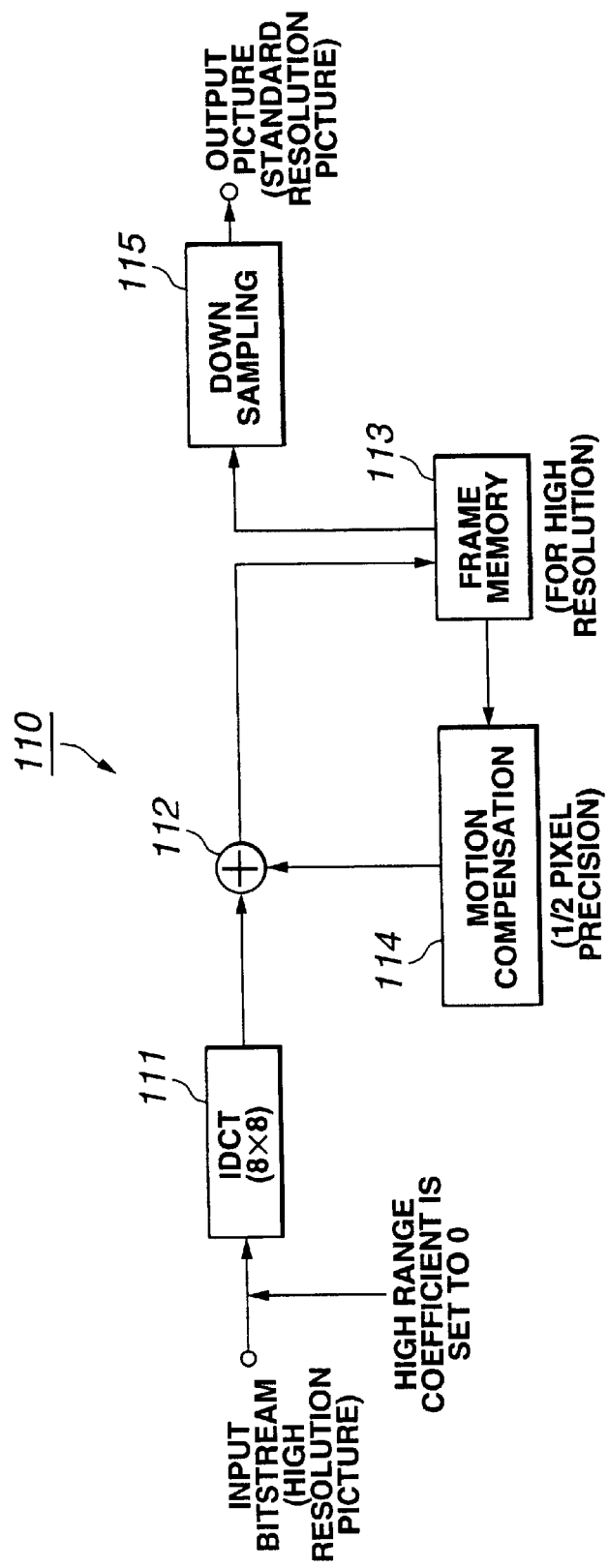
FIG. 38 is a block diagram showing a conventional second picture decoding apparatus.
Figure 39:
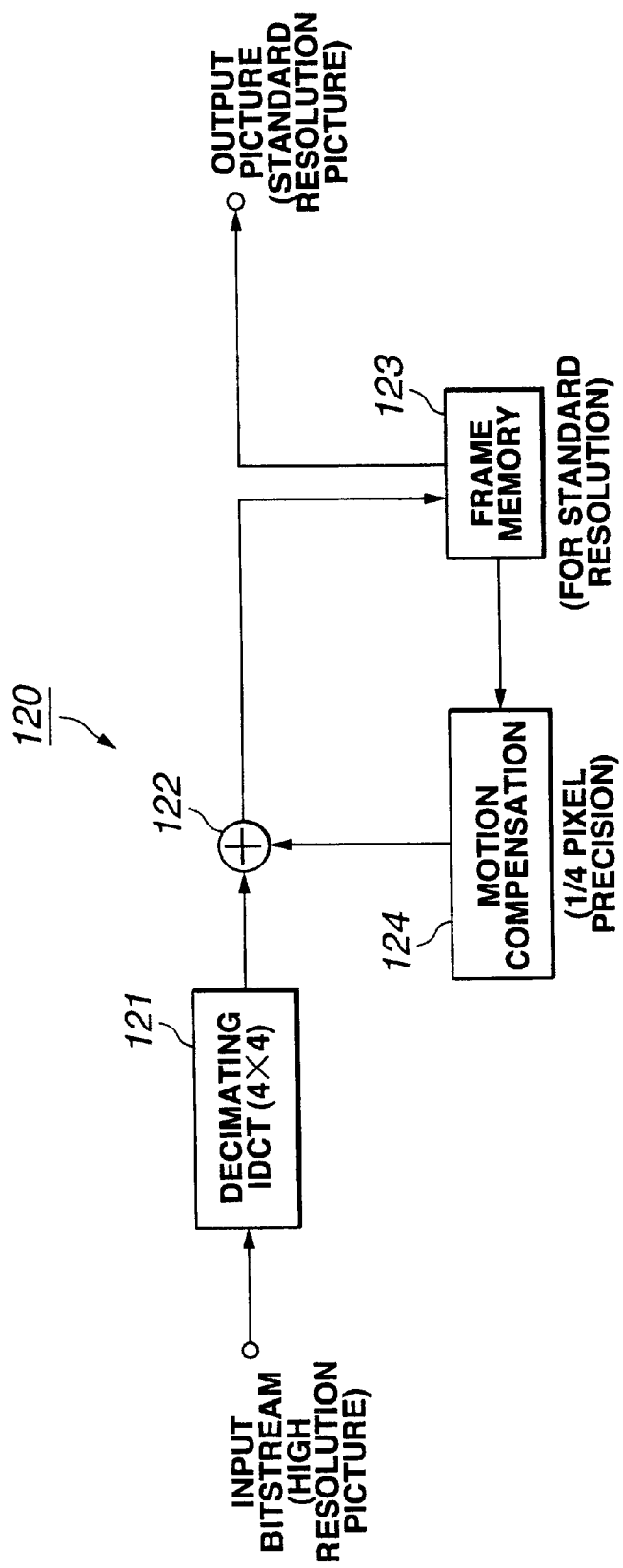
FIG. 39 is a block diagram showing a conventional third picture decoding apparatus.
Figure 40:
FIG. 40 shows an output picture obtained by a B-picture on decoding an HD test sequence "opening ceremony" composed of a compressed bitstream by a conventional picture decoding apparatus.

Similarly to the picture decoding device 1, according to the first embodiment, the picture decoding device according to the sixth embodiment is fed with a bitstream, obtained on compressing an interlaced scanned picture, as a high resolution picture with 1152 effective lines in the vertical direction, in accordance with MPEG-2 (Moving Picture Experts Group phase-2) and decodes this input bitstream, decimates the bitstream to a 1/2 resolution to output a standard resolution picture with 576 effective vertical lines. FIG. 36 shows a picture decoding device according to the fourth embodiment of the present invention.

In the following description of the present picture decoding device 90, the same parts or components as those constituting the picture decoding device 1 of the first embodiment are depicted by the same reference numerals and are not explained specifically.

Referring to FIG. 36, this picture decoding device 90 includes a bitstream analysis unit 2 for analyzing an input bitstream of a compressed high resolution picture, and a variable length decoder 3 for decoding the bitstream encoded with variable length encoding of allocating a code length corresponding to the data occurrence frequency. The picture decoding device 90 also includes an inverse quantizer 4 for multiplying the coefficients of the DCT block with a quantization step, a decimating IDCT device 5 for applying decimating IDCT to the DCTed DCT block to generate a standard resolution picture, and an adder 6 for summing the standard resolution picture processed with the decimating IDCT to the motion compensated reference picture. The picture decoding device 90 also includes a picture type separating device 91 for separating the bitstream, fed from the adder 6, into a bitstream pertinent to I- and P-pictures and a bitstream pertinent to B-pictures, a vertical thinning-out unit 92 for filtering the bitstream pertinent to the B-pictures in the vertical direction for thinning out by 1/2 in the vertical direction, and a frame memory 93 for transiently storing a reference picture pertinent to the I- and P-pictures and B-pictures thinned in the vertical direction. The picture decoding device 90 also includes a motion compensation device for field mode 94 for applying motion compensation consistent with the field motion prediction mode to the reference picture stored in the frame memory 93, a motion compensation device for frame mode 95 for applying motion compensation consistent with the frame motion prediction mode to the reference picture stored in the frame memory 93, and a picture frame conversion unit 96 for converting a picture frame by post-filtering the picture stored in the frame memory 93 to correct the pixel dephasing to output picture data of standard resolution for display on e.g., a TV monitor.

The picture type separation unit 91 separates the input bitstream into a bitstream pertinent to I- and P-pictures and a bitstream pertinent to B-pictures. The picture type separation unit 91 furnishes the separated bitstream pertinent to the I- and P-pictures to the frame memory 93, while furnishing the separated bitstream pertinent to the B-pictures to the vertical thinning-out unit 92.

The vertical thinning-out unit 92 applies vertical filtering to the bitstream pertinent to the B-pictures, as separated by the picture type separation unit 91, to effect thinning out by 1/2 in the vertical direction. The vertical thinning-out unit 92 routes the bitstream pertinent to the B-pictures, thinned by 1/2 in the vertical direction, to the frame memory 93.

Since the resolution in the horizontal direction is decimated by one half in the decimating inverse discrete cosine transform unit 5, it is sufficient if the memory capacity of the frame memory 93 is one-half the resolution proper to the bitstream input to the compressed information analysis unit 2.

The motion compensation unit for frame mode 94 is used if the motion prediction mode for the macro-block is the field motion prediction mode. The motion compensation unit for frame mode 94 interpolates the reference picture of the standard resolution picture stored in the frame memory 7 depending e.g., on the value of the motion vector in the input bitstream, by linear interpolation of one-half pixel precision in the vertical direction.

As for the horizontal direction, the motion compensation unit for field mode 94 creates pixels of approximately one-half pixel precision, with respect to the reference picture of the standard resolution picture stored in the frame memory 7, by a two-fold interpolation filter, such as a half-band filter, depending on e.g., the value of the motion vector in the input bitstream, to perform interpolation of approximately 1/4 pixel precision based on the so-created pixels. The reason is that the resolution is decimated to one half in the decimating IDCT device 5.

For outputting pixel values of the same phase as the pixel supplied from the frame memory 7, as a predicted picture, using a half-band filter, fast calculation processing is feasible, because there is no necessity of executing product-sum processing in meeting with the number of taps. On the other hand, if a half-band filter is used, since the coefficient can be represented by x/2$^n$, it is possible to perform division necessary for filtering at a high speed by shift processing. Alternatively, pixels necessary for motion compensation can be directly produced by four-fold interpolation filtering. In actuality, those coefficients which permit two-stage interpolation, executed by the two-fold interpolation filter and the linear interpolation, at a time, may be provided at the outset to perform the processing as if the interpolation is one-stage interpolation.

The motion compensation unit for field mode 94, performing the above-described processing, performs motion compensation in meeting with the field motion prediction mode. The reference picture, motion compensated by the motion compensation unit for field mode 94, is sent to the adder 6 for synthesis to an inter-picture.

The motion compensation unit for frame mode 95 is used if the motion prediction mode for the macro-block is the frame motion prediction mode. The motion compensation unit for frame mode 95 interpolates the reference picture of the standard resolution picture stored in the frame memory 54, depending e.g., on the value of the motion vector in the input bitstream, by linear interpolation of one-half pixel precision in the vertical direction.

As for the horizontal direction, the motion compensation unit for frame mode 95 creates pixels of approximately one-half pixel precision, with respect to the reference picture of the standard resolution picture stored in the frame memory 93, by a two-fold interpolation filter, such as a half-band filter, depending on e.g., the value of the motion vector in the input bitstream, to perform interpolation of approximately 1/4 pixel precision based on the so-created pixels.

For outputting pixel values of the same phase as the pixel supplied from the frame memory 7, as a predicted picture, using a half-band filter, fast calculation processing is feasible, because there is no necessity of executing product-sum processing in meeting with the number of taps. On the other hand, if a half-band filter is used, since the coefficient can be represented by x/2$^n$, it is possible to perform division necessary for filtering at a high speed by shift processing. Alternatively, pixels necessary for motion compensation can be directly produced by four-fold interpolation filtering. In actuality, those coefficients which permit two-stage interpolation, executed by the two-fold interpolation filter and the linear interpolation, at a time, may be provided at the outset to perform the processing as if the interpolation is one-stage interpolation.

The motion compensation unit for frame mode 95, performing the above-described processing, performs motion compensation in meeting with the frame motion prediction mode. The reference picture, motion compensated by the motion compensation unit for frame mode 95, is sent to the adder 6 for synthesis to an inter-picture.

The picture frame conversion device 96, fed with a picture synthesized from the reference picture of the standard resolution stored in the frame memory 93 or with a picture synthesized by the adder 6, corrects the picture by post-filtering for dephasing components between the top and bottom fields, while converting the picture frame into conformity to the standard resolution TV standard. The picture frame conversion device 96 also reduces the picture frame of the high resolution TV to 1/4 for conversion to a picture frame for the standard resolution TV standard.

The picture decoding device 90, described above, decodes the bitstream, obtained on compressing the high resolution picture by MPEG-2, and decimates the resolution by 1/2 to output the standard resolution picture.

With the picture information conversion device 90, according to the sixth embodiment of the present invention, IDCT is applied to four coefficients in the low range in the horizontal direction and to eight coefficients in the vertical direction, for luminance signals of referenced I- and P-pictures, to prevent deterioration of the picture quality due to drift noise ascribable to interlaced scanning to reduce the memory capacity and the processing volume necessary for decoding the input bitstream.

Moreover, with the picture information conversion device 90 according to the sixth embodiment of the present invention, in which IDCT is applied to the four low-range coefficients in the horizontal direction, it is possible to prevent deterioration in the picture quality due to drift noise ascribable to interlaced scanning and to achieve further reduction in the memory capacity and the processing volume necessary for decoding the input bitstream.

Although the bitstream by MPEG-2 is input to the picture information conversion device 90, the bitstream input may also be a bitstream by e.g., MPEG-1 or H.263, provided that the bitstream has been encoded by orthogonal transform with motion compensation.

What is claimed is:

1. A picture decoding apparatus for decoding the moving picture information of a second resolution from the compressed picture information of a first resolution obtained on predictive encoding in terms of a pre-set pixel or macroblock block as a unit and on orthogonal transform in terms of a pre-set pixel block or as a unit, said second resolution being lower than said first resolution, said picture decoding apparatus comprising:

inverse orthogonal transform means for inverse orthogonal transforming each coefficient of the orthogonal transform block of orthogonal transformed compressed picture information;

addition means for summing the transformed compressed picture information obtained on inverse orthogonal transform by said inverse orthogonal transform means to motion compensated reference picture information to output said moving picture information of the second resolution;

storage means for memorizing the moving picture information output by said addition means as reference picture information;

first motion compensation means for motion compensating the macroblock of the reference picture information motion-predicted in accordance with a motion prediction system associated with interlaced scanning; and second motion compensation means for motion compensating the macroblock of the reference picture information motion-predicted in accordance with a motion prediction system associated with sequential scanning;

said inverse orthogonal transform means inverse orthogonal transforming four coefficients of a low range in the horizontal direction and eight coefficients in the vertical direction in respective coefficients in an orthogonal transform block of the compressed picture information, and further comprises a 4×8 matrix composed of a transposed order four IDCT matrix and a 4×4 zero-matrix for executing a discrete cosine transform in the horizontal direction and an 8×8 matrix composed of an order eight inverse DCT matrix for executing a discrete cosine transform in the vertical direction.

2. The picture decoding apparatus according to claim 1 further comprising:

signal separating means for separating the compressed picture information of said first resolution into compressed picture information pertinent to luminance signals and into compressed picture information pertinent to chroma signals;

said inverse orthogonal transform means inverse orthogonal transforming four low-range coefficients in the horizontal direction and eight coefficients in the vertical direction, wherein the coefficients of the orthogonal transform of the compressed picture information pertinent to luminance signals are separated by said signal separating means;

said addition means summing the compressed picture information of the luminance signals inverse orthogonal transformed by said inverse orthogonal transform means to the motion compensated reference picture information to output the moving picture information of said second resolution.

3. A picture decoding method for decoding the moving picture information of a second resolution from the compressed picture information of a first resolution obtained on predictive encoding in terms of a pre-set pixel block as a unit and on orthogonal transform in terms of a pre-set pixel block as a unit, said second resolution being lower than said first resolution, said picture decoding method comprising:

inverse orthogonal transforming four low-range coefficients in the horizontal direction and eight coefficients in the vertical direction, wherein coefficients are orthogonal transform blocks of the orthogonal transformed compressed picture information;

summing the inverse orthogonal transformed picture information with motion compensated reference picture information to output moving picture information of the second resolution;

memorizing the output moving picture information of the second resolution as reference picture information;

motion compensating the macroblock of the reference picture information motion-predicted in accordance with a motion prediction system associated with interlaced scanning; and motion compensating the macroblock of the reference picture information motion-predicted in accordance with the motion prediction system associated with sequential scanning, wherein the step of inverse orthogonal transforming includes executing a discrete cosine transform in the horizontal direction using a 4×8 matrix composed of a transposed order four IDCT matrix and a 4×4 zero-matrix and executing a discrete cosine transform in the vertical direction using an 8×8 matrix composed of an order eight inverse DCT matrix.

4. The picture decoding method according to claim 3 further comprising:

separating the compressed picture information of the first resolution into compressed picture information pertinent to luminance signals and compressed picture information pertinent to chroma signals;

inverse orthogonal transforming four low-range coefficients in the horizontal direction and eight coefficients in the vertical direction, wherein the respective coefficients of the orthogonal transform block of the compressed picture information are pertinent to the separated luminance signal; and summing the inverse transformed picture information pertinent to the inverse orthogonal transformed luminance signals to output moving picture information of the second resolution.

* * * * *